(12) United States Patent
Sakurabu et al.

(10) Patent No.: US 11,533,437 B2
(45) Date of Patent: Dec. 20, 2022

(54) IMAGING ELEMENT, IMAGING APPARATUS, IMAGE DATA PROCESSING METHOD, AND PROGRAM THAT PERFORMS IMAGING IN A FIRST FRAME RATE AND OUTPUTS DATA IN A SECOND FRAME RATE

(71) Applicant: FUJIFILM CORPORATION, Tokyo (JP)

(72) Inventors: Hitoshi Sakurabu, Saitama (JP); Ryo Hasegawa, Saitama (JP); Tomoyuki Kawai, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/180,888

(22) Filed: Feb. 22, 2021

(65) Prior Publication Data
US 2021/0185272 A1     Jun. 17, 2021

Related U.S. Application Data

(63) Continuation of application No. PCT/JP2019/025646, filed on Jun. 27, 2019.

(30) Foreign Application Priority Data

Aug. 31, 2018    (JP) .............................. JP2018-163996

(51) Int. Cl.
*H04N 5/232*      (2006.01)
*H04N 5/262*      (2006.01)
(Continued)

(52) U.S. Cl.
CPC ..... *H04N 5/23296* (2013.01); *H04N 5/23232* (2013.01); *H04N 5/232127* (2018.08);
(Continued)

(58) Field of Classification Search
CPC . H04N 7/0127–0132; H04N 5/232127; H04N 5/23229; H04N 5/23232;
(Continued)

(56) References Cited

U.S. PATENT DOCUMENTS

2006/0204122 A1*   9/2006   Onozawa ............... G03B 13/36
                                                                                           396/89
2010/0141783 A1   6/2010   Sakaguchi et al.
(Continued)

FOREIGN PATENT DOCUMENTS

| JP | 2013-84124 A | 5/2013 |
|---|---|---|
| JP | 2015-136093 A | 7/2015 |

(Continued)

OTHER PUBLICATIONS

International Search Report issued in International Application No. PCT/JP2019/025646 dated Aug. 20, 2019.
(Continued)

*Primary Examiner* — Paul M Berardesca
(74) *Attorney, Agent, or Firm* — Solaris Intellectual Property Group, PLLC

(57) ABSTRACT

An imaging element includes: a memory that stores captured image data obtained by imaging a subject at a first frame rate; an image processing circuit that performs processing on the captured image data; and an output circuit that outputs output image data obtained by performing the processing on the captured image data to an exterior of the imaging element at a second frame rate, wherein the image processing circuit performs cut-out processing with respect to one frame of the captured image data, the cut-out processing including cutting out partial image data indicating an image of a part of the subject in the captured image data from a designated address in the memory, the output image data includes image data based on the partial image data that is
(Continued)

(FLOW OF PROCESSING OF IMAGING APPARATUS ACCORDING TO EMBODIMENT OF TECHNOLOGY OF PRESENT DISCLOSURE)

cut out from the captured image data, and the first frame rate is a frame rate higher than the second frame rate.

18 Claims, 27 Drawing Sheets

(51) Int. Cl.
| | |
|---|---|
| *H04N 5/369* | (2011.01) |
| *H04N 5/345* | (2011.01) |
| *H04N 5/91* | (2006.01) |
| *H04N 5/265* | (2006.01) |
| *H04N 7/01* | (2006.01) |

(52) U.S. Cl.
CPC . *H04N 5/232411* (2018.08); *H04N 5/232945* (2018.08); *H04N 5/2628* (2013.01); *H04N 5/3454* (2013.01); *H04N 5/379* (2018.08)

(58) Field of Classification Search
CPC ......... H04N 5/23241; H04N 5/232411; H04N 5/23293–232945; H04N 5/23296; H04N 5/2628; H04N 5/379
See application file for complete search history.

(56) References Cited

U.S. PATENT DOCUMENTS

| | | | |
|---|---|---|---|
| 2016/0006938 A1 | 1/2016 | Haruki et al. | |
| 2016/0352959 A1* | 12/2016 | Negishi | H04N 1/212 |
| 2016/0381319 A1 | 12/2016 | Nakajima et al. | |
| 2017/0201686 A1* | 7/2017 | Choi | G06F 3/041 |
| 2017/0332027 A1* | 11/2017 | Furumochi | H04N 5/374 |

FOREIGN PATENT DOCUMENTS

| | | |
|---|---|---|
| JP | 2016-15567 A | 1/2016 |
| JP | 2016-136660 A | 7/2016 |
| JP | 2016-225970 A | 12/2016 |
| JP | 2018-7210 A | 1/2018 |
| WO | 2009/098877 A1 | 8/2009 |

OTHER PUBLICATIONS

Written Opinion of the ISA issued in International Application No. PCT/JP2019/025646 dated Aug. 20, 2019.
International Preliminary Report on Patentability issued in International Application No. PCT/JP2019/025646 dated Mar. 17, 2020.

* cited by examiner

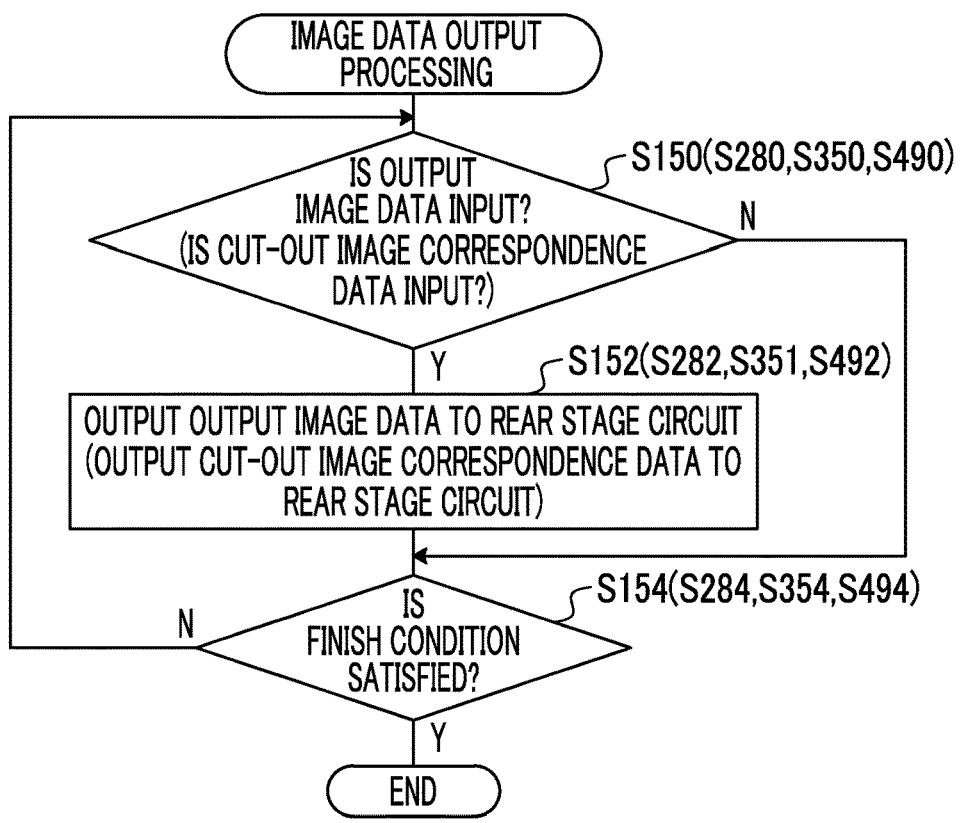
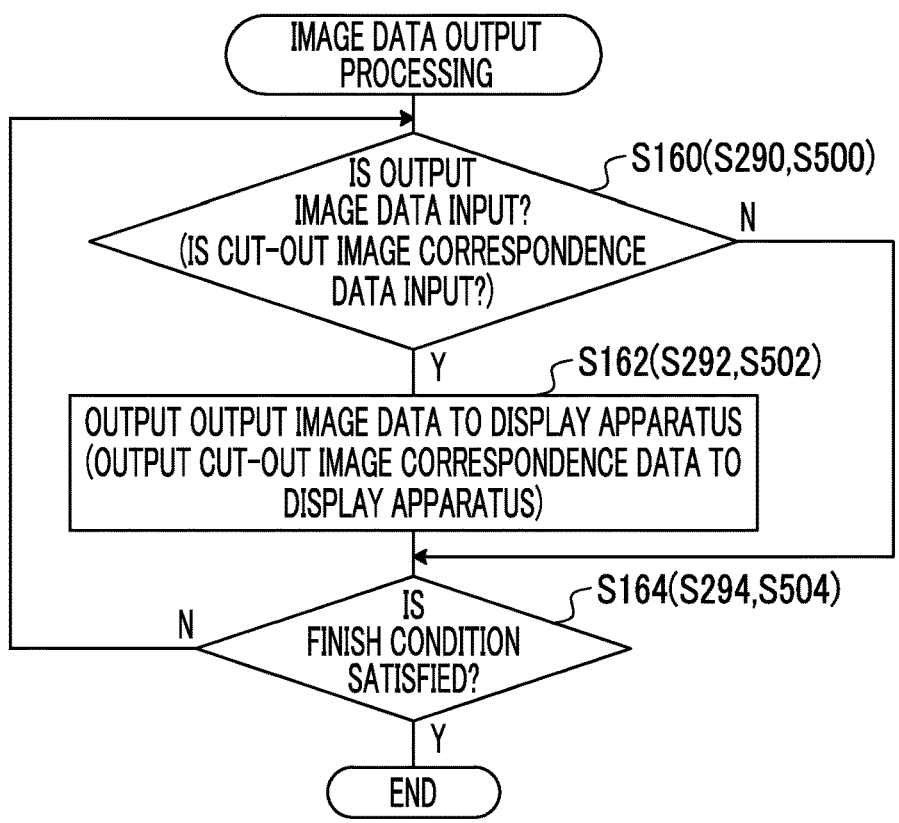

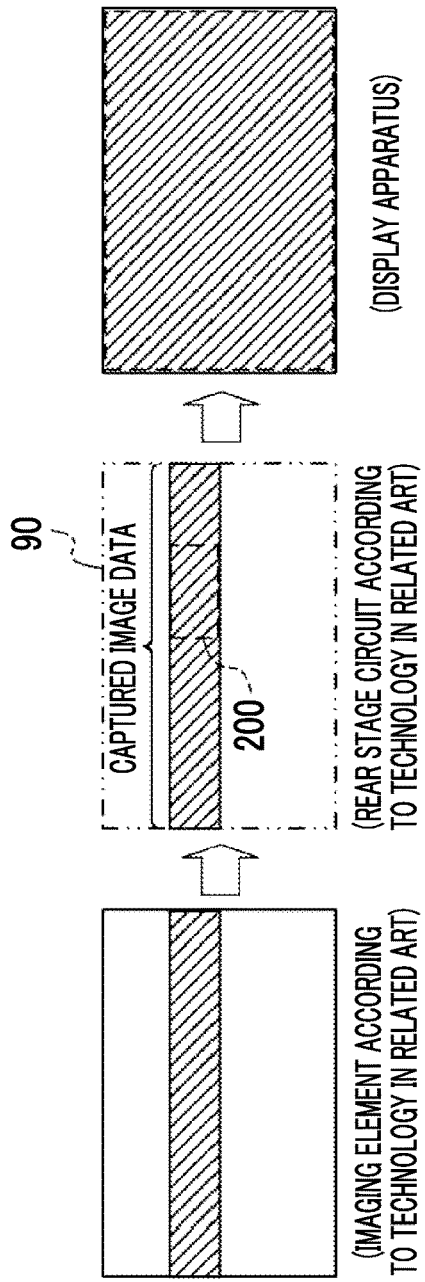
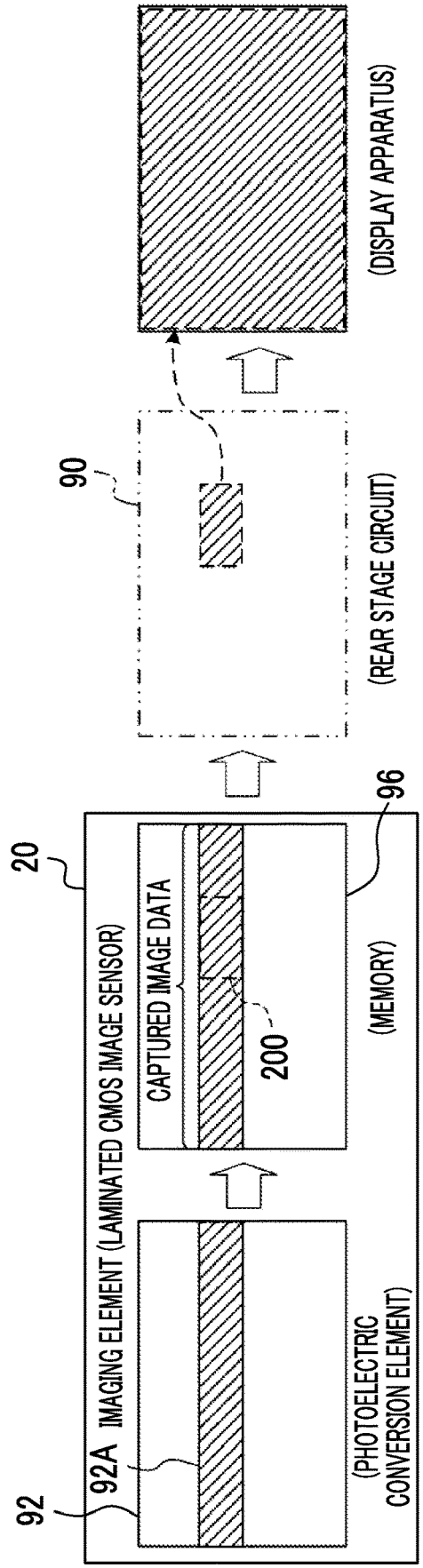

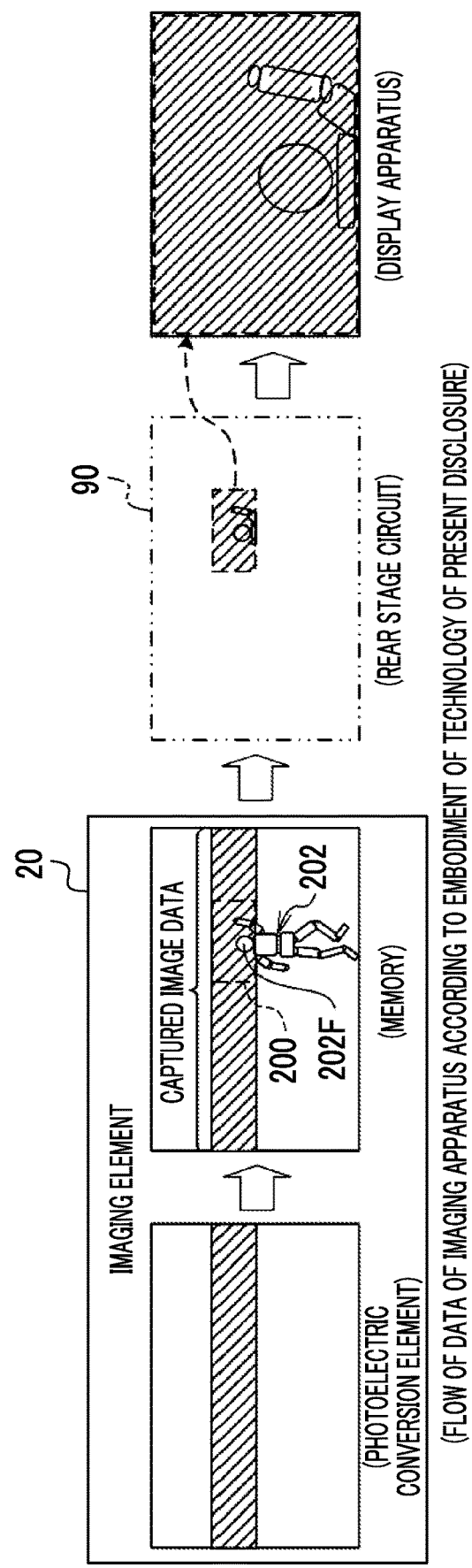

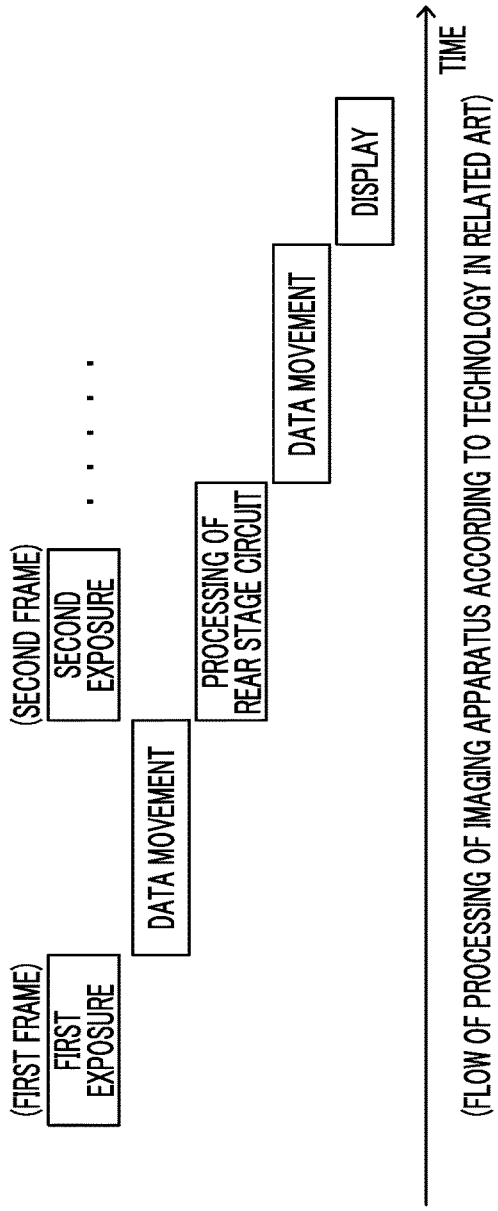
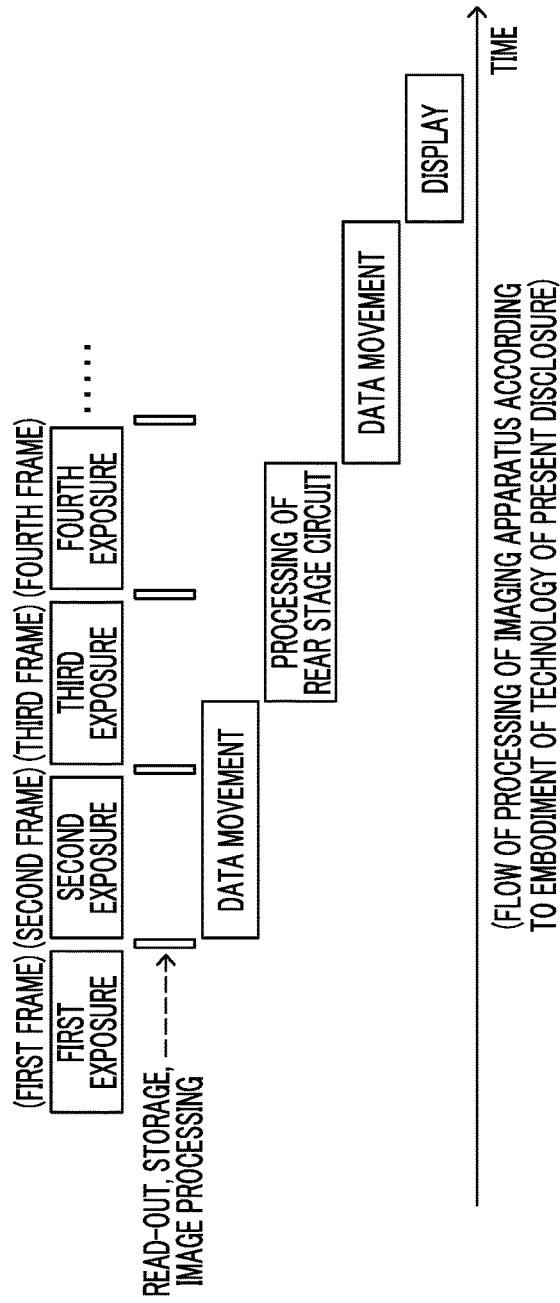

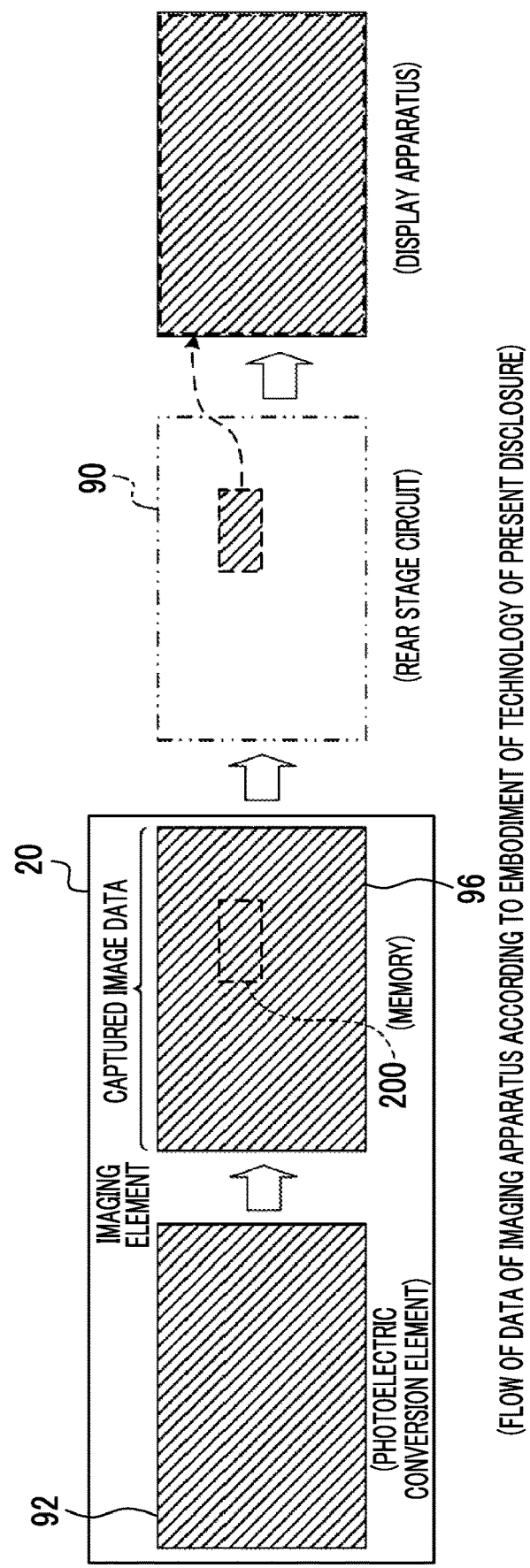

IMAGING ELEMENT, IMAGING APPARATUS, IMAGE DATA PROCESSING METHOD, AND PROGRAM THAT PERFORMS IMAGING IN A FIRST FRAME RATE AND OUTPUTS DATA IN A SECOND FRAME RATE

CROSS-REFERENCE TO RELATED APPLICATIONS

This application is a continuation application of International Application No. PCT/JP2019/025646, filed on Jun. 27, 2019, which is incorporated herein by reference in its entirety. Further, this application claims priority from Japanese Patent Application No. 2018-163996, filed on Aug. 31, 2018, the disclosure of which is incorporated by reference herein in their entirety.

BACKGROUND

Technical Field

The technology of the present disclosure relates to an imaging element, an imaging apparatus, an image data processing method, and a non-transitory program storage medium.

Related Art

JP2016-225970A discloses an imaging apparatus including an imaging element, a signal processing portion that performs predetermined signal processing on image data output from the imaging element, a display portion that displays an image, and a control portion that controls each of the imaging element, the signal processing portion, and the display portion.

The imaging element disclosed in JP2016-225970A comprises a first semiconductor substrate and a second semiconductor substrate that are laminated with each other and are electrically directly connected. An imaging unit that receives and photoelectrically converts an incidence ray, and an AD conversion unit that converts an analog image signal output from the imaging unit into digital image data are disposed in the first semiconductor substrate. A storage unit that stores the digital image data of one frame converted by the AD conversion unit, and a processing unit that performs resizing processing on the digital image data stored in the storage unit are disposed in the second semiconductor substrate. In the imaging element disclosed in JP2016-225970A, the processing unit cuts out image data of a predetermined region from the digital image data of one frame before being stored in the storage unit and stores the cut-out image data in the storage unit.

JP2018-007210A discloses an imaging apparatus including an imaging unit and a control unit. The imaging unit included in the imaging apparatus disclosed in JP2018-007210A comprises a plurality of pixels and outputs a first image signal acquired by a first pixel group of the plurality of pixels and a second image signal acquired by a second image group of the plurality of pixels. The control unit included in the imaging apparatus disclosed in JP2018-007210A performs a first control and a second control. The first control is performing processing based on the second image signal and displaying a first image corresponding to the first image signal on a display screen. The second control is displaying a second image obtained by combining the first image signal with the second image signal on a display screen.

SUMMARY

One embodiment of the present invention provides an imaging element, an imaging apparatus, an image data processing method, and a non-transitory storage medium storing a program capable of reducing power consumption, compared to a case of cutting out partial image data from image data that is output to the outside of an imaging element without passing through a storage portion (i.e., memory), and outputting the partial image data.

A first aspect according to the technology of the present disclosure is an imaging element comprising a memory that stores captured image data obtained by imaging a subject at a first frame rate, the memory being incorporated in the imaging element; an image processing circuit that performs processing on the captured image data, the image processing circuit being incorporated in the imaging element; and an output circuit that outputs output image data obtained by performing the processing on the captured image data to an exterior of the imaging element at a second frame rate, the output circuit being incorporated in the imaging element, wherein the image processing circuit performs cut-out processing with respect to one frame of the captured image data, the cut-out processing including cutting out partial image data indicating an image of a part of the subject in the captured image data from a designated address in the memory, the output image data includes image data based on the partial image data that is cut out from the captured image data as a result of performing the cut-out processing by the image processing circuit, and the first frame rate is a frame rate higher than the second frame rate.

Accordingly, the imaging element of the first aspect according to the technology of the present disclosure can reduce power consumption compared to a case of cutting out the partial image data from image data output to the outside of the imaging element without passing through the storage portion, and outputting the partial image data.

A second aspect according to the technology of the present disclosure is the imaging element according to the first aspect, in which the cut-out processing is processing of cutting out the partial image data from the captured image data stored in the memory by random access to the memory.

Accordingly, the imaging element of the second aspect according to the technology of the present disclosure can quickly cut out the partial image data from the designated address compared to a case where random access to the memory is not available.

A third aspect according to the technology of the present disclosure is the imaging element according to the first aspect or the second aspect, wherein the memory is capable of storing the captured image data of a plurality of frames, the cut-out processing includes processing of cutting out the partial image data of the plurality of frames from the captured image data stored in the memory, and the output portion outputs, as the output image data, image data that is obtained by combining the partial image data of the plurality of frames cut out as a result of performing the cut-out processing by the image processing circuit.

Accordingly, the imaging element of the third aspect according to the technology of the present disclosure can reduce power consumption compared to a case of outputting the captured image data to the outside of the imaging element, cutting out the partial image data of the plurality of frames from the captured image data outside the imaging element, and combining the partial image data of the plurality of frames.

A fourth aspect according to the technology of the present disclosure is the imaging element according to the third aspect, in which the partial image data is at least one of a plurality of pieces of divided region image data corresponding to a plurality of divided regions obtained by dividing the part.

Accordingly, the imaging element of the fourth aspect according to the technology of the present disclosure can reduce power consumption compared to a case of cutting out the partial image data from the captured image data of each of the plurality of frames and combining the cut-out partial image data of the plurality of frames.

A fifth aspect according to the technology of the present disclosure is the imaging element according to the fourth aspect, in which the plurality of pieces of divided region image data have a relationship in which mutually different pixels are thinned out in units of lines.

Accordingly, the imaging element of the fifth aspect according to the technology of the present disclosure can obtain a subject image of high reproducibility compared to a case of thinning out pixels at the same position in units of lines.

A sixth aspect according to the technology of the present disclosure is the imaging element according to the fourth aspect or the fifth aspect, in which the output image data includes combined data obtained by combining the plurality of pieces of divided region image data.

Accordingly, the imaging element of the sixth aspect according to the technology of the present disclosure can provide an image of high image quality compared to a case of outputting the partial image data of a single frame.

A seventh aspect according to the technology of the present disclosure is the imaging element according to the sixth aspect, in which the output circuit selectively outputs, as the partial image data, divided region image data of a part of the plurality of pieces of divided region image data or the combined data in accordance with a provided condition.

Accordingly, the imaging element of the seventh aspect according to the technology of the present disclosure can reduce power consumption compared to a case of outputting the combined data to the outside of the imaging element from the imaging element at all times.

An eighth aspect according to the technology of the present disclosure is the imaging element according to any one of the first aspect to the seventh aspect, wherein the subject is imaged by a photoelectric conversion element, in a case in which an area of the photoelectric conversion element corresponding to the part is designated by designating the part of the subject, the image processing circuit causes the area of the photoelectric conversion element to perform imaging, and the image processing circuit acquires partial image correspondence data corresponding to the partial image data at the first frame rate by performing imaging by the area of the photoelectric conversion element, and outputs image data based on the acquired partial image correspondence data to the exterior of the imaging element at the second frame rate.

Accordingly, the imaging element of the eighth aspect according to the technology of the present disclosure can reduce power consumption compared to a case of imaging the subject using all regions (i.e., the entire area) of the photoelectric conversion element at all times.

A ninth aspect according to the technology of the present disclosure is the imaging element according to any one of the first aspect to the eighth aspect, in which the part includes a plurality of regions in the subject, and the partial image data is a plurality of pieces of region image data indicating the plurality of regions in the captured image data.

Accordingly, the imaging element of the ninth aspect according to the technology of the present disclosure can reduce power consumption even in a case where a cut-out target is present across a plurality of regions of the subject.

A tenth aspect according to the technology of the present disclosure is the imaging element according to any one of the first aspect to the ninth aspect, in which the output image data further includes wide range image data that indicates an image of a range of the subject wider than the part of the subject, and resolution of the wide range image data is lower than resolution of the partial image data.

Accordingly, the imaging element of the tenth aspect according to the technology of the present disclosure can reduce power consumption compared to a case where the resolution of the wide range image data is the same as the resolution of the partial image data.

An eleventh aspect according to the technology of the present disclosure is the imaging element according to the tenth aspect, in which the wide range image data is image data indicating an image of an entirety of the subject.

Accordingly, the imaging element of the eleventh aspect according to the technology of the present disclosure can reduce power consumption compared to a case where resolution of the image data indicating the image of the entirety of the subject is the same as the resolution of the partial image data.

A twelfth aspect according to the technology of the present disclosure is the imaging element according to any one of the first aspect to the eleventh aspect, in which the output image data further includes focusing control image data indicating an image of a range that is a range of the subject wider than the part of the subject and that is a predetermined range as a range required for a focusing control of an imaging apparatus including the imaging element.

Accordingly, even in a case where the focusing control is performed using the focusing control image data, the imaging element of the twelfth aspect according to the technology of the present disclosure can reduce power consumption even compared to a case of generating the focusing control image data outside the imaging element.

A thirteenth aspect according to the technology of the present disclosure is the imaging element according to any one of the first aspect to the twelfth aspect, in which the imaging element is a stacked imaging element that includes a photoelectric conversion element, and in which the photoelectric conversion element is stacked on the memory.

Accordingly, the imaging element of the thirteenth aspect according to the technology of the present disclosure can output image data subjected to image processing in the imaging element to the outside of the imaging element.

A fourteenth aspect according to the technology of the present disclosure is an imaging apparatus comprising the imaging element according to any one of the first aspect to the thirteenth aspect of the technology of the present disclosure, and a display processor that is configured to perform a control for displaying an image based on the output image data output by the image processing circuit on a display in an enlarged manner.

Accordingly, the imaging apparatus of the fourteenth aspect according to the technology of the present disclosure can reduce power consumption compared to a case of cutting out the partial image data from image data output to the outside of the imaging element without passing through the storage portion, and outputting the partial image data.

A fifteenth aspect according to the technology of the present disclosure is an image data processing method of an imaging element in which a memory, an image processing circuit, and an output circuit are incorporated, the image data processing method comprising: storing, by the memory, captured image data obtained by imaging a subject at a first frame rate; performing, by the image processing circuit, processing on the captured image data; outputting, by the output circuit, output image data obtained by performing the processing on the captured image data to an exterior of the imaging element at a second frame rate; and performing, by the image processing circuit, cut-out processing with respect to one frame of the captured image data, the cut-out processing including cutting out partial image data indicating an image of a part of the subject in the captured image data from a designated address in the memory, wherein the output image data includes image data based on the partial image data that is cut out from the captured image data as a result of performing the cut-out processing by the image processing circuit, and the first frame rate is a frame rate higher than the second frame rate.

Accordingly, the image data processing method of the fifteenth aspect according to the technology of the present disclosure can reduce power consumption compared to a case of cutting out the partial image data from image data output to the outside of the imaging element without passing through the storage portion, and outputting the partial image data.

A sixteenth aspect according to the technology of the present disclosure is a non-transitory storage medium storing a program that causes a computer to function as an image processing circuit and an output portion included in an imaging element, and to perform an image data processing, the imaging element incorporating a memory, the image processing circuit, and the output circuit, the image data processing comprising: storing, by the memory, captured image data obtained by imaging a subject at a first frame rate; performing, by the image processing circuit, processing on the captured image data; outputting, by the output circuit, output image data obtained by performing the processing on the captured image data to an exterior of the imaging element at a second frame rate; and performing, by the image processing circuit, cut-out processing with respect to one frame of the captured image data, the cut-out processing including cutting out partial image data indicating an image of a part of the subject in the captured image data from a designated address in the memory, wherein the output image data includes image data based on the partial image data that is cut out from the captured image data as a result of performing the cut-out processing by the image processing circuit, and the first frame rate is a frame rate higher than the second frame rate.

Accordingly, the program of the sixteenth aspect according to the technology of the present disclosure can reduce power consumption compared to a case of cutting out the partial image data from image data output to the outside of the imaging element without passing through the storage portion, and outputting the partial image data.

A seventeenth aspect according to the technology of the present disclosure is an imaging element comprising a memory that stores captured image data obtained by imaging a subject at a first frame rate and is incorporated in the imaging element, a processor that performs processing on the captured image data, outputs output image data obtained by performing the processing on the captured image data to an outside of the imaging element at a second frame rate, and is incorporated in the imaging element, in which the processor performs cut-out processing of cutting out partial image data indicating an image of a part of the subject in the captured image data from a designated address in the memory, the output image data includes image data based on the partial image data that is cut out from the captured image data by performing the cut-out processing by the processor, and the first frame rate is a frame rate higher than the second frame rate.

According to one embodiment of the present invention, an effect of being able to reduce power consumption compared to a case of cutting out the partial image data from the image data output to the outside of the imaging element without passing through the storage portion, and outputting the partial image data is achieved.

BRIEF DESCRIPTION OF THE DRAWINGS

FIG. 8 is a flowchart illustrating one example of a flow of image data output processing according to the first to fourth embodiments.

FIG. 9 is a flowchart illustrating one example of a flow of display control processing according to the first to third embodiments.

FIGS. 11A and 11B are state transition diagrams illustrating one example of a flow of data of the imaging apparatus. FIG. 11A is a state transition diagram illustrating one example of a flow of data of an imaging apparatus according to a technology in the related art. FIG. 11B is a state transition diagram illustrating one example of a flow of data of an imaging apparatus according to an embodiment of the technology of the present disclosure.

FIG. 12 is a state transition diagram illustrating one example of a flow of data of the imaging apparatus according to the embodiment of the technology of the present disclosure.

FIGS. 13A and 13B are state transition diagrams illustrating one example of a flow of processing of the imaging apparatus. FIG. 13A is a state transition diagram illustrating one example of a flow of processing of the imaging apparatus according to the technology in the related art. FIG. 13B is a state transition diagram illustrating one example of a flow of processing of the imaging apparatus according to the embodiment of the technology of the present disclosure.

FIG. 18A is a descriptive diagram for describing a first exposure method of the imaging apparatus according to the first to fourth embodiments. FIG. 18B is a descriptive diagram for describing a second exposure method of the imaging apparatus according to the first to fourth embodiments.

FIG. 19 is a state transition diagram illustrating one example of a flow of data of the imaging apparatus according to the embodiment of the technology of the present disclosure.

DETAILED DESCRIPTION

Hereinafter, one example of an embodiment of an imaging apparatus according to the embodiment of the technology of the present disclosure will be described in accordance with the appended drawings.

First Embodiment

Figure 1:
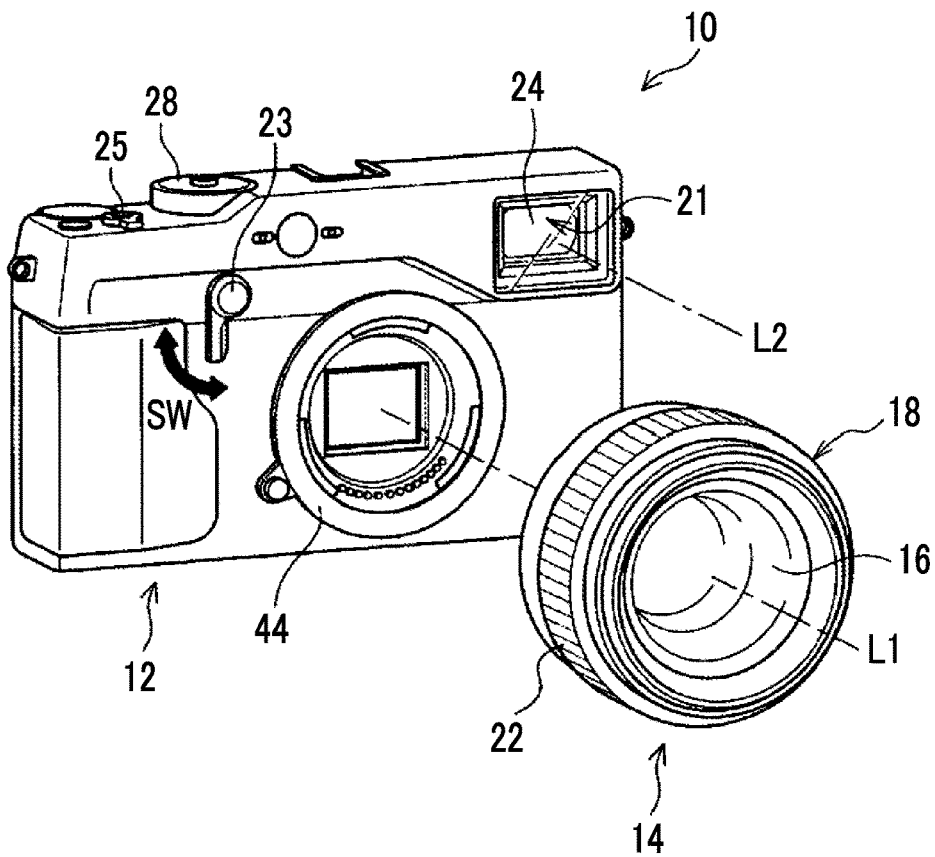
FIG. 1 is a perspective view illustrating one example of an exterior of an imaging apparatus that is an interchangeable lens camera according to first to fourth embodiments.

For example, as illustrated in FIG. 1, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and does not include a reflex mirror. The interchangeable lens 14 includes an imaging lens 18 including a focus lens 16 that is movable in an optical axis direction by a manual operation.

A hybrid finder (registered trademark) 21 is disposed in the imaging apparatus main body 12. For example, the hybrid finder 21 here refers to a finder in which an optical view finder (hereinafter, referred to as the OVF) and an electronic view finder (hereinafter, referred to as the EVF) are selectively used. The abbreviation OVF stands for "Optical View Finder". The abbreviation EVF stands for "Electronic View Finder".

The interchangeable lens 14 is interchangeably mounted on the imaging apparatus main body 12. A focus ring 22 that is used at a time of a manual focus mode is disposed in a lens barrel of the interchangeable lens 14. The focus lens 16 moves in the optical axis direction in accordance with a manual rotation operation of the focus ring 22, and an image of subject light is formed on an imaging element 20 (refer to FIG. 3), described later, at a focal position corresponding to a subject distance.

A finder window 24 of the OVF included in the hybrid finder 21 is disposed on a front surface of the imaging apparatus main body 12. In addition, a finder switching lever (finder switching portion) 23 is disposed on the front surface of the imaging apparatus main body 12. In a case where the finder switching lever 23 is rotationally moved in a direction of an arrow SW, switching is performed between an optical image that is visually recognizable by the OVF, and an electronic image (live view image) that is visually recognizable by the EVF.

An optical axis L2 of the OVF is an optical axis different from an optical axis L1 of the interchangeable lens 14. A release button 25 and a dial 28 for setting such as a mode of an imaging system and a mode of a playback system are disposed on an upper surface of the imaging apparatus main body 12.

The release button 25 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) beyond the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10 according to a first embodiment, an imaging mode and a playback mode are selectively set as an operation mode in accordance with an instruction from a user. In the imaging mode, the manual focus mode and an auto focus mode are selectively set in accordance with an instruction from the user. In the auto focus mode, an imaging condition is adjusted by causing the release button 25 to enter the half push state, and then, exposure is performed in a case where the full push state is subsequently set. That is, after an exposure state is set by an automatic exposure (AE) function by causing the release button 25 to enter the half push state, a focusing control is performed by an auto-focus (AF) function, and imaging is performed in a case where the release button 25 is caused to enter the full push state.

Figure 2:
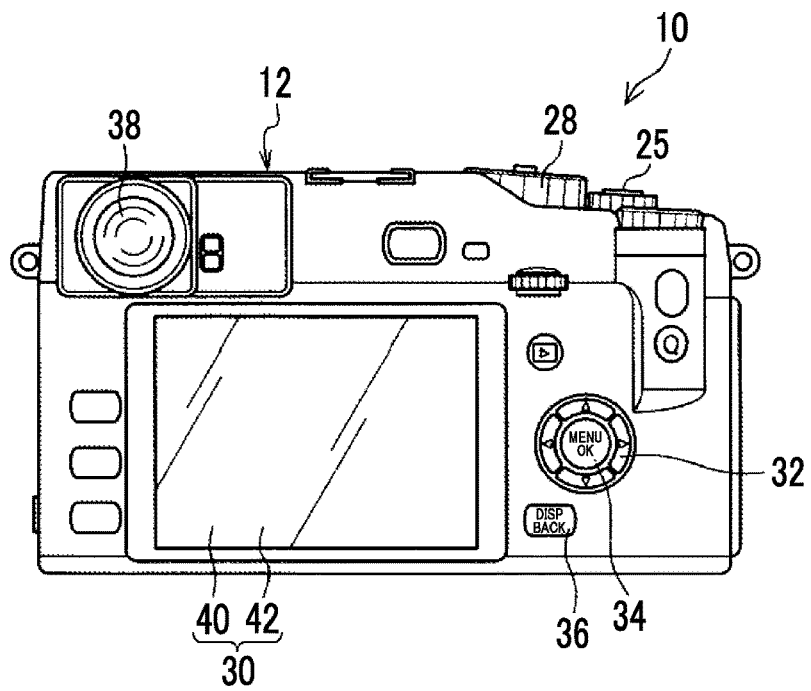
FIG. 2 is a rear view illustrating a rear surface side of the imaging apparatus according to the first to fourth embodiments.

For example, as illustrated in FIG. 2, a touch panel display 30, a cross key 32, a menu key 34, an instruction button 36, and a finder eyepiece portion 38 are disposed on a rear surface of the imaging apparatus main body 12.

The touch panel display 30 comprises a liquid crystal display (hereinafter, referred to as a "first display") 40 and a touch panel 42 (refer to FIG. 3).

The first display 40 displays an image, a text information, and the like. The first display 40 is used for displaying a live view image (live preview image) that is one example of a consecutive frame image obtained by imaging in consecutive frames at a time of the imaging mode. The first display 40 is also used for displaying a still picture that is one example of a single frame image obtained by imaging in a single frame in a case where an instruction to image a still picture is provided. Furthermore, the first display 40 is used for displaying a playback image at a time of the playback mode and/or displaying a menu screen or the like.

The touch panel 42 is a transmissive touch panel and is overlaid on a surface of a display region of the first display 40. The touch panel 42 detects a contact of an instruction object such as a finger or a stylus pen. The touch panel 42 outputs detection result information indicating a detection result (presence or absence of the contact of the instruction object with the touch panel 42) to a predetermined output destination (for example, a CPU 52 (refer to FIG. 3) described later) in a predetermined cycle (for example, 100 milliseconds). In a case where the touch panel 42 detects the contact of the instruction object, the detection result information includes two-dimensional coordinates (hereinafter, referred to as the "coordinates") for specifying a contact position of the instruction object on the touch panel 42. In a case where the touch panel 42 does not detect the contact of the instruction object, the detection result information does not include the coordinates.

The cross key 32 has a function as a multifunction key that outputs various instruction signals for selecting one or a plurality of menus, zooming, and/or frame advance or the like. The menu key 34 is an operation key that has both of a function as a menu button for providing an instruction to display one or a plurality of menus on a screen of the first display 40 and a function as an instruction button for providing an instruction for confirmation, execution, and the like of a selected content. The instruction button 36 is operated in a case of deleting a desired target such as a selected item, canceling a designated content, and returning to an immediately previous operation state.

The imaging apparatus 10 has a still picture imaging mode and a motion picture imaging mode as an operation mode of the imaging system. The still picture imaging mode is an operation mode in which a still picture obtained by imaging a subject by the imaging apparatus 10 is recorded, and the motion picture imaging mode is an operation mode in which a motion picture obtained by imaging the subject by the imaging apparatus 10 is recorded.

Figure 3:
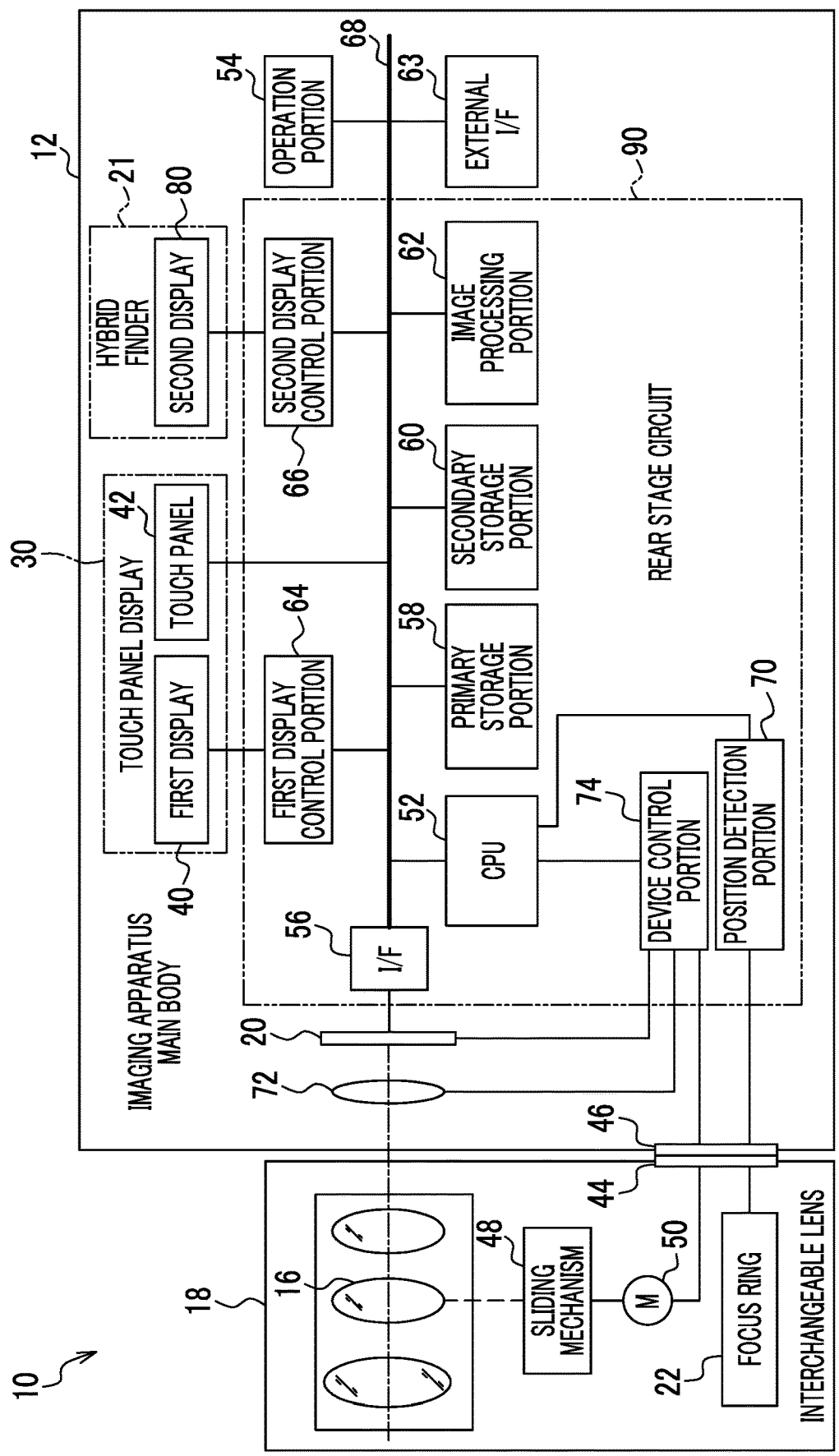
FIG. 3 is a block diagram illustrating one example of a hardware configuration of the imaging apparatus according to the first to fourth embodiments.

For example, as illustrated in FIG. 3, the imaging apparatus 10 includes a mount 46 (refer to FIG. 1) comprised in the imaging apparatus main body 12, and a mount 44 on an interchangeable lens 14 side corresponding to the mount 46. The interchangeable lens 14 is interchangeably mounted on the imaging apparatus main body 12 by joining the mount 44 to the mount 46.

The imaging lens 18 includes a sliding mechanism 48 and a motor 50. The sliding mechanism 48 moves the focus lens 16 along the optical axis L1 by operating the focus ring 22. The focus lens 16 is slidably attached to the sliding mechanism 48 along the optical axis L1. The motor 50 is connected to the sliding mechanism 48, and the sliding mechanism 48 slides the focus lens 16 along the optical axis L1 by receiving motive power of the motor 50.

The motor 50 is connected to the imaging apparatus main body 12 through the mounts 44 and 46, and driving thereof is controlled in accordance with a command from the imaging apparatus main body 12. In the first embodiment, a stepping motor is applied as one example of the motor 50. Accordingly, the motor 50 operates in synchronization with pulse power in accordance with a command from the imaging apparatus main body 12. While an example in which the motor 50 is disposed in the imaging lens 18 is illustrated in the example illustrated in FIG. 3, the technology of the present disclosure is not limited thereto, and the motor 50 may be disposed in the imaging apparatus main body 12.

The imaging apparatus 10 is a digital camera that records the still picture and the motion picture obtained by imaging the subject. The imaging apparatus main body 12 comprises an operation portion 54, an external interface (I/F) 63, and a rear stage circuit 90. The rear stage circuit 90 is a circuit on a side of receiving data transmitted from the imaging element 20. In the first embodiment, an integrated circuit (IC) is employed as the rear stage circuit 90. Large-scale integration (LSI) is illustrated as one example of the IC.

The rear stage circuit 90 includes the central processing unit (CPU) 52, an I/F 56, a primary storage portion 58, a secondary storage portion 60, an image processing portion 62, a first display control portion 64, a second display control portion 66, a position detection portion 70, and a device control portion 74. A single CPU is illustrated as the CPU 52 in the first embodiment. However, the technology of the present disclosure is not limited thereto, and a plurality of CPUs may be employed instead of the CPU 52. That is, various types of processing executed by the CPU 52 may be executed by one processor or a plurality of physically separated processors.

In the first embodiment, each of the image processing portion 62, the first display control portion 64, the second display control portion 66, the position detection portion 70, and the device control portion 74 is implemented by an application specific integrated circuit (ASIC). However, the technology of the present disclosure is not limited thereto. For example, instead of the ASIC, at least one of a programmable logic device (PLD) or a field-programmable gate array (FPGA) may be employed. Alternatively, at least one of the ASIC, the PLD, or the FPGA may be employed. Alternatively, a computer including a CPU, a read only memory (ROM), and a random access memory (RAM) may be employed. The CPU may be a single CPU or a plurality of CPUs. In addition, at least one of the image processing portion 62, the first display control portion 64, the second display control portion 66, the position detection portion 70, or the device control portion 74 may be implemented by a combination of a hardware configuration and a software configuration.

The CPU 52, the I/F 56, the primary storage portion 58, the secondary storage portion 60, the image processing portion 62, the first display control portion 64, the second display control portion 66, the operation portion 54, the external I/F 63, and the touch panel 42 are connected to each other through a bus 68.

The CPU 52 controls the entire imaging apparatus 10. In the imaging apparatus 10 according to the first embodiment, at a time of the auto focus mode, the CPU 52 performs the focusing control by controlling driving of the motor 50 such that a contrast value of the image obtained by imaging is maximized. In addition, at the time of the auto focus mode, the CPU 52 calculates AE information that is a physical quantity indicating brightness of the image obtained by imaging. In a case where the release button 25 is caused to enter the half push state, the CPU 52 derives a shutter speed and an F number corresponding to the brightness of the image indicated by the AE information. The exposure state is set by controlling each related portion to achieve the derived shutter speed and the F number.

The primary storage portion 58 means a volatile memory and refers to, for example, a RAM. The secondary storage portion 60 means a non-volatile memory and refers to, for example, a flash memory or a hard disk drive (HDD).

The operation portion 54 is a user interface that is operated by the user in a case of providing various instructions to the rear stage circuit 90. The operation portion 54 includes the release button 25, the dial 28, the finder switching lever 23, the cross key 32, the menu key 34, and the instruction button 36. Various instructions received by the operation portion 54 are output to the CPU 52 as an operation signal, and the CPU 52 executes processing corresponding to the operation signal input from the operation portion 54.

The position detection portion 70 is connected to the CPU 52. The position detection portion 70 is connected to the focus ring 22 through the mounts 44 and 46, detects a rotation angle of the focus ring 22, and outputs rotation angle information indicating the rotation angle that is a detection result to the CPU 52. The CPU 52 executes processing corresponding to the rotation angle information input from the position detection portion 70.

In a case where the imaging mode is set, image light showing the subject is formed on a light receiving surface of the color imaging element 20 through the imaging lens 18 including the focus lens 16 which is movable by a manual operation, and a mechanical shutter 72.

The device control portion 74 is connected to the CPU 52. In addition, the device control portion 74 is connected to the imaging element 20 and the mechanical shutter 72. Furthermore, the device control portion 74 is connected to the motor 50 of the imaging lens 18 through the mounts 44 and 46.

The device control portion 74 controls the imaging element 20, the mechanical shutter 72, and the motor 50 under control of the CPU 52.

Figure 4:
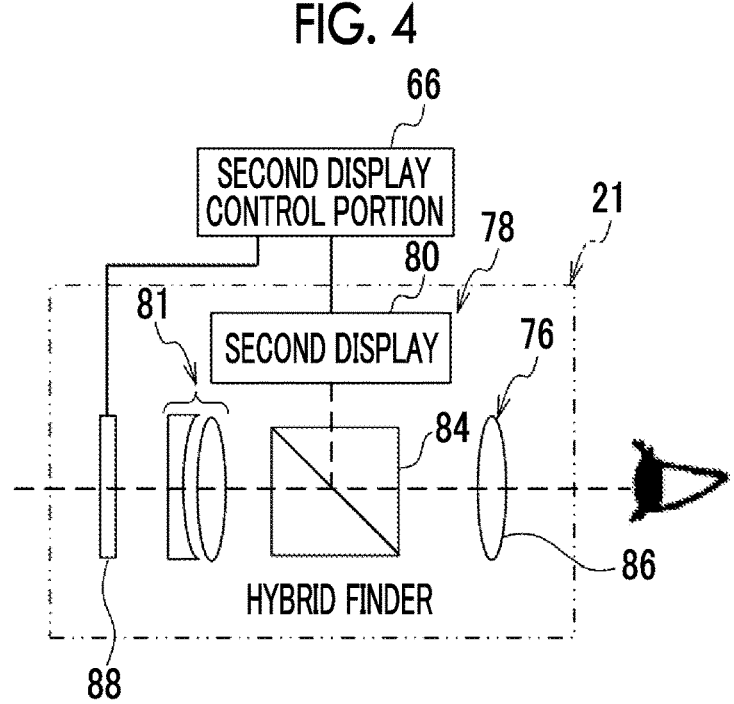
FIG. 4 is a schematic configuration diagram illustrating one example of a configuration of a hybrid finder included in the imaging apparatus according to the first to fourth embodiments.

For example, as illustrated in FIG. 4, the hybrid finder 21 includes an OVF 76 and an EVF 78. The OVF 76 is a reverse Galilean finder including an objective lens 81 and an eyepiece lens 86, and the EVF 78 includes a second display 80, a prism 84, and the eyepiece lens 86.

A liquid crystal shutter 88 is arranged in front of the objective lens 81. The liquid crystal shutter 88 blocks light such that the optical image is not incident on the objective lens 81 in a case of using the EVF 78.

The prism 84 guides the electronic image or various information to be displayed on the second display 80 to the eyepiece lens 86 by reflecting the electronic image or various information, and combines the optical image with the electronic image and/or various information to be displayed on the second display 80.

In a case where the finder switching lever 23 is rotationally moved in the direction of the arrow SW illustrated in FIG. 1, an OVF mode in which the optical image is visually recognizable by the OVF 76 and an EVF mode in which the electronic image is visually recognizable by the EVF 78 are alternately switched each time the finder switching lever 23 is rotationally moved.

In a case of the OVF mode, the second display control portion 66 enables the optical image to be visually recognized from the eyepiece portion by controlling the liquid crystal shutter 88 to enter a non-light blocking state. In a case of the EVF mode, the second display control portion 66 enables only the electronic image displayed on the second display 80 to be visually recognized from the eyepiece portion by controlling the liquid crystal shutter 88 to enter a light blocking state.

Figure 5:
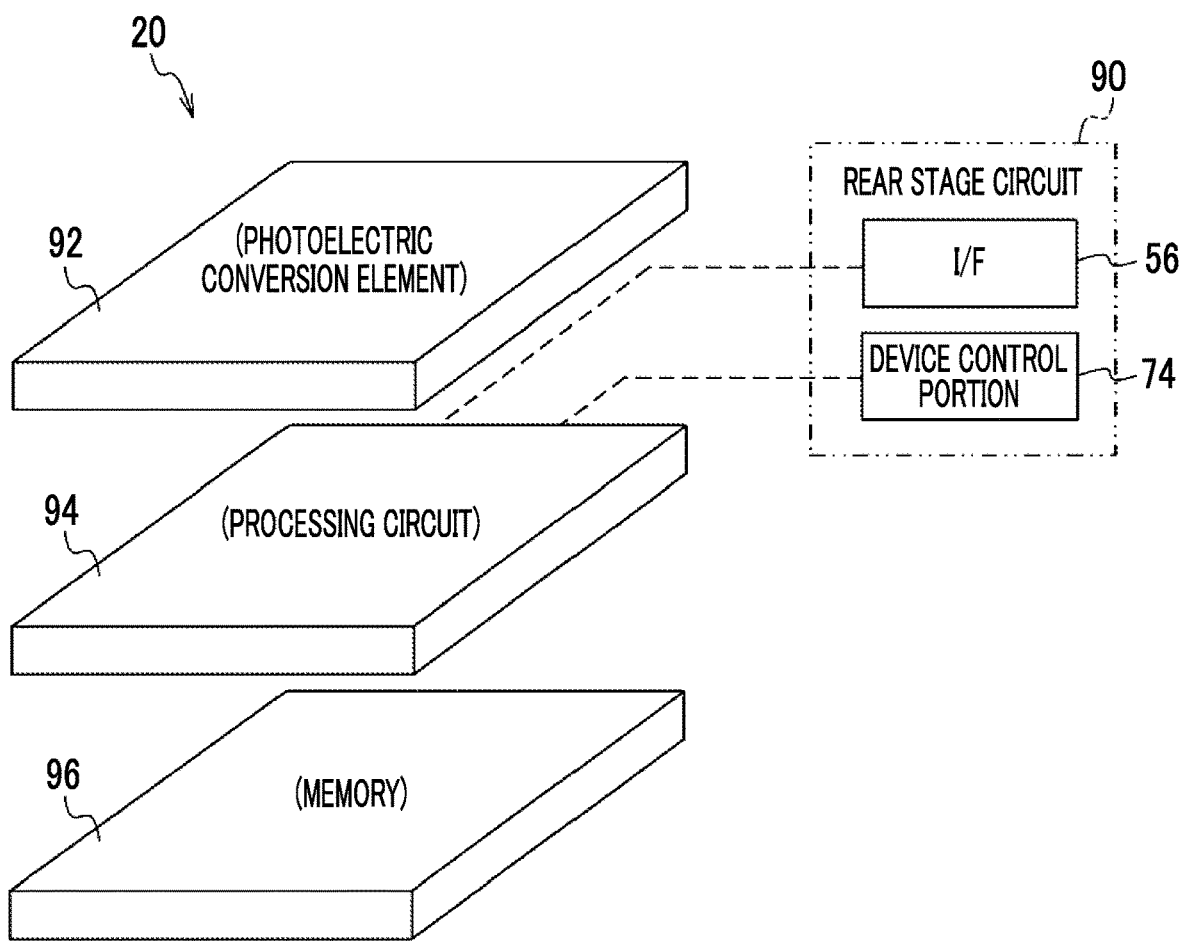
FIG. 5 is a schematic configuration diagram illustrating one example of a schematic configuration of an imaging element included in the imaging apparatus according to the first to fourth embodiments.

The imaging element 20 is one example of a "laminated imaging element" according to the embodiment of the technology of the present disclosure. For example, the imaging element 20 is a complementary metal oxide semiconductor (CMOS) image sensor. For example, as illustrated in FIG. 5, a photoelectric conversion element 92, a processing circuit 94, and a memory 96 are incorporated in the imaging element 20. In the imaging element 20, the photoelectric conversion element 92 is laminated with the processing circuit 94 and the memory 96. The memory 96 is one example of a storage portion according to the embodiment of the technology of the present disclosure.

The processing circuit 94 is, for example, LSI, and the memory 96 is, for example, a RAM. A dynamic random access memory (DRAM) is employed as one example of the memory 96 in the first embodiment. However, the technology of the present disclosure is not limited thereto, and a static random access memory (SRAM) may be used.

The processing circuit 94 is implemented by an ASIC in the first embodiment. However, the technology of the present disclosure is not limited thereto. For example, at least one of a PLD or an FPGA may be employed instead of the ASIC. Alternatively, at least one of the ASIC, the PLD, or the FPGA may be employed. The CPU may be a single CPU or a plurality of CPUs. Alternatively, a computer including a CPU, a ROM, and a RAM may be employed. Alternatively, the processing circuit 94 may be implemented by a combination of a hardware configuration and a software configuration.

The photoelectric conversion element 92 includes a plurality of photosensors arranged in a matrix form. In the first embodiment, photodiodes are employed as one example of the photosensors. Photodiodes of "4896×3265" pixels are illustrated as one example of the plurality of photosensors.

The photoelectric conversion element 92 comprises color filters, and the color filters include a G filter corresponding to green (G) that most contributes to obtaining a brightness signal, an R filter corresponding to red (R), and a B filter corresponding to blue (B). In the first embodiment, the G filter, the R filter, and the B filter are arranged with a predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating all color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated as the imaging element 20, the technology of the present disclosure is not limited thereto. For example, the technology of the present disclosure is also established in a case where the photoelectric conversion elements 92 is a charge coupled device (CCD) image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called shutter speed.

The processing circuit 94 is controlled by the device control portion 74. The processing circuit 94 reads out captured image data that is obtained by imaging the subject by the photoelectric conversion element 92. The "captured image data" here refers to image data indicating the subject. The captured image data is signal electric charges accumulated in the photoelectric conversion element 92. The processing circuit 94 performs analog/digital (A/D) conversion on the captured image data read out from the photoelectric conversion element 92. The processing circuit 94 stores, in the memory 96, the captured image data obtained by performing the A/D conversion on the captured image data. The processing circuit 94 acquires the captured image data from the memory 96 and outputs, to the I/F 56 of the rear stage circuit 90, output image data that is image data based on the acquired captured image data. Hereinafter, for convenience of description, the "output image data that is image data based on the captured image data" will be simply referred to as the "output image data".

The processing circuit 94 performs first processing and second processing on the captured image data. The first processing refers to processing of reading out the captured image data from the photoelectric conversion element 92 and storing the read-out captured image data in the memory 96. The second processing refers to processing of outputting the output image data to the outside of the imaging element 20. For example, the "outside of the imaging element 20" here refers to the I/F 56 of the rear stage circuit 90.

The first processing includes cut-out processing. The cut-out processing refers to processing of cutting out partial image data indicating an image of a part of the subject in the captured image data from a designated address in the memory 96 in a state where the captured image data is stored in the memory 96. The partial image data is at least one of a plurality of pieces of divided region image data corresponding to a plurality of divided regions obtained by dividing a part of the subject.

The "plurality of pieces of divided region image data" here have a relationship in which pixels different from each other are thinned out in units of lines. In the first embodiment, horizontal lines are thinned out in the vertical direction by skipping two lines at a time. However, the technology of the present disclosure is not limited thereto. For example, the horizontal lines may be thinned out in the vertical direction by skipping one line at a time, or the horizontal lines may be thinned out in the vertical direction three or more lines at a time. Vertical lines may be thinned out in the horizontal direction a predetermined number of lines more than or equal to one line at a time. Thinning out may be performed in accordance with a predetermined rule for each pixel or in units of pixel groups of a few pixels.

Figure 10:
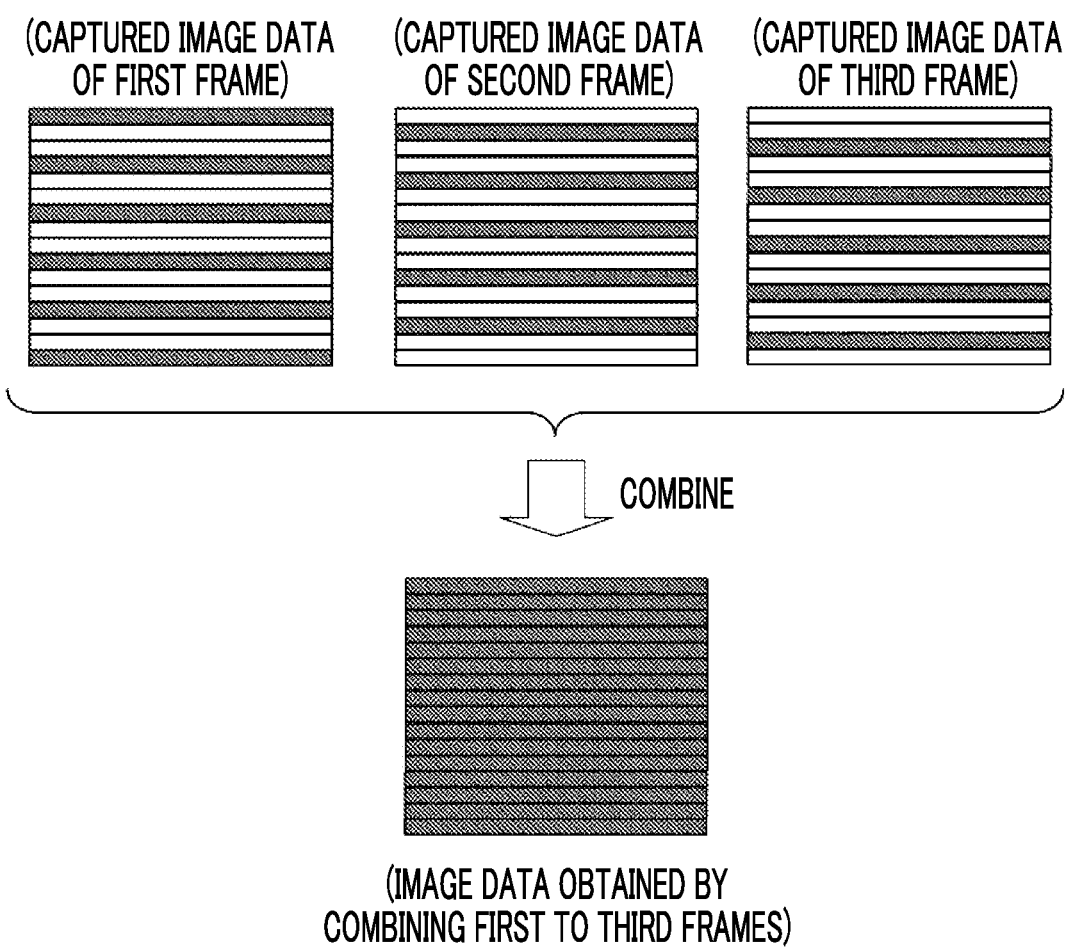
FIG. 10 is a conceptual diagram illustrating one example of a schematic configuration of captured image data and combined data of a first frame to a third frame.
Figure 15:
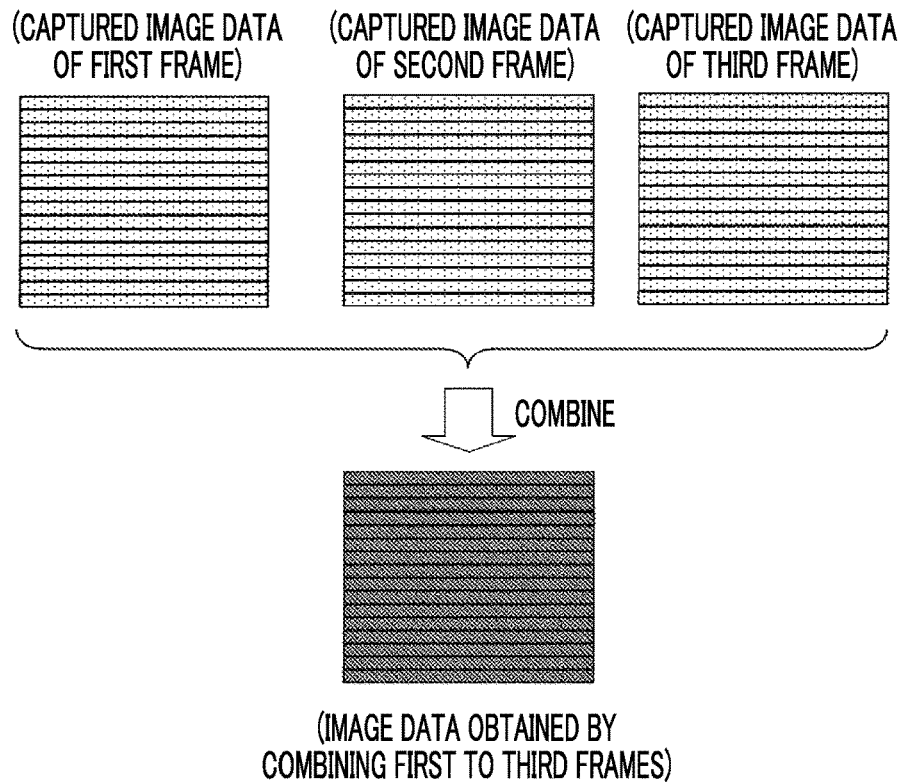
FIG. 15 is a conceptual diagram illustrating a first modification example of the schematic configuration of the captured image data and the combined data of the first frame to the third frame.
Figure 16:
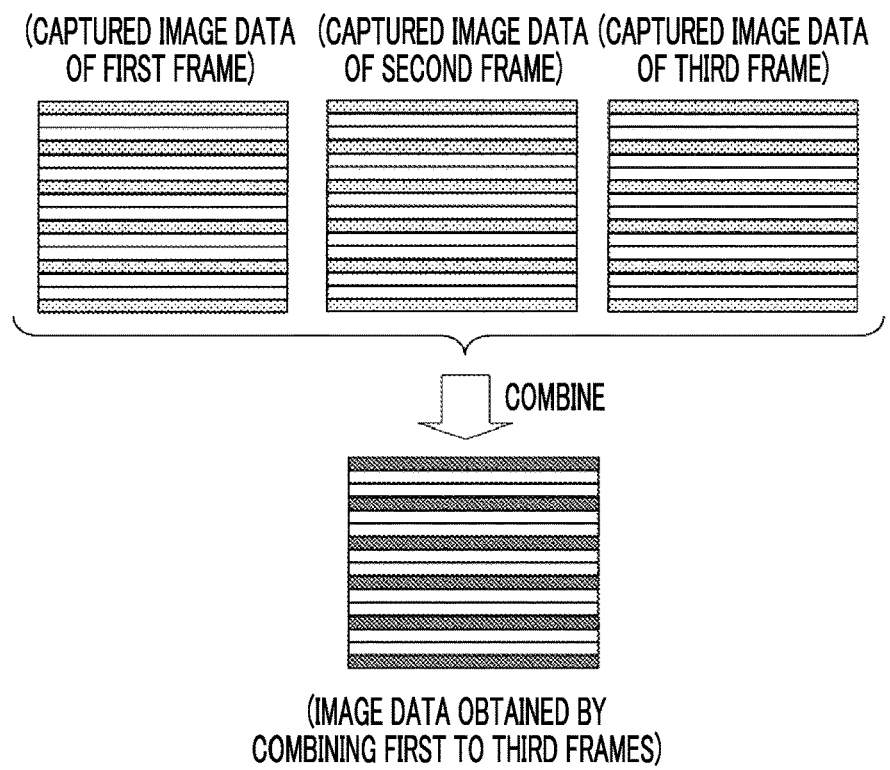
FIG. 16 is a conceptual diagram illustrating a second modification example of the schematic configuration of the captured image data and the combined data of the first frame to the third frame.

As described in detail later, for example, as the "plurality of pieces of divided region image data" here, partial image data 200 (refer to FIGS. 11A and 11B and FIG. 12) obtained from the captured image data of each of a first frame to a third frame illustrated in FIG. 10, FIG. 15, or FIG. 16 is illustrated.

The output image data output from the processing circuit 94 is broadly classified into the partial image data, wide range image data, and focusing control image data. The wide range image data refers to image data indicating an image of a range of the subject wider than the part of the subject related to the partial image data. For example, the wide range image data refers to entirety image data that indicates an image of the entirety of the subject in a range falling within an angle of view imageable by all photodiodes in a partial region 92A (refer to FIGS. 11A and 11B) of the photoelectric conversion element 92. The focusing control image data refers to image data indicating an image of a range that is a range of the subject wider than the part of the subject related to the partial image data and is a predetermined range as a range required for the focusing control of the imaging apparatus 10. For example, the "predetermined range" here refers to a range that is obtained in advance by the CPU 52 by test using an actual apparatus and/or computer simulation or the like as a range which can be used for specifying a focusing state using so-called contrast AF or phase difference AF. In the first embodiment, "all photodiodes" refer to usable photodiodes that do not have defects.

In the imaging element 20, the subject is imaged at a first frame rate. The processing circuit 94 performs the first processing at the first frame rate and performs the second processing at a second frame rate. The first frame rate is a frame rate higher than the second frame rate. In the first embodiment, the second frame rate is 60 frames per second (fps), and the first frame rate is 240 fps. However, the technology of the present disclosure is not limited thereto, and a relationship "second frame rate<first frame rate" may be satisfied. In addition, the first frame rate is a frame rate that is variable in a range of not less than or equal to the second frame rate.

Figure 6:
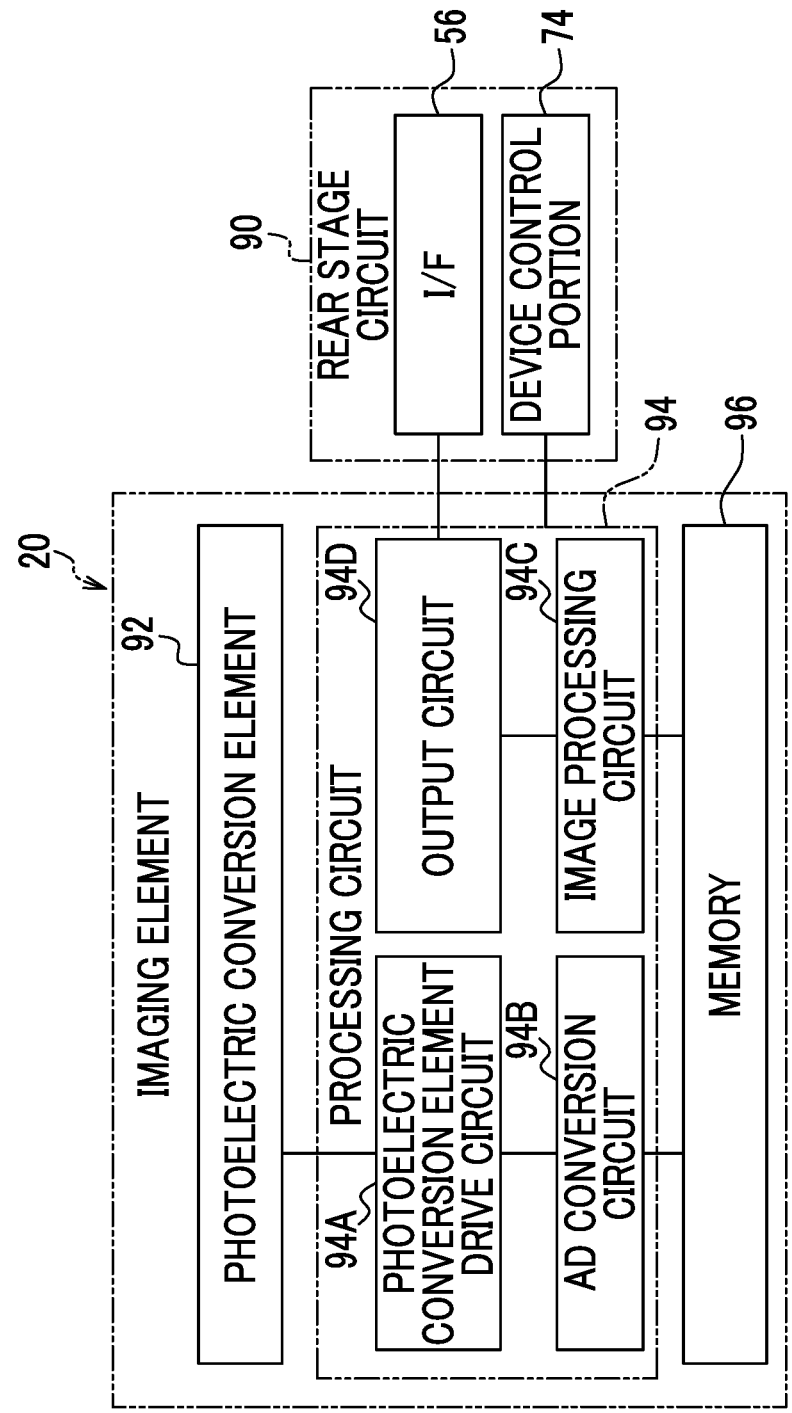
FIG. 6 is a block diagram illustrating one example of a main configuration of the imaging element included in the imaging apparatus according to the first to fourth embodiments.

For example, as illustrated in FIG. 6, the processing circuit 94 includes a photoelectric conversion element drive circuit 94A, an analog-to-digital (AD) conversion circuit 94B, an image processing circuit 94C, and an output circuit 94D and operates under control of the CPU 52. The photoelectric conversion element drive circuit 94A is connected to the photoelectric conversion element 92 and the AD conversion circuit 94B. The memory 96 is connected to the AD conversion circuit 94B and the image processing circuit 94C. The image processing circuit 94C is connected to the output circuit 94D. The output circuit 94D is connected to the I/F 56 of the rear stage circuit 90.

The photoelectric conversion element drive circuit 94A controls the photoelectric conversion element 92 and reads out analog captured image data from the photoelectric conversion element 92 under control of the device control portion 74. The AD conversion circuit 94B digitizes the captured image data read out by the photoelectric conversion element drive circuit 94A and stores the digitized captured image data in the memory 96.

The memory 96 is a memory that can store the captured image data of a plurality of frames. The image processing circuit 94C is one example of a processing portion according to the embodiment of the technology of the present disclosure and performs processing on the captured image data. That is, the image processing circuit 94C cuts out the output image data from the captured image data stored in the memory 96 by random access to the memory 96. The image processing circuit 94C performs necessary signal processing on the cut-out output image data. The "random access" here refers to an access method capable of directly accessing a location in which target data is stored in the memory 96.

The first processing is performed by the photoelectric conversion element drive circuit 94A, the AD conversion circuit 94B, the memory 96, and the image processing circuit 94C. That is, processing in the photoelectric conversion element drive circuit 94A, the AD conversion circuit 94B, the memory 96, and the image processing circuit 94C is performed at the first frame rate.

While an example of a form in which processing in the photoelectric conversion element drive circuit 94A, the AD conversion circuit 94B, the memory 96, and the image processing circuit 94C is performed at the first frame rate is illustratively described here, the technology of the present disclosure is not limited thereto. For example, among reading out by the photoelectric conversion element drive circuit 94A, storage of the captured image data in the memory 96 by the AD conversion circuit 94B, and processing by the image processing circuit 94C, at least storage of the captured image data in the memory 96 by the AD conversion circuit 94B may be performed at the first frame rate.

The output circuit 94D performs the second processing. That is, the output circuit 94D outputs the output image data subjected to the signal processing by the image processing circuit 94C to the I/F 56 of the rear stage circuit 90 at the second frame rate. The output circuit 94D is one example of an "output portion" according to the embodiment of the technology of the present disclosure.

Next, actions of parts of the imaging apparatus 10 according to the embodiment of the technology of the present disclosure will be described.

Hereinafter, for convenience of description, the first display 40 and the second display 80 will be referred to as a "display apparatus" without a reference sign unless otherwise necessary to distinguish therebetween for description. The display apparatus is one example of a "display portion" according to the embodiment of the technology of the present disclosure. In addition, hereinafter, for convenience of description, the first display control portion 64 and the second display control portion 66 will be referred to as a "display control portion" without a reference sign unless otherwise necessary to distinguish therebetween for description. The display control portion is one example of a "control portion" according to the embodiment of the technology of the present disclosure. In addition, hereinafter, for convenience of description, a case of displaying the live view image on the display apparatus will be described.

Figure 7:
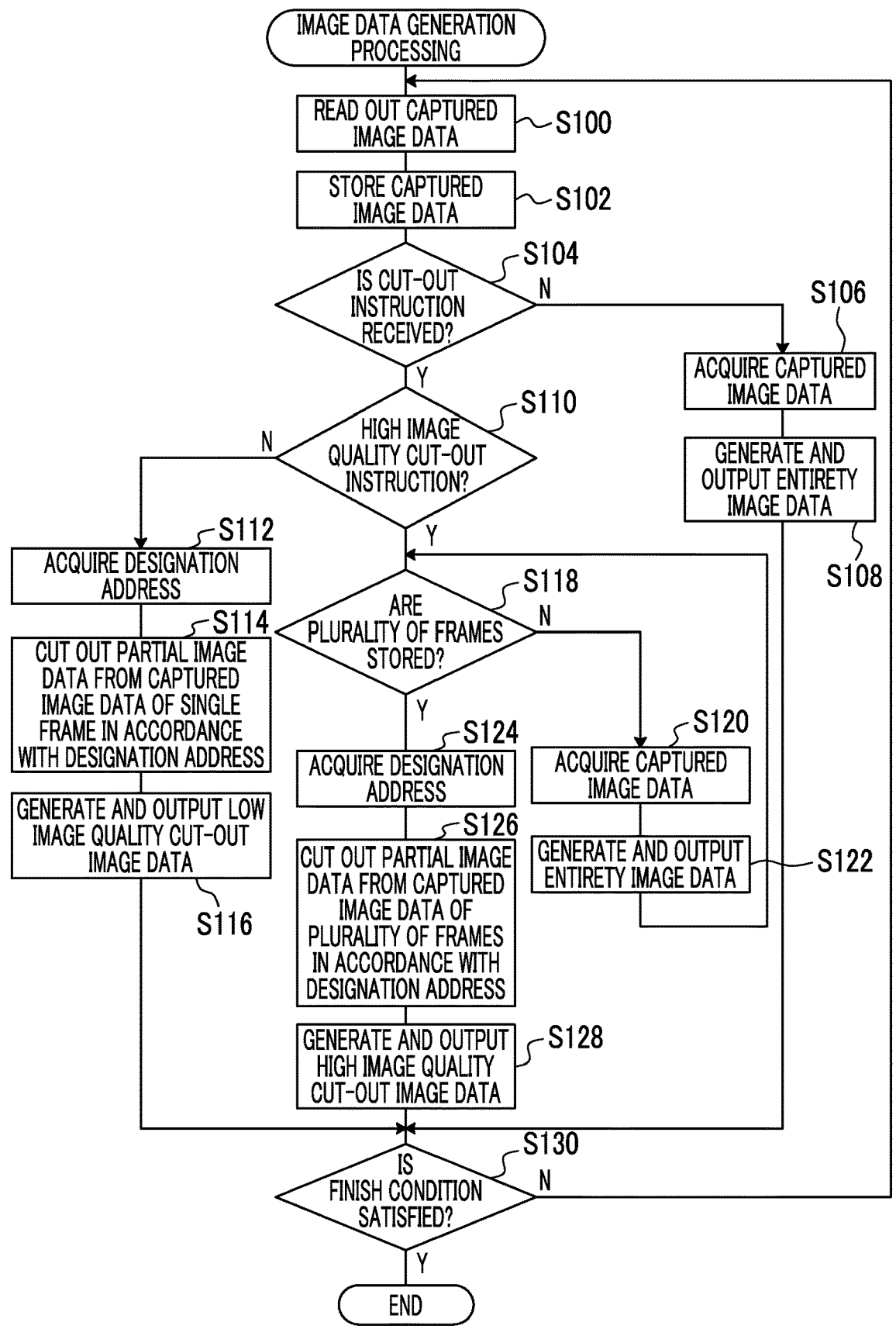
FIG. 7 is a flowchart illustrating one example of a flow of image data generation processing according to the first embodiment.

First, image data generation processing executed by the processing circuit 94 will be described with reference to FIG. 7. The image data generation processing illustrated in FIG. 7 is performed at the first frame rate by the processing circuit 94. Hereinafter, for convenience of description, the memory 96 will be assumed to be a memory capable of storing the captured image data of three frames using a FIFO method.

In the image data generation processing illustrated in FIG. 7, first, in step S100, for example, the photoelectric conversion element drive circuit 94A reads out the captured image data from the partial region 92A of the photoelectric conversion element 92 illustrated in FIGS. 11A and 11B, and then, the image data generation processing transitions to step S102.

For example, the captured image data obtained from the partial region 92A of the photoelectric conversion element 92 by executing processing of step S100 is captured image data obtained by imaging the subject by the partial region 92A of the photoelectric conversion element 92 as illustrated in FIGS. 11A and 11B. While the captured image data obtained by imaging by the partial region 92A is illustrated here for convenience of description, the technology of the present disclosure is not limited thereto. For example, captured image data obtained by imaging the subject by all photodiodes of the photoelectric conversion element 92 may be used, or a captured image obtained by imaging the subject by each of a plurality of locations in the photoelectric conversion element 92 may be used.

For example, the captured image data of one frame read out from the partial region 92A of the photoelectric conversion element 92 by executing processing of step S100 is image data in which the horizontal lines are thinned out in the vertical direction by skipping two lines at a time as illustrated in FIG. 10. In addition, for example, as illustrated in FIG. 10, in a case where a cycle for reading out the captured image data of three frames is one cycle, the captured image data read out from the partial region 92A of the photoelectric conversion element 92 is thinned out by shifting the horizontal lines one line at a time in the vertical direction for each frame in one cycle.

While a state example of the captured image data of the first frame to the third frame is schematically illustrated in the example illustrated in FIG. 10, pixels from a fourth frame are thinned out using the same method as the first frame to the third frame. In addition, while an example of thinning out in a case where one cycle is three frames is illustrated in the example illustrated in FIG. 10 for convenience of description, the technology of the present disclosure is not limited thereto, and thinning out may be performed using the same method even in a case where one cycle is four frames or more.

A method of thinning out for the captured image data is not limited to a method of thinning out the horizontal lines in the vertical direction by shifting one line at a time. For example, a method of thinning out the vertical lines in the horizontal direction by shifting one line at a time may be used, or a method of thinning out in accordance with a predetermined rule in units of a predetermined number of pixels more than or equal to one pixel may be used.

In step S102, the AD conversion circuit 94B digitizes and stores the captured image data read out by the photoelectric conversion element drive circuit 94A in the memory 96, and then, the image data generation processing transitions to step S104.

In step S104, the image processing circuit 94C determines whether or not a cut-out instruction is received by the touch panel 42 and/or the operation portion 54. The cut-out instruction refers to an instruction to cut out the partial image data from the captured image data. The cut-out instruction includes a designation address that is an address in the memory 96 storing the captured image data and can be used for designating a target to be cut out in the captured image data.

In a case where the entirety image in a live view format based on the captured image data is displayed on the display apparatus, an instruction for any location in the entirety image is provided through the touch panel 42 and/or the operation portion 54 by the user, and coordinates of the location of the instruction are converted into an address of the memory 96. The address obtained by conversion is the designation address. In the example illustrated in FIGS. 11A and 11B, a state where the partial image data 200 is specified from the captured image data stored in the memory 96 is illustrated. The partial image data 200 is specified by the designation address included in the cut-out instruction.

A face detection instruction is illustrated as one example of the cut-out instruction. The face detection instruction refers to an instruction to perform a face detection function. The face detection function is a function of detecting a face of a person who is the subject from the captured image data, and is implemented by the image processing circuit 94C. For example, as illustrated in FIG. 12, an address of a rectangular region including a face 202F of a person 202 who is the subject in the captured image data is specified as an address of the target to be cut out, and the partial image data 200 is specified in accordance with the specified address.

While face detection is illustrated here, a pupil detection function of detecting a pupil of the person who is the subject may be performed. By performing the face detection function and/or the pupil detection function, a region of a size designated as the target to be cut out from a center of the face of the person who is the subject is decided based on a face detection result and/or a pupil detection result. Thus, even in a case where the person who is the subject moves, the CPU 52 can perform AF by following a motion of the person. In addition, by performing the face detection on the memory 96 and calculating center coordinates of the face of the person, the display apparatus can perform displaying in display control processing described later with a smaller time lag in adjustment of an angle of view than in a case of not performing the face detection and/or the pupil detection. Furthermore, an enlargement ratio of the partial image data 200 may be changed based on the face detection result and/or the pupil detection result.

In step S104, in a case where the cut-out instruction is received by the touch panel 42 and/or the operation portion 54, a positive determination is made, and the image data generation processing transitions to step S110. In step S104, in a case where the cut-out instruction is not received by the touch panel 42 and/or the operation portion 54, a negative determination is made, and the image data generation processing transitions to step S106.

In step S106, the image processing circuit 94C acquires the captured image data from the memory 96, and then, the image data generation processing transitions to step S108.

In step S108, the image processing circuit 94C generates the entirety image data based on the captured image data acquired in step S106 and outputs the generated entirety image data to the output circuit 94D, and then, the image data generation processing transitions to step S130. The entirety image data generated by executing processing of step S108 is one type of image data included in the output image data.

The cut-out instruction received by the touch panel 42 and/or the operation portion 54 in step S104 is broadly classified into a low image quality cut-out instruction and a high image quality cut-out instruction. The low image quality cut-out instruction refers to an instruction to cut out a low image quality cut-out image, and the high image quality cut-out instruction refers to an instruction to cut out a high image quality cut-out image. The high image quality cut-out image has higher image quality than the low image quality cut-out image. For example, the low image quality cut-out image refers to image data in which the horizontal lines are thinned out in the vertical direction by skipping two lines at a time as illustrated in FIG. 10. Meanwhile, for example, the high image quality cut-out image refers to combined data obtained by combining the captured image data of three frames, that is, non-thinned image data, as illustrated in FIG. 10.

In step S110, the image processing circuit 94C determines whether or not the cut-out instruction received by the touch panel 42 and/or the operation portion 54 in step S104 is the high image quality cut-out instruction. In step S110, in a case where the cut-out instruction received by the touch panel 42 and/or the operation portion 54 in step S104 is not the high image quality cut-out instruction, that is, in a case where the cut-out instruction is the low image quality cut-out instruction, a negative determination is made, and a transition is made to step S112. In step S110, in a case where the cut-out instruction received by the touch panel 42 and/or the operation portion 54 in step S104 is the high image quality cut-out instruction, a positive determination is made, and a transition is made to step S118.

In step S112, the image processing circuit 94C acquires the designation address from the cut-out instruction received in step S104, and then, the image data generation processing transitions to step S114.

In step S114, the image processing circuit 94C cuts out the partial image data from the captured image data of a single frame of the captured image data in the memory 96 in accordance with the designation address acquired in step S112, and then, the image data generation processing transitions to step S116. For example, the captured image data of the single frame as a cut-out target for the partial image data is the captured image data least recently stored in the memory 96. However, the technology of the present disclosure is not limited thereto. For example, in a case where the captured image data of a plurality of frames is stored in the memory 96, the captured image data of the single frame as the cut-out target for the partial image data may be any captured image data in the captured image data of the plurality of frames stored in the memory 96.

While the captured image data of the single frame is used as the captured image data of the cut-out target, for example, combined data obtained by combining the captured image data of two frames in the captured image data of the first to third frames illustrated in FIG. 10 may be used as the cut-out target. That is, in a case where the combined data obtained by combining the captured image data of three frames is defined as high image quality cut-out image data, the captured image data of one frame may be used as the captured image data of the cut-out target, or the combined data obtained by combining the captured image data of two frames may be used as the cut-out target.

In step S116, the image processing circuit 94C generates and outputs low image quality cut-out image data to the output circuit 94D, and then, the image data generation processing transitions to step S130. The partial image data cut out in step S114 is employed as the low image quality cut-out image data. However, the technology of the present disclosure is not limited thereto. For example, the low image quality cut-out image data may be image data obtained by performing various types of image processing on the partial image data cut out in step S114. The low image quality cut-out image data generated by executing processing of step S116 is one type of image data included in the output image data.

In step S118, the image processing circuit 94C determines whether or not the captured image data of a plurality of frames is stored in the memory 96. In step S118, three frames are employed as one example of the plurality of frames. In step S118, in a case where the captured image data of the plurality of frames is not stored in the memory 96, a negative determination is made, and a transition is made to step S120. In step S118, in a case where the captured image data of the plurality of frames is stored in the memory 96, a positive determination is made, and a transition is made to step S124.

In step S120, the image processing circuit 94C acquires the captured image data from the memory 96, and then, the image data generation processing transitions to step S122.

In step S122, the image processing circuit 94C generates the entirety image data based on the captured image data acquired in step S120 and outputs the generated entirety image data to the output circuit 94D, and then, the image data generation processing transitions to step S118. The entirety image data generated by executing processing of step S122 is one type of image data included in the output image data.

In step S124, the image processing circuit 94C acquires the designation address from the cut-out instruction received in step S104, and then, the image data generation processing transitions to step S126.

In step S126, the image processing circuit 94C cuts out the partial image data from the captured image data of each of the plurality of frames of the captured image data in the memory 96 in accordance with the designation address acquired in step S124, and then, the image data generation processing transitions to step S128.

For example, the captured image data of the plurality of frames as the cut-out target for the partial image data is the captured image data of all frames currently stored in the memory 96, that is, the captured image data of three frames. However, the technology of the present disclosure is not limited thereto. In a case where the captured image data of one frame is defined as the low image quality cut-out image data, the combined data obtained by combining the captured image data of two frames may be used as the cut-out target.

In step S128, the image processing circuit 94C generates and outputs the high image quality cut-out image data to the output circuit 94D, and then, the image data generation processing transitions to step S130. For example, the combined data obtained by combining the partial image data of three frames cut out in step S126 as illustrated in FIG. 10 is employed as the high image quality cut-out image data. However, the technology of the present disclosure is not limited thereto. For example, the high image quality cut-out image data may be image data obtained by performing various types of image processing on the combined data obtained by combining the partial image data of three frames cut out in step S126. The high image quality cut-out image data generated by executing processing of step S128 is one type of image data included in the output image data.

In step S130, the image processing circuit 94C determines whether or not an image data generation processing finish condition that is a condition for finishing the image data generation processing is satisfied. For example, a condition that an instruction to finish the image data generation processing is received by the touch panel 42 and/or the operation portion 54 is illustrated as the image data generation processing finish condition. In addition, for example, a condition that a time period in which a positive determination is not made in step S104 from a start of the image data generation processing exceeds a predetermined time period is illustrated as the image data generation processing finish condition. For example, the "predetermined time period" here is five minutes. The predetermined time period may be a fixed value or a variable value that can be changed in accordance with an instruction provided from the user.

In step S130, in a case where the image data generation processing finish condition is not satisfied, a negative determination is made, and the image data generation processing transitions to step S100. In step S130, in a case where the image data generation processing finish condition is satisfied, a positive determination is made, and the processing circuit 94 finishes the image data generation processing.

Next, image data output processing executed by the output circuit 94D of the processing circuit 94 will be described with reference to FIG. 8. The image data output processing illustrated in FIG. 8 is performed at the second frame rate by the output circuit 94D.

In the image data output processing illustrated in FIG. 8, first, in step S150, the output circuit 94D determines whether or not the output image data is input from the image processing circuit 94C. Image data that includes at least one of the entirety image data, the high image quality cut-out image data, or the low image quality cut-out image data output by the image data generation processing illustrated in FIG. 7 is illustrated as one example of the output image data input into the output circuit 94D from the image processing circuit 94C.

In step S150, in a case where the output image data is not input from the image processing circuit 94C, a negative determination is made, and a transition is made to step S154. In step S150, in a case where the output image data is input from the image processing circuit 94C, a positive determination is made, and a transition is made to step S152.

In step S152, the output circuit 94D outputs the output image data to the I/F 56 of the rear stage circuit 90 and then, transitions to step S154. For example, the I/F 56 outputs the output image data input from the output circuit 94D to the CPU 52 and the image processing portion 62 through the bus 68.

In step S154, the output circuit 94D determines whether or not an image data output processing finish condition that is a condition for finishing the image data output processing is satisfied. For example, the image data output processing finish condition is the same condition as the image data generation processing finish condition.

In step S154, in a case where the image data output processing finish condition is not satisfied, a negative determination is made, and the image data output processing transitions to step S150. In step S154, in a case where the image data output processing finish condition is satisfied, a positive determination is made, and the output circuit 94D finishes the image data output processing.

Next, the display control processing executed by the display control portion of the rear stage circuit 90 will be described with reference to FIG. 9. For convenience of description, it is assumed that the output image data is output to the rear stage circuit 90 from the output circuit 94D by executing the image data output processing illustrated in FIG. 8, and that the output image data is input into the CPU 52 and the image processing portion 62. In addition, hereinafter, for convenience of description, the high image quality cut-out image data and the low image quality cut-out image data will be referred to as "cut-out image data" unless otherwise necessary to distinguish therebetween for description. In addition, the high image quality cut-out image indicated by the high image quality cut-out image data and the low image quality cut-out image indicated by the low image quality cut-out image data will be referred to as a "cut-out image" unless otherwise necessary to distinguish therebetween for description.

In the display control processing illustrated in FIG. 9, in step S160, the display control portion determines whether or not the output image data is input from the image processing portion 62. In step S160, in a case where the output image data is not input from the image processing portion 62, a negative determination is made, and the display control processing transitions to step S164. In step S160, in a case where the output image data is input from the image processing portion 62, a positive determination is made, and the display control processing transitions to step S162.

In step S162, the display control portion outputs the output image data to the display apparatus as graphics data, and then, the display control processing transitions to step S164. In a case where the output image data is output to the display apparatus by executing processing of step S162, the display apparatus displays an image indicated by the output image data. For example, in a case where the entirety image data is included in the output image data, the display apparatus displays the entirety image indicated by the entirety image data. The "entirety image" here refers to an image showing the entirety of the subject in the range falling within the angle of view imageable by all photodiodes in the partial region 92A of the photoelectric conversion element 92.

For example, in a case where the cut-out image data is included in the output image data, the display apparatus displays the cut-out image indicated by the cut-out image data as illustrated in FIGS. 11A and 11B and FIG. 12.

Figure 14:
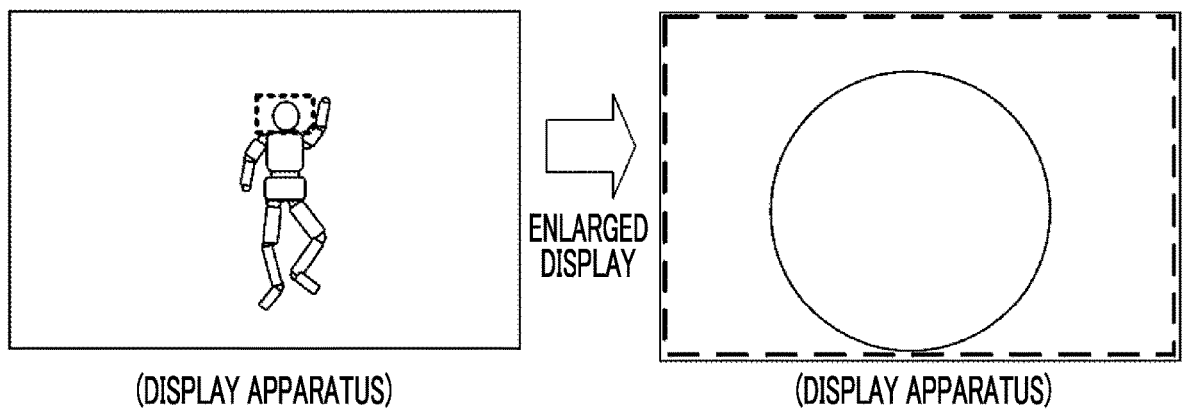
FIG. 14 is a conceptual diagram illustrating a state example in which an image showing a face region of a person who is a subject is displayed in an enlarged manner after the face region is detected.

For example, in a case where an enlarged display instruction is received by the touch panel 42 and/or the operation portion 54, the display apparatus displays the cut-out image in an enlarged manner as illustrated in FIG. 14.

The cut-out image is any of the high image quality cut-out image and the low image quality cut-out image. For example, the high image quality cut-out image is an image based on the combined data obtained by combining the captured image data of three frames as illustrated in FIG. 10. Meanwhile, the low image quality cut-out image is a thinned image based on the captured image data of one frame. The entirety image is also a thinned image based on the captured image data of one frame. Thus, image quality of the image displayed on the display apparatus is such that the high image quality cut-out image has higher image quality than the low image quality cut-out image and the entirety image.

It is not necessary to display the same image on both of the first display 40 and the second display 80. For example, the entirety image may be displayed on one of the first display 40 and the second display 80, and the cut-out image may be displayed on the other together with the entirety image. Alternatively, the cut-out image may be displayed without displaying the entirety image. In a case of displaying the cut-out image on the display apparatus together with the entirety image, first to third display methods are considered.

The first display method refers to a display method of arranging and displaying the entirety image and the cut-out image. The second display method refers to a display method of displaying by superimposing one of the entirety image and the cut-out image on the other. The third display method refers to a display method of displaying by embedding one of the entirety image and the cut-out image in a display region of the other.

In step S164, the display control portion determines whether or not a display control processing finish condition that is a condition for finishing the display control processing is satisfied. For example, the display control processing finish condition is the same condition as the image data generation processing finish condition.

In step S164, in a case where the display control processing finish condition is not satisfied, a negative determination is made, and the display control processing transitions to step S160. In step S164, in a case where the display control processing finish condition is satisfied, a positive determination is made, and the display control portion finishes the display control processing.

For example, by executing the image data generation processing illustrated in FIG. 7, the image data output processing illustrated in FIG. 8, and the display control processing illustrated in FIG. 9, the live view image is displayed on the display apparatus under control of the display control portion. The "live view image" here refers to an image in a live view format, that is, a live preview image, based on the output image data including at least one of the cut-out image data or the entirety image data. In the imaging apparatus 10 according to the first embodiment, the live view image is displayed at the second frame rate.

The imaging apparatus 10 according to the first embodiment is different from an imaging apparatus according to a technology in the related art in that a laminated CMOS image sensor is employed as the imaging element 20. That is, in an imaging element according to the technology in the related art, the laminated CMOS image sensor is not employed. Thus, in the imaging apparatus according to the technology in the related art, for example, as illustrated in FIG. 11A, the captured image data obtained by imaging the subject by the imaging element is output to the rear stage circuit 90, and the partial image data 200 is cut out from the captured image data by the rear stage circuit 90. An image based on the cut-out partial image data 200 is displayed on the display apparatus.

Meanwhile, in the imaging apparatus 10 according to the first embodiment, the laminated CMOS image sensor is employed as the imaging element 20. Thus, for example, as illustrated in FIG. 11B, the captured image data is temporarily stored in the memory 96 incorporated in the imaging element 20, and the partial image data 200 is cut out by random access to the memory 96. Image data based on the cut-out partial image data 200 is output to the rear stage circuit 90. That is, a data amount output to the rear stage circuit 90 from the imaging element 20 according to the first embodiment is smaller than a data amount output to the rear stage circuit 90 from the imaging element of the imaging apparatus according to the technology in the related art. Thus, the imaging apparatus 10 according to the first embodiment can reduce power consumption accompanied by output of the image data compared to the imaging apparatus according to the technology in the related art.

Since the partial image data 200 is cut out in the rear stage circuit 90, for example, it is necessary to move the captured image data of the first frame to the rear stage circuit 90 after first exposure for obtaining the captured image data of the first frame is finished as illustrated in FIG. 13A. The captured image data is moved to the rear stage circuit 90 from the imaging element at the second frame rate.

Meanwhile, for example, as illustrated in FIG. 13B, in the imaging apparatus 10, image processing such as read-out of the captured image data, storage of the captured image data in the memory 96, and cut-out of the partial image data 200 is performed at the first frame rate in the imaging element 20. Even in the imaging apparatus 10, the captured image data is moved to the rear stage circuit 90 from the imaging element 20 at the second frame rate.

However, in the imaging apparatus 10, at least imaging processing from read-out of the captured image data to cut-out or the like is performed at the first frame rate. Thus, for example, as illustrated in FIG. 13B, the imaging apparatus 10 can perform more processing in the imaging element 20 than the imaging apparatus according to the technology in the related art even during movement of the output image data to the rear stage circuit 90. In the example illustrated in FIG. 13B, second exposure and image processing from read-out of the captured image data of the second frame obtained by the second exposure to cut-out or the like are performed during movement of the output image data of the first frame to the rear stage circuit 90 from the imaging element 20.

In addition, in the imaging apparatus 10, for example, as illustrated in FIG. 10, the captured image data of the plurality of frames is stored in the memory 96 in the imaging element 20. Thus, the processing circuit 94 can output combined data obtained by combining the captured image data of the plurality of frames to the rear stage circuit 90.

In the example illustrated in FIG. 10, the captured image data of each of three consecutive frames is image data obtained by thinning out the horizontal lines in the vertical direction by shifting one line at a time. However, the technology of the present disclosure is not limited thereto. For example, as illustrated in FIG. 15, image data obtained by not thinning out the captured image data of each of three consecutive frames may be used. In this case, for example, the amount of electric charges per line of the horizontal lines used for exposure in the photoelectric conversion element 92 is ⅓ of the amount of electric charges per line of the horizontal lines used for exposure for obtaining the captured image data of each frame illustrated in FIG. 10. Accordingly, even in a case of the example illustrated in FIG. 15, the output image data that can implement the same image quality as in a case of the example illustrated in FIG. 10 is obtained by combining the captured image data of the first frame to the third frame.

Here, "⅓ of the amount of electric charges per line of the horizontal lines used for exposure for obtaining the captured image data of each frame" corresponds to a ratio of the amount of electric charges obtained by exposure using a second exposure method described later, to the amount of electric charges obtained by exposure using a first exposure method described later.

Figure 18A:
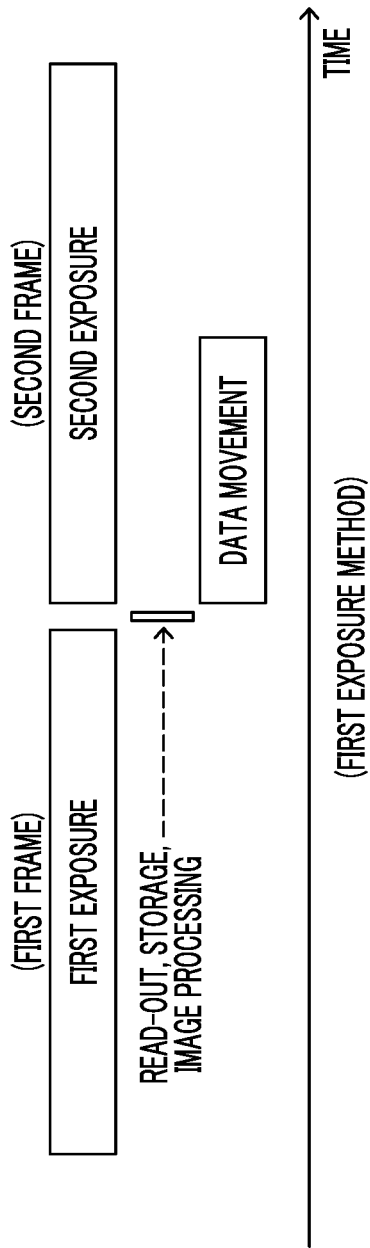
FIGS. 18A and 18B are descriptive diagrams for describing an exposure method of the imaging apparatus according to the first to fourth embodiments.
Figure 18B:
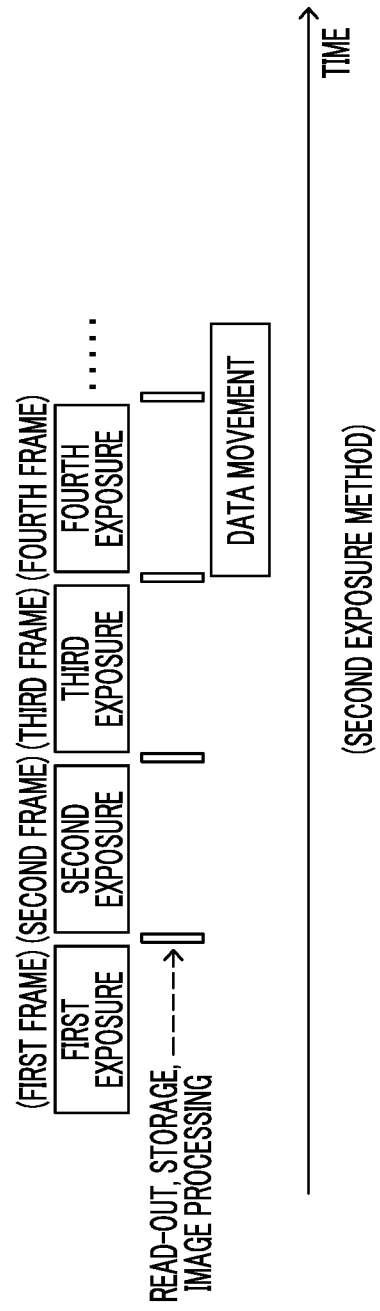

In the imaging apparatus 10 according to the first embodiment, for example, as illustrated in FIG. 18A and FIG. 18B, the first exposure method and the second exposure method are selectively used in accordance with an instruction received by the touch panel 42 and/or the operation portion 54. Hereinafter, for convenience of description, a time period required for exposure performed using the first exposure method will be referred to as a first exposure time period, and a time period required for exposure performed using the second exposure method will be referred to as a second exposure time period.

For example, in the first exposure method illustrated in FIG. 18A, the subject is imaged in the first exposure time period by all photodiodes in the partial region 92A of the photoelectric conversion element 92 illustrated in FIG. 11B. Accordingly, for example, image data having brightness corresponding to brightness of the output image data obtained by combining the first frame to the third frame illustrated in FIG. 15 is obtained.

Meanwhile, for example, in the second exposure method illustrated in FIG. 18B, while the subject is imaged in the second exposure time period by all photodiodes in the partial region 92A of the photoelectric conversion element 92, the second exposure time period is ⅓ of the first exposure time period. Thus, for example, as illustrated in FIG. 15, the amount of electric charges of the captured image data of one frame is ⅓ of the amount of electric charges of the captured image data of one frame based on the first exposure method.

In the first exposure method, the number of times that a series of processing of image processing such as read-out of the captured image data from the photoelectric conversion element 92, storage of the captured image data in the memory 96, and cut-out of the partial image data is performed is three. That is, the number of times that the first processing is performed is larger in the second exposure method than in the first exposure method by two. The number of times that the first processing is performed in the second exposure method is a number of times that can be implemented at the first frame rate. Thus, output image data having brightness corresponding to brightness of the output image data of one frame obtained in the first exposure time period can be generated without changing the second exposure time period to the first exposure time period by extending the exposure time period by decreasing the first frame rate. That is, even in the second exposure method, the output image data having brightness corresponding to the brightness of the output image data of one frame obtained using the first exposure method can be generated by obtaining the cut-out image from the captured image data of each of three consecutive frames and combining the cut-out images.

In addition, for example, captured image data in which the horizontal lines are thinned out in the vertical direction by skipping two lines at a time in the captured image data of each of the first frame to the third frame illustrated in FIG. 16 may be employed. In the example illustrated in FIG. 16, the captured image data in which the horizontal lines are thinned out in the vertical direction by skipping two lines at a time in the captured image data of each of the first frame to the third frame is illustrated. In the example illustrated in FIG. 16, output image data in which the horizontal lines are thinned out in the vertical direction by skipping two lines at a time is obtained by combining the captured image data of the first frame to the third frame.

In addition, in the imaging apparatus 10 according to the first embodiment, since the laminated CMOS sensor is employed as the imaging element 20, the image quality can be changed even in a case where the total data amount is the same, by changing a method of reading out the output image data from the captured image data of the memory 96.

Figure 17:
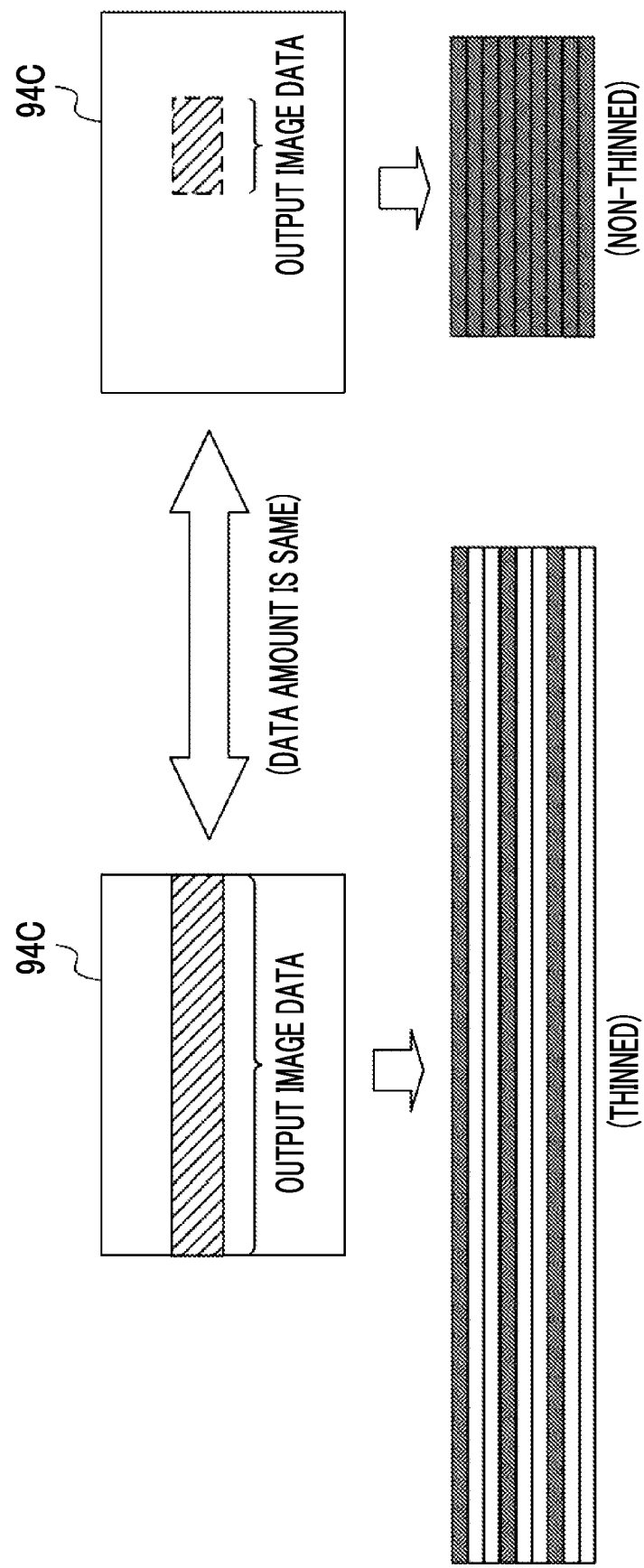
FIG. 17 is a descriptive diagram for describing a difference between thinned output image data and non-thinned output image data.

For example, as illustrated in FIG. 17, a data amount of the output image data acquired from the memory 96 by the image processing circuit 94C can be the same between a case of thinning out and a case of not thinning out. For example, as illustrated in FIG. 17, non-thinned captured image data does not need to be thinned out as much as a read-out target is narrower than thinned captured image data. Thus, the non-thinned captured image data can implement higher image quality than the thinned captured image. In the imaging apparatus 10, for example, as illustrated in FIG. 17, regardless of whether or not thinning is performed, a data amount output from the processing circuit 94 is smaller than in a case of outputting the captured image data of all pixels to the rear stage circuit 90. Thus, in the imaging apparatus 10, power consumption required for output to the rear stage circuit 90 from the output circuit 94D can be reduced compared to a case of performing thinning processing or cut-out processing in the rear stage circuit 90 as in the imaging apparatus according to the technology in the related art.

As described above, in the imaging apparatus 10, the memory 96 and the processing circuit 94 are incorporated in the imaging element 20. In addition, the processing circuit 94 executes the first processing at the first frame rate and executes the second processing at the second frame rate. The first processing includes the cut-out processing. In addition, for example, the partial image data is cut out from the captured image data by performing the cut-out processing as in steps S114 and S116 illustrated in FIG. 7 by the processing circuit 94. The output image data includes image data based on the cut-out partial image data.

Accordingly, the imaging apparatus 10 can reduce power consumption compared to a case of cutting out the partial image data from image data output to the outside of the imaging element without passing through the storage portion, and outputting the partial image data.

In addition, in the imaging apparatus 10, the image processing circuit 94C cuts out the partial image data from the captured image data stored in the memory 96 by random access to the memory 96.

Accordingly, the imaging apparatus 10 can quickly cut out the partial image data from the designated address compared to a case where random access to the memory 96 is not available.

In addition, in the imaging apparatus 10, the memory 96 can store the captured image data in a plurality of frames, and the cut-out processing includes processing of cutting out the partial image data of the plurality of frames from the captured image data stored in the memory 96. In addition, for example, as in processing of steps S126 and S128 illustrated in FIG. 7, the second processing includes processing of combining the partial image data of the plurality of frames cut out by performing the cut-out processing by the image processing circuit 94C. Combined data obtained by combining the partial image data of the plurality of frames is output to the rear stage circuit 90 by the output circuit 94D as the output image data.

Accordingly, the imaging apparatus 10 can reduce power consumption compared to a case of outputting the captured image data to the rear stage circuit 90, cutting out the partial image data of the plurality of frames from the captured image data in the rear stage circuit 90, and combining the partial image data of the plurality of frames.

In addition, in the imaging apparatus 10, for example, the partial image data is cut out from the captured image data of the single frame, and the cut-out partial image data is employed as the low image quality cut-out image data illustrated in step S116 in FIG. 7.

Accordingly, in the imaging apparatus 10, power consumption can be reduced compared to a case of cutting out the partial image data from the captured image data of each of the plurality of frames and combining the cut-out partial image data of the plurality of frames.

In addition, in the imaging apparatus 10, the partial image data of the plurality of frames has a relationship in which pixels different from each other are thinned out in units of lines.

Accordingly, the imaging apparatus 10 can obtain a subject image of high reproducibility compared to a case of thinning out pixels at the same position in units of lines.

A degree of thinning may be decided in accordance with a degree of enlargement of the cut-out image. For example, as the degree of enlargement is increased, the degree of thinning may be decreased. In a case of performing a special type of processing on the output image data, the degree of thinning may be decided in accordance with the type of processing.

In addition, in the imaging apparatus 10, the output image data output from the output circuit 94D is the combined data obtained by combining the partial image data of the plurality of frames thinned out at different locations.

Accordingly, the imaging apparatus 10 can display an image of high image quality compared to a case of outputting the partial image data of the single frame.

In addition, in the imaging apparatus 10, for example, the display control portion performs a control for displaying, on the display apparatus, an image based on the output image data output by the output circuit 94D in an enlarged manner as illustrated in FIGS. 11A and 11B, FIG. 12, and FIG. 14.

Accordingly, the imaging apparatus 10 can cause the user to visually recognize the image based on the output image data output by the output circuit 94D.

In addition, in the imaging apparatus 10, the laminated CMOS image sensor is employed as the imaging element 20. Accordingly, the imaging apparatus 10 can output image data subjected to image processing in the imaging element 20 to the rear stage circuit 90.

While an example of a form in which the captured image data obtained by imaging the subject by the partial region 92A of the photoelectric conversion element 92 is stored in the memory 96 is illustratively described in the first embodiment, the technology of the present disclosure is not limited thereto. For example, as illustrated in FIG. 19, the entirety image data that is the captured image data obtained by imaging the subject by all photodiodes in the photoelectric conversion element 92 may be stored in the memory 96. Even in this case, the image processing circuit 94C generates the cut-out image data by cutting out the partial image data 200 from the entirety image data by random access to the memory 96 in the same manner as the first embodiment. An image based on the cut-out image data is displayed on the display apparatus.

Figure 20:
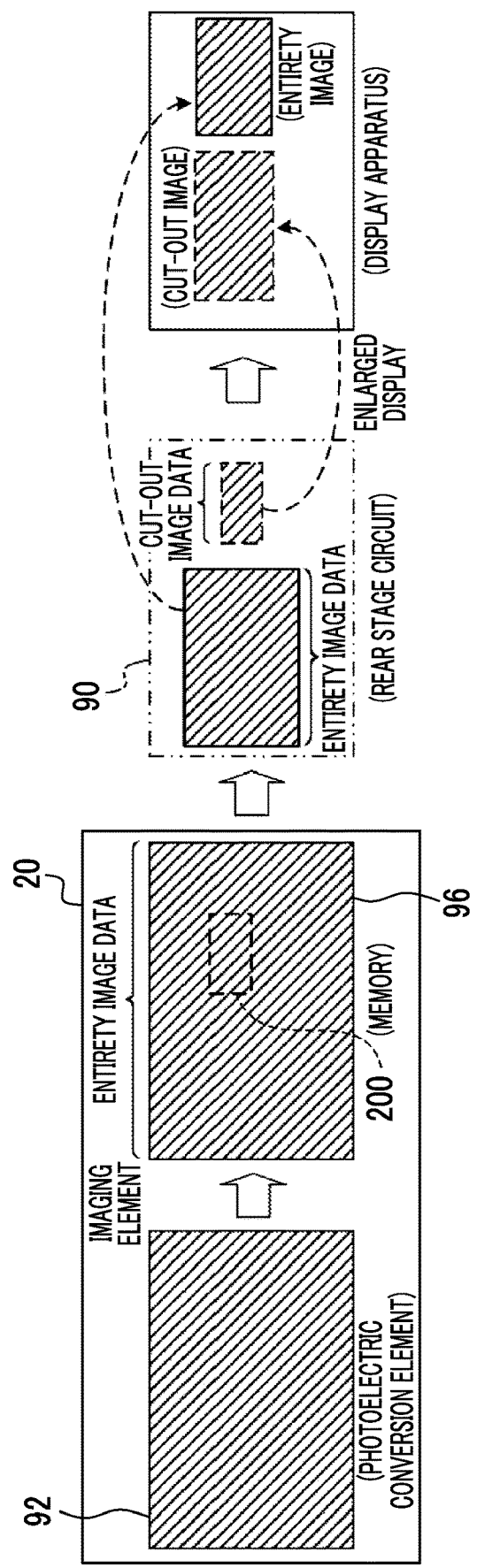
FIG. 20 is a state transition diagram illustrating one example of a flow of data of the imaging apparatus according to the embodiment of the technology of the present disclosure.

For example, as illustrated in FIG. 20, the entirety image data that is one example of the "wide range image data" according to the embodiment of the technology of the present disclosure, and the cut-out image data based on the partial image data 200 may be output to the rear stage circuit 90 from the output circuit 94D of the imaging element 20. In this case, resolution of the entirety image data is preferably lower than resolution of the partial image data. Accordingly, power consumption is reduced.

For example, as illustrated in FIG. 20, the display apparatus may display the cut-out image indicated by the cut-out image data in an enlarged manner and display the entirety image indicated by the entirety image data using a display method based on the first display method under control of the display control portion.

The display apparatus may display the cut-out image and the entirety image using a display method based on the second or third display method under control of the display control portion. The display apparatus may display the cut-out image or the entirety image under control of the display control portion. For example, any of the cut-out image and the entirety image that is to be displayed on the display apparatus may be decided in accordance with an instruction received by the touch panel 42 and/or the operation portion 54.

The processing circuit 94 may selectively output a partial image of a part of the partial image data of three frames and the combined data obtained by combining the partial image data of three frames to the rear stage circuit 90 in accordance with a provided condition as the partial image data. Accordingly, power consumption is reduced compared to a case of outputting the combined data to the rear stage circuit 90 at all times. For example, the "partial image of the part of the partial image data of three frames" refers to a number of partial images less than three frames. In addition, for example, the "provided condition" is illustrated by a condition that a specific instruction is received by the touch panel 42 and/or the operation portion 54, or a condition that remaining power of the imaging apparatus 10 is below a threshold value. For example, the "condition that the specific instruction is received" here is illustrated by a condition that an instruction for a power saving mode is received, or a condition that an instruction for image processing that requires a special type of processing is received by the touch panel 42 and/or the operation portion 54.

Second Embodiment

While a case of cutting out the partial image data indicating the image of the part of the subject is described in the first embodiment, a case where a part of the subject is present across a plurality of regions will be described in a second embodiment. In the second embodiment, the same constituents as the first embodiment will be designated by the same reference signs and will not be described.

Figure 24:
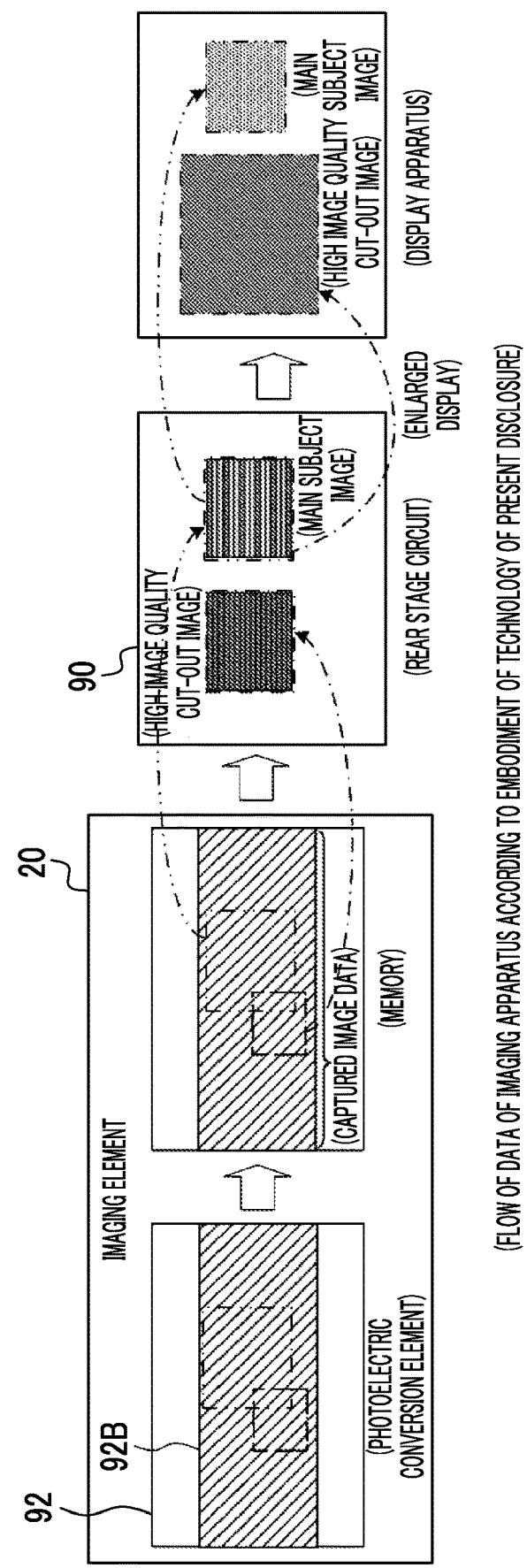
FIG. 24 is a state transition diagram illustrating one example of a flow of data of the imaging apparatus according to the embodiment of the technology of the present disclosure.

For example, the imaging apparatus 10 according to the second embodiment is different from the imaging apparatus 10 according to the first embodiment in that a partial region 92B is included instead of the partial region 92A of the photoelectric conversion element 92 as illustrated in FIG. 24. The partial region 92B is a region that has a larger width than the partial region 92A in the vertical direction of the photoelectric conversion element 92.

Next, the image data generation processing executed by the processing circuit 94 according to the second embodiment will be described with reference to FIG. 21.

Figure 21:
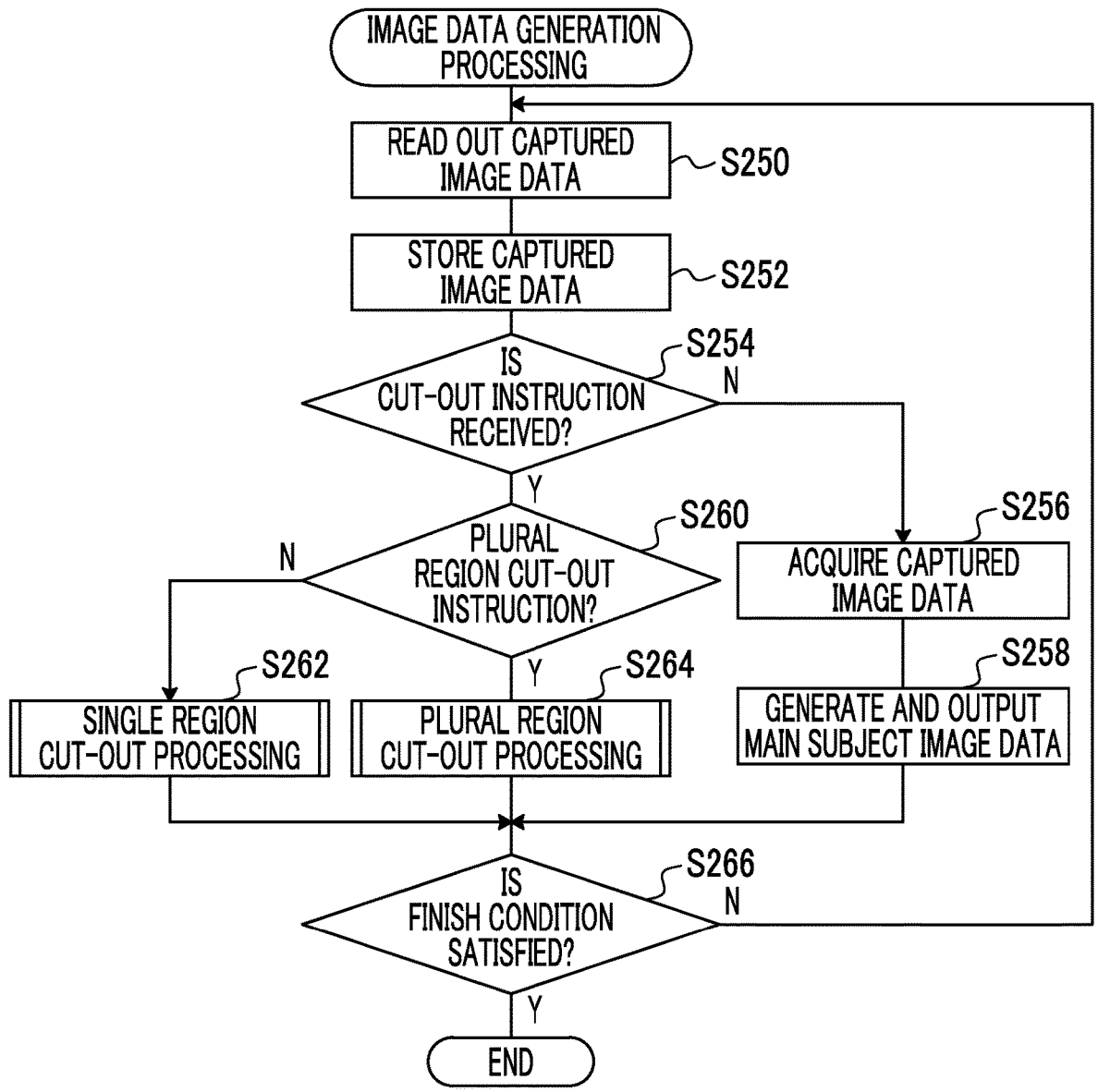
FIG. 21 is a flowchart illustrating one example of a flow of image data generation processing according to the second embodiment.

In the image data generation processing illustrated in FIG. 21, first, in step S250, the photoelectric conversion element drive circuit 94A reads out the captured image data from the partial region 92B of the photoelectric conversion element 92, and then, the image data generation processing transitions to step S252.

For example, the captured image data of one frame read out from the partial region 92B of the photoelectric conversion element 92 by executing processing of step S250 is image data in which the horizontal lines are thinned out in the vertical direction by skipping two lines at a time as illustrated in FIG. 10.

For example, the captured image data obtained from the partial region 92B of the photoelectric conversion element 92 by executing processing of step S250 is captured image data obtained by imaging the subject by the partial region 92B of the photoelectric conversion element 92 in the same manner as the example illustrated in FIGS. 11A and 11B.

In step S252, the AD conversion circuit 94B digitizes and stores the captured image data read out by the partial region 92B of the photoelectric conversion element drive circuit 94A in the memory 96, and then, the image data generation processing transitions to step S254.

In step S254, the image processing circuit 94C determines whether or not the cut-out instruction is received by the touch panel 42 and/or the operation portion 54. In step S254, the "cut-out instruction" is broadly classified into a single region cut-out instruction and a plural region cut-out instruction. The single region cut-out instruction refers to an instruction to cause the image processing circuit 94C to cut out a single region from an image indicated by the captured image data. The plural region cut-out instruction refers to an instruction to cause the image processing circuit 94C to cut out a plurality of regions from the image indicated by the captured image data.

The single region cut-out instruction is broadly classified into a single low image quality image cut-out instruction and a single high image quality image cut-out instruction. The single low image quality image cut-out instruction refers to an instruction to cut out a single low image quality image from the image indicated by the captured image data as an image of a cut-out region. The single high image quality image cut-out instruction refers to an instruction to cut out a single high image quality image from the image indicated by the captured image data as an image of a cut-out region. The single high image quality image has higher image quality than the single row image quality image. The single low image quality image refers to image data in which the horizontal lines are thinned out in the vertical direction by skipping two lines at a time in the same manner as the example illustrated in FIG. 10. Meanwhile, the single high image quality image refers to the combined data obtained by combining the captured image data of three frames, that is, non-thinned image data, in the same manner as the example illustrated in FIG. 10.

The plural region cut-out instruction is broadly classified into a plural low image quality cut-out instruction and a plural high image quality image cut-out instruction. The plural low image quality cut-out instruction refers to an instruction to cut out a low image quality image from each of the plurality of regions cut out from the image indicated by the captured image data. Hereinafter, for convenience of description, the low image quality image cut out from each of the plurality of regions will be referred to as the "low image quality cut-out image".

The plural high image quality image cut-out instruction refers to an instruction to cut out a high image quality image from each of the plurality of regions cut out from the image indicated by the captured image data. Hereinafter, for convenience of description, the high image quality image cut out from each of the plurality of regions will be referred to as the "high image quality cut-out image".

The high image quality cut-out image has higher image quality than the low image quality cut-out image. The low image quality cut-out image refers to a plurality of pieces of image data in each of which the horizontal lines are thinned out in the vertical direction by skipping two lines at a time in the same manner as the example illustrated in FIG. 10. Meanwhile, a plurality of high image quality cut-out images refer to a plurality of pieces of combined data each of which is obtained by combining the captured image data of three frames, that is, a plurality of pieces of non-thinned image data, in the same manner as the example illustrated in FIG. 10.

In step S254, in a case where the cut-out instruction is received by the touch panel 42 and/or the operation portion 54, a positive determination is made, and the image data generation processing transitions to step S260. In step S254, in a case where the cut-out instruction is not received by the touch panel 42 and/or the operation portion 54, a negative determination is made, and the image data generation processing transitions to step S256.

In step S256, the image processing circuit 94C acquires the captured image data from the memory 96, and then, the image data generation processing transitions to step S258.

In step S258, the image processing circuit 94C generates main subject image data based on the captured image data acquired in step S256 and outputs the generated main subject image data to the output circuit 94D, and then, the image data generation processing transitions to step S266. For example, the main subject image data generated by executing processing of step S258 refers to the subject included in a rectangular region including faces of a plurality of persons. The faces of the persons are specified by performing the face detection function provided in the imaging apparatus 10. The main subject image data is one type of image data that is a part of the captured image data and is included in the output image data.

In step S260, the image processing circuit 94C determines whether or not the cut-out instruction received in step S254 is the plural region cut-out instruction. In step S260, in a case where the cut-out instruction received in step S254 is not the plural region cut-out instruction, that is, in a case where the cut-out instruction received in step S254 is the single region cut-out instruction, a negative determination is made, and the image data generation processing transitions to step S262. In step S260, in a case where the cut-out instruction received in step S254 is the plural region cut-out instruction, a positive determination is made, and the image data generation processing transitions to step S264.

Figure 22:
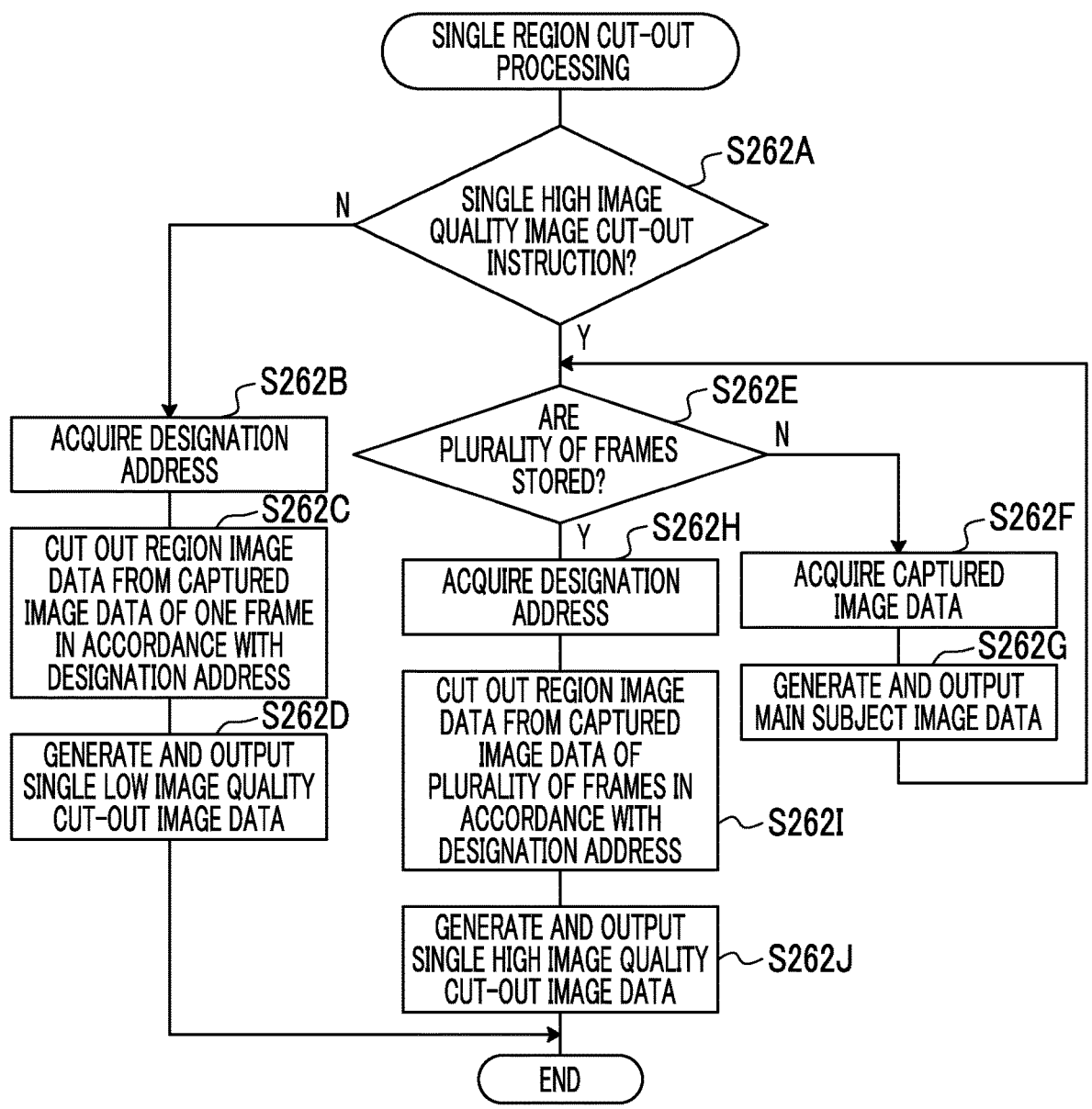
FIG. 22 is a flowchart illustrating one example of a flow of single region cut-out processing according to the second embodiment.

In step S262, for example, the image processing circuit 94C executes single region cut-out processing illustrated in FIG. 22, and then, the image data generation processing transitions to step S266.

Figure 23:
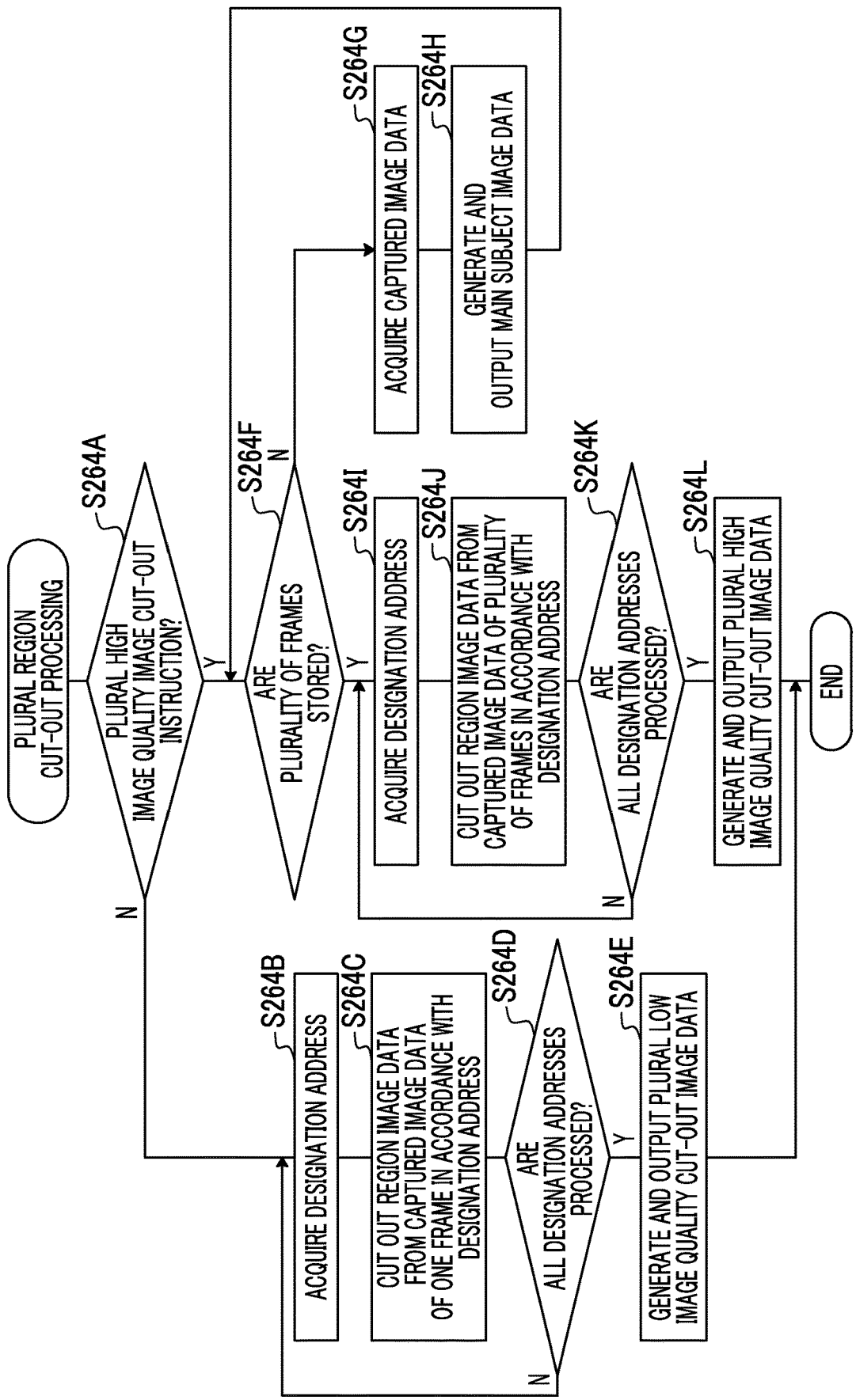
FIG. 23 is a flowchart illustrating one example of a flow of plural region cut-out processing according to the second embodiment.

In step S264, for example, the image processing circuit 94C executes plural region cut-out processing illustrated in FIG. 23, and then, the image data generation processing transitions to step S266.

In the single region cut-out processing illustrated in FIG. 22, in step S262A, a determination as to whether or not the single region cut-out instruction received in step S254 is the single high image quality image cut-out instruction is performed. In step S262A, in a case where the single region cut-out instruction received in step S254 is the single low image quality image cut-out instruction, a negative determination is made, and the single region cut-out processing transitions to step S262B. In step S262A, in a case where the single region cut-out instruction received in step S254 is the single high image quality image cut-out instruction, a positive determination is made, and the single region cut-out processing transitions to step S262E.

In step S262B, the image processing circuit 94C acquires the designation address from the cut-out instruction received in step S254, and then, the single region cut-out processing transitions to step S262C.

In step S262C, the image processing circuit 94C cuts out region image data from the captured image data of one frame of the captured image data in the memory 96 in accordance with the designation address acquired in step S262B, and then, the single region cut-out processing transitions to step S262D. The region image data refers to image data of the captured image data that indicates a region specified in accordance with the designation address in the image indicated by the captured image data. For example, the captured image data of the single frame as a cut-out target for the region image data is the captured image data least recently stored in the memory 96. However, the technology of the present disclosure is not limited thereto. For example, the captured image data of the single frame as the cut-out target for the region image data may be any captured image data in a case where the captured image data of the plurality of frames is stored in the memory 96.

In step S262D, the image processing circuit 94C generates and outputs single low image quality cut-out image data to the output circuit 94D, and then, the image processing circuit 94C finishes the single region cut-out processing. The region image data cut out in step S262C is employed as the single low image quality cut-out image data. However, the technology of the present disclosure is not limited thereto. For example, the single low image quality cut-out image data may be image data obtained by performing various types of image processing on the region image data cut out in step S262C. The single low image quality cut-out image data generated by executing processing of step S262D is one type of image data included in the output image data and is one example of "image data based on partial image data" according to the embodiment of the technology of the present disclosure.

In step S262E, the image processing circuit 94C determines whether or not the captured image data of a plurality of frames is stored in the memory 96. In step S262E, three frames are employed as one example of the plurality of frames. In step S262E, in a case where the captured image data of the plurality of frames is not stored in the memory 96, a negative determination is made, and a transition is made to step S262F. In step S262E, in a case where the captured image data of the plurality of frames is stored in the memory 96, a positive determination is made, and a transition is made to step S262H.

In steps S262F and S262G, the image processing circuit 94C executes processing corresponding to processing of steps S256 and S258 illustrated in FIG. 21, and the single region cut-out processing transitions to step S262E.

In step S262H, the image processing circuit 94C acquires the designation address from the cut-out instruction received in step S254, and then, the single region cut-out processing transitions to step S262I.

In step S262I, the image processing circuit 94C cuts out the region image data from the captured image data of each of the plurality of frames of the captured image data in the memory 96 in accordance with the designation address acquired in step S262H, and then, the single region cut-out processing transitions to step S262J.

For example, the captured image data of the plurality of frames as the cut-out target for the region image data is the captured image data of all frames currently stored in the memory 96, that is, the captured image data of three frames. However, the technology of the present disclosure is not limited thereto. In a case where the captured image data of one frame is defined as the single low image quality cut-out image data, the combined data obtained by combining the captured image data of two frames may be used as the cut-out target.

The region image data cut out in each of steps S262C and S262I is one example of "partial image data" according to the embodiment of the technology of the present disclosure.

In step S262J, the image processing circuit 94C generates and outputs single high image quality cut-out image data to the output circuit 94D, and then, the image processing circuit 94C finishes the single region cut-out processing. For example, the combined data obtained by combining the region image data of three frames cut out in step S262I is employed as the single high image quality cut-out image data in the same manner as the example illustrated in FIG. 10. However, the technology of the present disclosure is not limited thereto. For example, the single high image quality cut-out image data may be image data obtained by performing various types of image processing on the combined data obtained by combining the region image data of three frames cut out in step S262I. The single high image quality cut-out image data generated by executing processing of step S262J is one type of image data included in the output image data and is one example of the "image data based on the partial image data" according to the embodiment of the technology of the present disclosure.

In the plural region cut-out processing illustrated in FIG. 23, in step S264A, the image processing circuit 94C determines whether or not the plural region cut-out instruction received in step S254 is the plural high image quality image cut-out instruction. In step S264A, in a case where the plural region cut-out instruction received in step S254 is the plural low image quality image cut-out instruction, a negative determination is made, and the plural region cut-out processing transitions to step S264B. In step S264A, in a case where the plural region cut-out instruction received in step S254 is the plural high image quality image cut-out instruction, a positive determination is made, and the plural region cut-out processing transitions to step S264F.

In step S264B, the image processing circuit 94C acquires a non-processed designation address from the cut-out instruction received in step S254, and then, the plural region cut-out processing transitions to step S264C. In step S264B, the "non-processed designation address" refers to a designation address that is not used yet in processing of step S264C described later.

In step S264C, the image processing circuit 94C cuts out the region image data from the captured image data of one frame of the captured image data in the memory 96 in accordance with the designation address acquired in step S264B, and then, the plural region cut-out processing transitions to step S264D. For example, the captured image data of the single frame as a cut-out target for the region image data is the captured image data least recently stored in the memory 96. However, the technology of the present disclosure is not limited thereto. For example, the captured image data of the single frame as the cut-out target for the region image data may be any captured image data in a case where the captured image data of the plurality of frames is stored in the memory 96.

In step S264D, the image processing circuit 94C determines whether or not all designation addresses are processed. In step S264D, in a case where the non-processed designation address is present, a negative determination is made, and the plural region cut-out processing transitions to step S264B. In step S264D, in a case where the non-processed designation address is not present, a positive determination is made, and the plural region cut-out processing transitions to step S264E.

A plurality of pieces of region image data cut out by executing processing of step S264B to step S264D are one example of a "plurality of pieces of region image data indicating a plurality of regions in captured image data" according to the embodiment of the technology of the present disclosure.

In step S264E, the image processing circuit 94C generates and outputs plural low image quality cut-out image data to the output circuit 94D, and then, the image processing circuit 94C finishes the plural region cut-out processing. The plurality of pieces of region image data cut out in step S264C are employed as the plural low image quality cut-out image data. However, the technology of the present disclosure is not limited thereto. For example, the plural low image quality cut-out image data may be image data obtained by performing various types of image processing on the plurality of pieces of region image data cut out in step S264C. The plural low image quality cut-out image data generated by executing processing of step S264E is one type of image data included in the output image data and is one example of the "image data based on the partial image data" according to the embodiment of the technology of the present disclosure.

In step S264F, the image processing circuit 94C determines whether or not the captured image data of a plurality of frames is stored in the memory 96. In step S264F, three frames are employed as one example of the plurality of frames. In step S264F, in a case where the captured image data of the plurality of frames is not stored in the memory 96, a negative determination is made, and a transition is made to step S264G. In step S264F, in a case where the captured image data of the plurality of frames is stored in the memory 96, a positive determination is made, and a transition is made to step 264I.

In steps S264G and S264H, the image processing circuit 94C executes processing corresponding to processing of steps S256 and S258 illustrated in FIG. 21, and the plural region cut-out processing transitions to step S264F.

In step S264I, the image processing circuit 94C acquires the non-processed designation address from the cut-out instruction received in step S254, and then, the plural region cut-out processing transitions to step S264J. In step S264I, the "non-processed designation address" refers to a designation address that is not used yet in processing of step S264J described later.

In step S264J, the image processing circuit 94C cuts out the region image data from the captured image data of each of the plurality of frames of the captured image data in the memory 96 in accordance with the designation address acquired in step S264I, and then, the plural region cut-out processing transitions to step S264K.

For example, the captured image data of the plurality of frames as the cut-out target for the region image data is the captured image data of all frames currently stored in the memory 96, that is, the captured image data of three frames. However, the technology of the present disclosure is not limited thereto. In a case where the captured image data of one frame is defined as the plural low image quality cut-out image data, the combined data obtained by combining the captured image data of two frames may be used as the cut-out target.

In step S264K, the image processing circuit 94C determines whether or not all designation addresses are processed. In step S264K, in a case where the non-processed designation address is present, a negative determination is made, and the plural region cut-out processing transitions to step S264I. In step S264K, in a case where the non-processed designation address is not present, a positive determination is made, and the plural region cut-out processing transitions to step S264L.

A plurality of pieces of region image data cut out by executing processing of step S264I to step S264K are one example of the "plurality of pieces of region image data indicating the plurality of regions in the captured image data" according to the embodiment of the technology of the present disclosure.

A plurality of pieces of region image data cut out by executing processing of step S264J are one example of the "plurality of pieces of region image data indicating the plurality of regions in the captured image data" according to the embodiment of the technology of the present disclosure.

In step S264L, the image processing circuit 94C generates and outputs plural high image quality cut-out image data to the output circuit 94D, and then, the image processing circuit 94C finishes the plural region cut-out processing. For example, the combined data obtained by combining the region image data of three frames cut out in step S264J for each of a plurality of locations as the cut-out target is employed as the plural high image quality cut-out image data in the same manner as the example illustrated in FIG. 10. However, the technology of the present disclosure is not limited thereto.

For example, the plural high image quality cut-out image data may be image data obtained by performing various types of image processing on the combined data obtained by combining the region image data of three frames cut out in step S264J for each of the plurality of regions as the cut-out target. The plural high image quality cut-out image data generated by executing processing of step S264L is one type of image data included in the output image data and is one example of the "image data based on the partial image data" according to the embodiment of the technology of the present disclosure.

In the image data generation processing illustrated in FIG. 21, in step S266, a determination as to whether or not the image data generation processing finish condition described in the first embodiment is satisfied is performed. In step S266, in a case where the image data generation processing finish condition is not satisfied, a negative determination is made, and the image data generation processing transitions to step S250. In step S266, in a case where the image data generation processing finish condition is satisfied, a positive determination is made, and the image processing circuit 94C finishes the image data generation processing.

Next, the image data output processing executed by the output circuit 94D of the processing circuit 94 according to the second embodiment will be described with reference to FIG. 8. The image data output processing illustrated in FIG. 8 is performed at the second frame rate by the output circuit 94D.

In the image data output processing illustrated in FIG. 8, first, in step S280, the output circuit 94D determines whether or not the output image data is input from the image processing circuit 94C. Image data that includes at least one of the main subject image data, the single low image quality cut-out image data, the single high image quality cut-out image data, the plural low image quality cut-out image data, or the plural high image quality cut-out image data output by the image data generation processing illustrated in FIG. 21 is illustrated as one example of the output image data input into the output circuit 94D from the image processing circuit 94C.

In step S280, in a case where the output image data is not input from the image processing circuit 94C, a negative determination is made, and a transition is made to step S284. In step S280, in a case where the output image data is input from the image processing circuit 94C, a positive determination is made, and a transition is made to step S282.

In step S282, the output circuit 94D outputs the output image data to the I/F 56 of the rear stage circuit 90 and then, transitions to step S284. For example, the I/F 56 outputs the output image data input from the output circuit 94D to the CPU 52 and the image processing portion 62 through the bus 68.

In step S284, the output circuit 94D determines whether or not the image data output processing finish condition described in the first embodiment is satisfied. In step S284, in a case where the image data output processing finish condition is not satisfied, a negative determination is made, and the image data output processing transitions to step S280. In step S284, in a case where the image data output processing finish condition is satisfied, a positive determination is made, and the output circuit 94D finishes the image data output processing.

Next, the display control processing executed by the display control portion of the rear stage circuit 90 will be described with reference to FIG. 9. For convenience of description, it is assumed that the output image data is output to the rear stage circuit 90 from the output circuit 94D by executing the image data output processing illustrated in FIG. 8, and that the output image data is input into the CPU 52 and the image processing portion 62.

In the display control processing illustrated in FIG. 9, in step S290, the display control portion determines whether or not the output image data is input from the image processing portion 62. In step S290, in a case where the output image data is not input from the image processing portion 62, a negative determination is made, and the display control processing transitions to step S294. In step S290, in a case where the output image data is input from the image processing portion 62, a positive determination is made, and the display control processing transitions to step S292.

In step S292, the display control portion outputs the output image data to the display apparatus as graphics data, and then, the display control processing transitions to step S294. In a case where the output image data is output to the display apparatus by executing processing of step S292, the display apparatus displays the image indicated by the output image data. For example, in a case where the main subject image data is included in the output image data, the display apparatus displays a main subject image indicated by the main subject image data.

While the main subject image is illustrated here, the entirety image may be displayed in the same manner as the first embodiment, or both of the main subject image and the entirety image may be arranged and displayed. For example, the "entirety image" according to the second embodiment refers to an image showing the entirety of the subject in a range falling within an angle of view imageable by all photodiodes in the partial region 92B of the photoelectric conversion element 92 illustrated in FIG. 24.

For example, in a case where the single high image quality cut-out image data is included in the output image data, the display apparatus arranges and displays the single high image quality cut-out image indicated by the single high image quality cut-out image data and the main subject image as illustrated in FIG. 24.

For example, in a case where the enlarged display instruction is received by the touch panel 42 and/or the operation portion 54, the display apparatus displays the single high image quality cut-out image in an enlarged manner as illustrated in FIG. 24.

While a display example of the single high image quality cut-out image is illustrated in the example illustrated in FIG. 24, the display apparatus displays the single low image quality cut-out image instead of the single high image quality cut-out image in a case where the single low image quality cut-out image data is included in the output image data.

The image quality of the image displayed on the display apparatus is such that the single high image quality cut-out image has higher image quality than the single low image quality cut-out image and the main subject image.

It is not necessary to display the same image on both of the first display 40 and the second display 80. For example, the main subject image may be displayed on one of the first display 40 and the second display 80, and the single high image quality cut-out image or the single low image quality cut-out image may be displayed on the other together with the main subject image. Alternatively, the single high image quality cut-out image or the single low image quality cut-out image may be displayed without displaying the main subject image.

Figure 25:
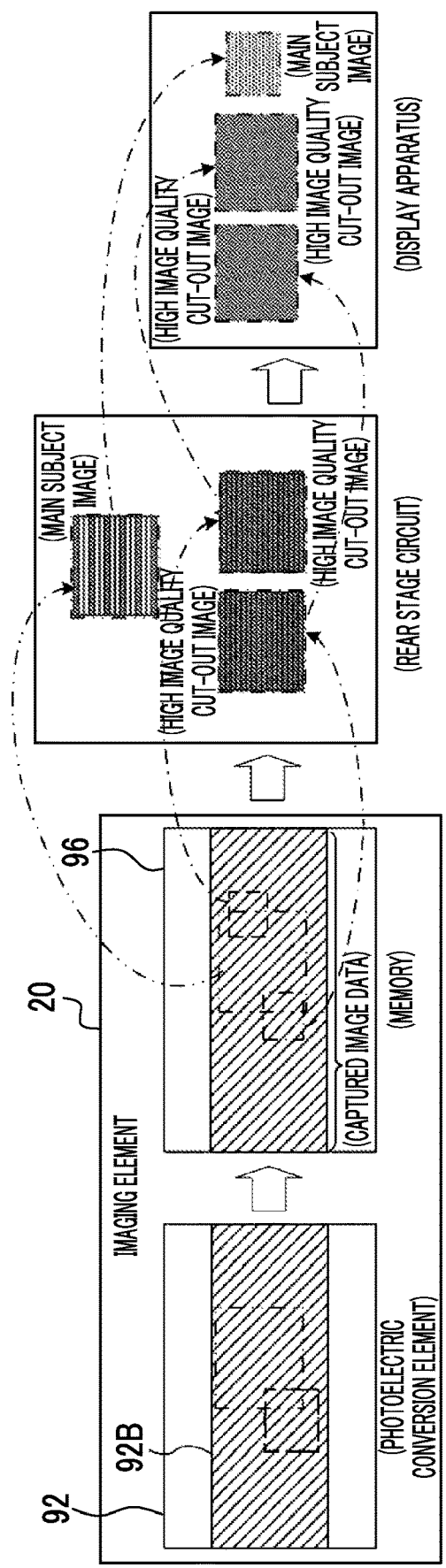
FIG. 25 is a state transition diagram illustrating one example of a flow of data of the imaging apparatus according to the embodiment of the technology of the present disclosure.

Meanwhile, for example, in a case where the plural high image quality cut-out image data is included in the output image data, the display apparatus arranges and displays the plurality of high image quality cut-out images indicated by the plural high image quality cut-out image data and the main subject image as illustrated in FIG. 25. In the example illustrated in FIG. 25, a state where two high image quality cut-out images and the main subject image are arranged and displayed on the display apparatus is illustrated.

In a case where the enlarged display instruction is received by the touch panel 42 and/or the operation portion 54, the display apparatus displays at least one of the plurality of high image quality cut-out images in an enlarged manner.

The image quality of the image displayed on the display apparatus is such that the plurality of high image quality cut-out images have higher image quality than a plurality of low image quality cut-out images and the main subject image.

It is not necessary to display the same image on both of the first display 40 and the second display 80. For example, the main subject image may be displayed on one of the first display 40 and the second display 80, and the plurality of high image quality cut-out images or the plurality of low image quality cut-out images may be displayed on the other together with the main subject image. Alternatively, the plurality of high image quality cut-out images or the plurality of low image quality cut-out images may be displayed without displaying the main subject image.

In step S294, the display control portion determines whether or not the display control processing finish condition described in the first embodiment is satisfied. In step S294, in a case where the display control processing finish condition is not satisfied, a negative determination is made, and the display control processing transitions to step S290. In step S294, in a case where the display control processing finish condition is satisfied, a positive determination is made, and the display control portion finishes the display control processing.

As described above, in the imaging apparatus 10 according to the second embodiment, a part of the subject corresponding to the cut-out target is present across a plurality of regions, and a plurality of pieces of region image data are cut out from the captured image data. The plural low image quality image data and the plural high image quality cut-out image data are generated based on the plurality of pieces of cut-out region image data.

Accordingly, the imaging apparatus 10 according to the second embodiment can reduce power consumption even in a case where the cut-out target is present across a plurality of regions of the subject.

In the example illustrated in FIG. 25, a range specified by the designation address related to the main subject image data overlaps with a range specified by the designation address related to the plural high image quality cut-out image data.

However, even in a state where the ranges specified by the designation addresses overlap, the image processing circuit 94C can individually acquire the main subject image data and the plural high image quality cut-out image data since the captured image data is held in the memory 96.

The image processing circuit 94C can individually acquire not only the plural high image quality cut-out image data but also the main subject image data and the plural low image quality cut-out image data. In addition, not only the plural high image quality cut-out image data and the plural low image quality cut-out image data but also the main subject image data and the single high image quality cut-out image data or the single low image quality cut-out image data may be individually acquired. In addition, the entirety image data can be applied instead of the main subject image data.

While an example of a form in which two pieces of partial image data are cut out from the captured image data is illustratively described in the second embodiment, the technology of the present disclosure is not limited thereto. For example, three or more pieces of partial image data may be cut out from the captured image data. In this case, the display control portion may arrange and display the entirety image and three or more images based on three or more pieces of partial image data. Among three or more images based on three or more pieces of partial image data, only a designated image may be displayed in an enlarged manner or displayed in a reduced manner.

Third Embodiment

While a method of using the partial image data out of the partial image data and the focusing control image data is illustrated in the first embodiment, a method of using both of the partial image data and the focusing control image data will be described in the third embodiment. In the third embodiment, the same constituents as constituents described in the first embodiment will be designated by the same reference signs and will not be described.

Figure 26:
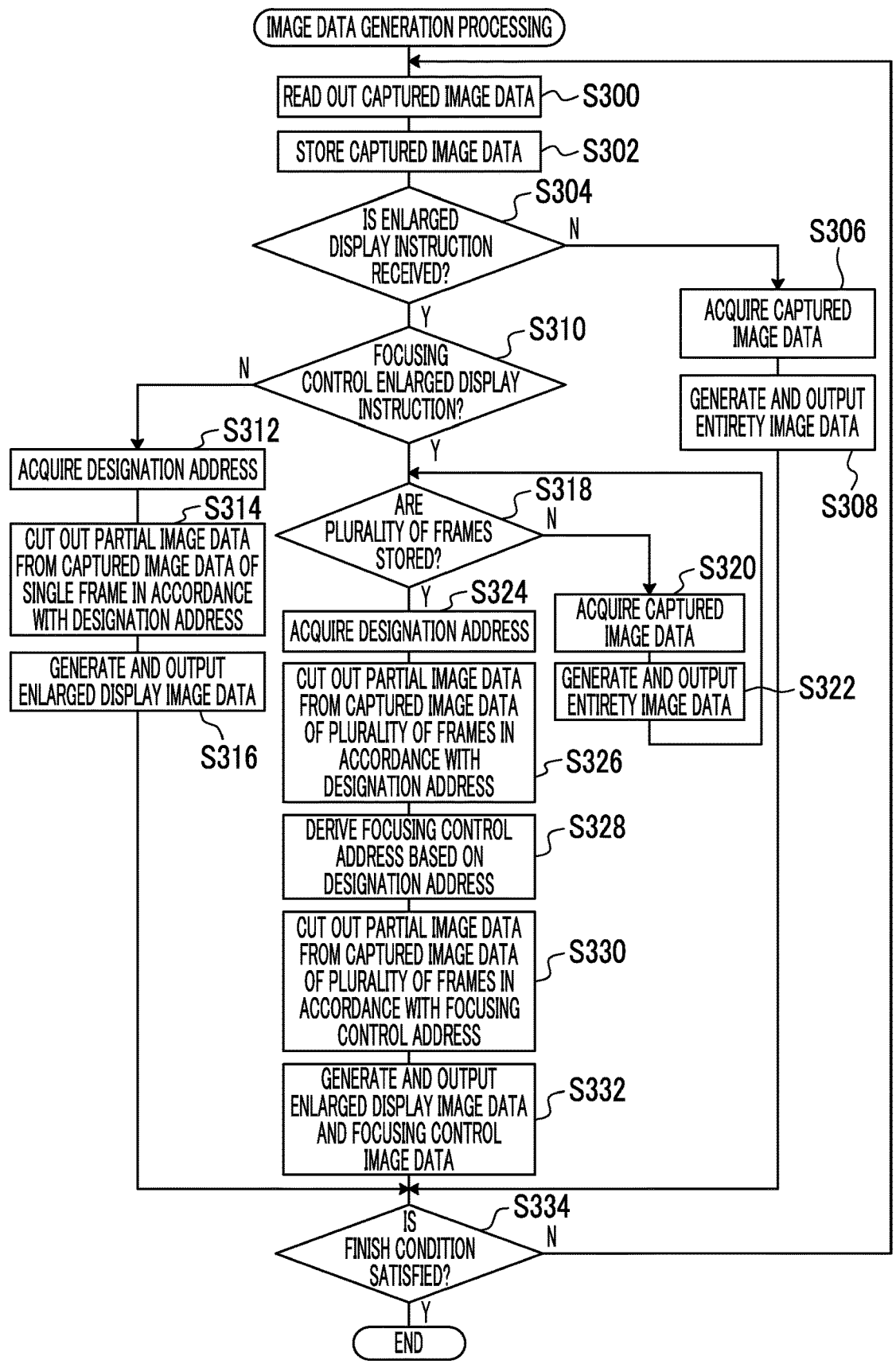
FIG. 26 is a flowchart illustrating one example of a flow of image data generation processing according to the third embodiment.

The imaging apparatus 10 according to the third embodiment is different from the imaging apparatus 10 according to the first embodiment in that the processing circuit 94 executes the image data generation processing illustrated in FIG. 26 instead of the image data generation processing illustrated in FIG. 8.

In the image data generation processing illustrated in FIG. 26, first, in step S300, the photoelectric conversion element drive circuit 94A reads out the captured image data from the partial region 92A of the photoelectric conversion element 92, and then, the image data generation processing transitions to step S302.

For example, the captured image data of one frame read out from the partial region 92A of the photoelectric conversion element 92 by executing processing of step S300 is image data in which the horizontal lines are thinned out in the vertical direction by skipping two lines at a time as illustrated in FIG. 10.

In step S302, the AD conversion circuit 94B digitizes and stores the captured image data read out by the partial region 92A of the photoelectric conversion element drive circuit 94A in the memory 96, and then, the image data generation processing transitions to step S304.

In step S304, the image processing circuit 94C determines whether or not the enlarged display instruction is received by the touch panel 42 and/or the operation portion 54. The enlarged display instruction includes the designation address described in the first embodiment.

In step S304, in a case where the enlarged display instruction is not received by the touch panel 42 and/or the operation portion 54, a negative determination is made, and the image data generation processing transitions to step S306. In step S304, in a case where the enlarged display instruction is received by the touch panel 42 and/or the operation portion 54, a positive determination is made, and the image data generation processing transitions to step S310.

In steps S306 and S308, the image processing circuit 94C executes processing corresponding to processing of steps S106 and S108 illustrated in FIG. 7 and then, transitions to step S334.

In step S310, the image processing circuit 94C determines whether or not the enlarged display instruction received in step S304 is a focusing control enlarged display instruction. The focusing control enlarged display instruction refers to an instruction to cause the display apparatus to display an image of a location designated in accordance with the designation address in an enlarged manner and cause the processing circuit 94 to generate and output the focusing control image data.

In step S310, in a case where the enlarged display instruction received in step S304 is not the focusing control enlarged display instruction, a negative determination is made, and the image data generation processing transitions to step S312. In step S310, in a case where the enlarged display instruction received in step S304 is the focusing control enlarged display instruction, a positive determination is made, and the image data generation processing transitions to step S318.

In steps S312 and S314, the image processing circuit 94C executes processing corresponding to processing of steps S112 and S114 illustrated in FIG. 7, and then, the image data generation processing transitions to step S316.

In step S316, the image processing circuit 94C generates and outputs enlarged display image data to the output circuit 94D, and then, the image processing circuit 94C transitions to step S334. The partial image data cut out in step S314 is employed as the enlarged display image data. However, the technology of the present disclosure is not limited thereto. For example, the enlarged display image data may be image data obtained by performing various types of image processing on the partial image data cut out in step S314. The enlarged display image data generated by executing processing of step S316 is one type of image data included in the output image data.

In steps S318, S320, S322, S324, and S326, the image processing circuit 94C executes processing corresponding to processing of steps S118, S120, S122, S124, and S126 illustrated in FIG. 7. After processing of step S326 is executed, the image data generation processing transitions to step S328.

In step S328, the image processing circuit 94C derives a focusing control address based on the designation address acquired in step S324, and then, the image data generation processing transitions to step S330. The focusing control address is an address that can be used for specifying a part of the captured image data required for the focusing control performed by the CPU 52 from the memory 96 storing the captured image data. In step S328, the focusing control address is derived from the designation address in accordance with a predetermined derivation table. However, the technology of the present disclosure is not limited thereto. For example, the focusing control address may be derived using a calculation expression that can be used for deriving the same result as the derivation table.

In step S330, the image processing circuit 94C cuts out the partial image data from the captured image data of each of the plurality of frames of the captured image data in the memory 96 in accordance with the focusing control address acquired in step S328, and then, the image data generation processing transitions to step S332. Hereinafter, the partial image data cut out in step S326 will be referred to as "enlarged display partial image data", and the partial image data cut out in step S330 will be referred to as "focusing control partial image data".

For example, the captured image data of the plurality of frames as the cut-out target for the focusing control partial image data is the captured image data of all frames currently stored in the memory 96, that is, the captured image data of three frames. However, the technology of the present disclosure is not limited thereto. Combined data obtained by combining the captured image data of one frame or two frames may be used as the cut-out target.

In step S332, the image processing circuit 94C generates image data corresponding to the high image quality cut-out image data in step S128 illustrated in FIG. 7 as the enlarged display image data, and generates the focusing control partial image data based on the enlarged display image data. The image processing circuit 94C outputs the generated enlarged display image data and the focusing control partial image data to the output circuit 94D, and then, the image data generation processing transitions to step S334.

For example, combined data obtained by combining the focusing control partial image data of three frames cut out in step S330 is employed as the focusing control image data in the same manner as the example illustrated in FIG. 10. However, the technology of the present disclosure is not limited thereto. For example, the focusing control image data may be image data obtained by performing various types of image processing on the combined data obtained by combining the focusing control partial image data of three frames cut out in step S330. The focusing control image data generated by executing processing of step S332 is one type of image data included in the output image data.

Figure 27:
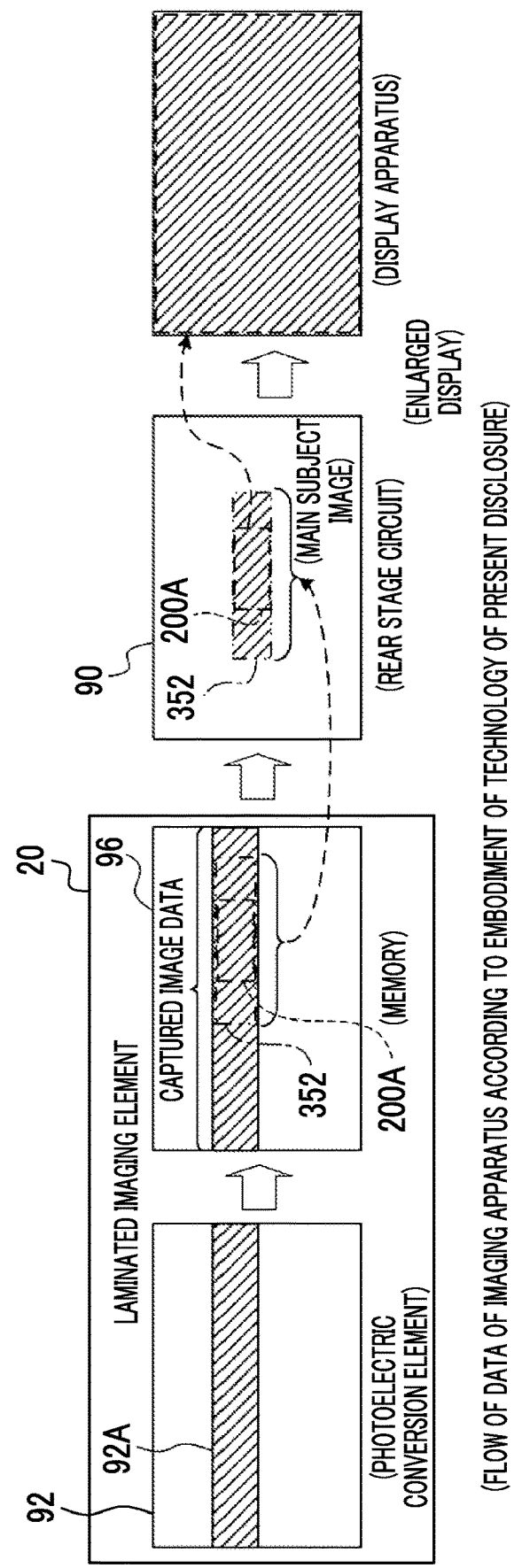
FIG. 27 is a state transition diagram illustrating one example of a flow of data of the imaging apparatus according to the embodiment of the technology of the present disclosure.

In the example illustrated in FIG. 27, a width relationship between images of enlarged display image data 200A and focusing control image data 352 is shown. For example, as illustrated in FIG. 27, the image indicated by the focusing control image data 352 is an image of a range wider than the image indicated by the enlarged display image data 200A. The "wider range" here means the "predetermined range" described in the first embodiment.

For example, in a case where the CPU 52 performs the so-called contrast AF or the phase difference AF in a state where the live view image is displayed on the display apparatus in the imaging apparatus 10, a region of the image indicated by the focusing control image data 352 may be enlarged or reduced in accordance with a blurriness amount. For example, under control of the CPU 52, the image processing circuit 94C adjusts the focusing control image data 352 such that the region of the image indicated by the focusing control image data 352 is narrowed as the blurriness amount is decreased. Accordingly, the imaging apparatus 10 can reduce power consumption compared to a case where the focusing control image data 352 is constant regardless of the blurriness amount.

In step S334, the image processing circuit 94C determines whether or not the image data generation processing finish condition described in the first embodiment is satisfied. In step S334, in a case where the image data generation processing finish condition described in the first embodiment is not satisfied, a negative determination is made, and the image data generation processing transitions to step S300. In step S334, in a case where the image data generation processing finish condition described in the first embodiment is satisfied, a positive determination is made, and the image processing circuit 94C finishes the image data generation processing.

Next, the image data output processing executed by the output circuit 94D of the processing circuit 94 according to the third embodiment will be described with reference to FIG. 8. The image data output processing illustrated in FIG. 8 is performed at the second frame rate by the output circuit 94D.

In the image data output processing illustrated in FIG. 8, first, in step S350, the output circuit 94D determines whether or not the output image data is input from the image processing circuit 94C. Image data that includes at least one of the entirety image data, the enlarged display image data, or the focusing control image data is illustrated as one example of the output image data input into the output circuit 94D from the image processing circuit 94C.

In step S350, in a case where the output image data is not input from the image processing circuit 94C, a negative determination is made, and a transition is made to step S354. In step S350, in a case where the output image data is input from the image processing circuit 94C, a positive determination is made, and a transition is made to step S351.

In step S351, the output circuit 94D outputs the output image data to the I/F 56 of the rear stage circuit 90 and then, transitions to step S354. For example, the I/F 56 outputs the output image data input from the output circuit 94D to the CPU 52 and the image processing portion 62 through the bus 68.

In step S354, the output circuit 94D determines whether or not the image data output processing finish condition described in the first embodiment is satisfied. In step S354, in a case where the image data output processing finish condition is not satisfied, a negative determination is made, and the image data output processing transitions to step S350. In step S354, in a case where the image data output processing finish condition is satisfied, a positive determination is made, and the output circuit 94D finishes the image data output processing.

Next, output image data processing executed by the CPU 52 will be described with reference to FIG. 28.

In the imaging apparatus 10 according to the third embodiment, an output image data processing program is stored in the secondary storage portion 60, and the CPU 52 reads out the output image data processing program from the secondary storage portion 60 and loads the output image data processing program into the primary storage portion 58. The CPU 52 executes the output image data processing in accordance with the output image data processing program loaded in the primary storage portion 58.

Figure 28:
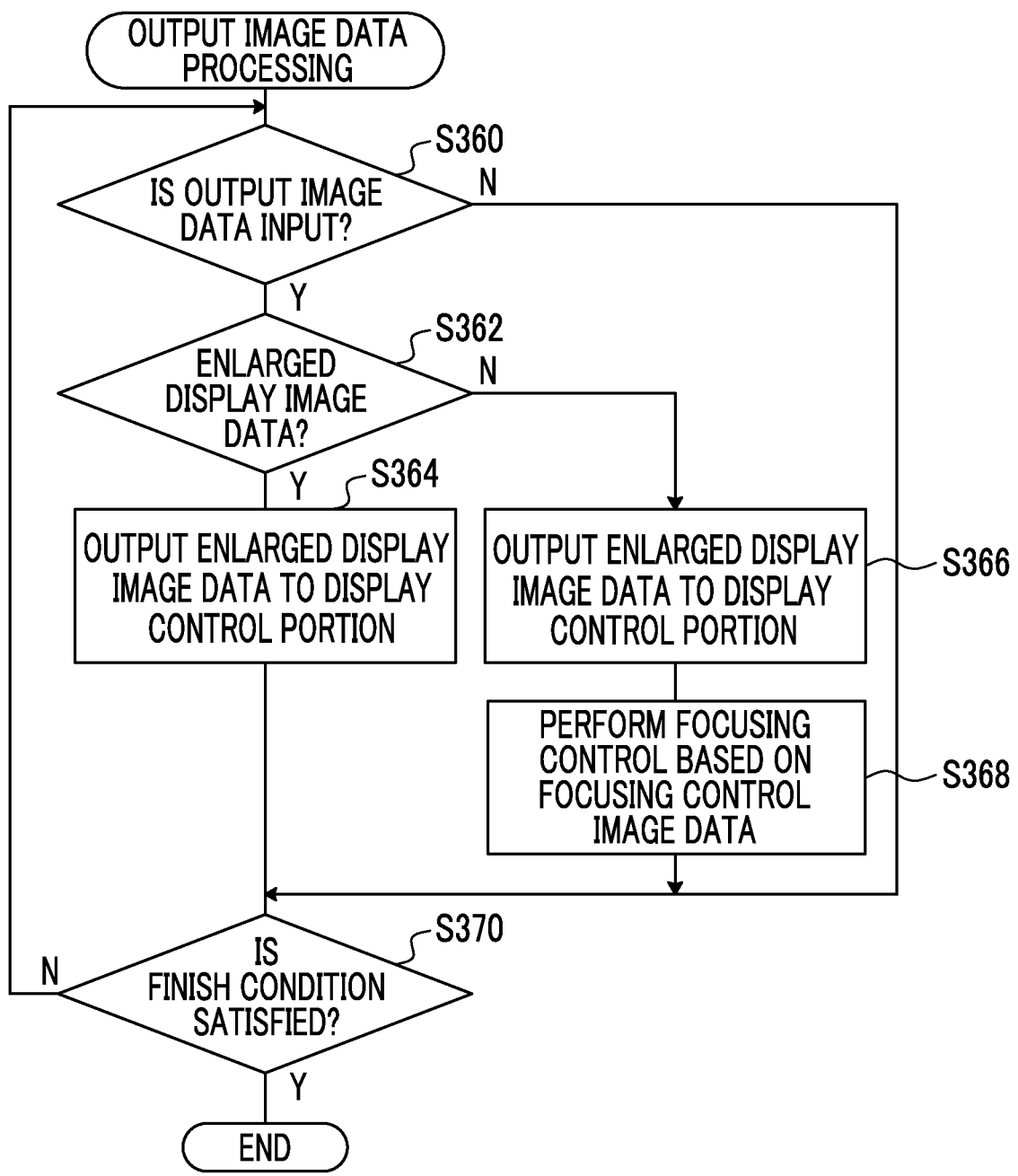
FIG. 28 is a flowchart illustrating one example of a flow of output image data processing according to the third embodiment.

In the output image data processing illustrated in FIG. 28, in step S360, the CPU 52 determines whether or not the output image data is input into the I/F 56 from the processing circuit 94. In step S360, in a case where the output image data is not input into the I/F 56 from the processing circuit 94, a negative determination is made, and the output image data processing transitions to step S370. In step S360, in a case where the output image data is input into the I/F 56 from the processing circuit 94, a positive determination is made, and the output image data processing transitions to step S362.

In step S362, a determination as to whether or not only the enlarged display image data is included in the output image data is performed. In step S362, in a case where only the enlarged display image data is included in the output image data, a positive determination is made, and the output image data processing transitions to step S364. In step S362, in a case where the enlarged display image data and the focusing control image data are included in the output image data, a negative determination is made, and the output image data processing transitions to step S366.

In step S364, the CPU 52 outputs enlarged display image data to the display control portion, and then, the output image data processing transitions to step S370. For example, in a case where the enlarged display image data is output to the display control portion, the display control portion displays an image based on the enlarged display image data on the display apparatus as illustrated in FIG. 27. The image based on the enlarged display image data is displayed at the second frame rate on the display apparatus.

In step S366, the CPU 52 executes processing corresponding to processing of step S364, and then, the output image data processing transitions to step S368.

In step S368, the CPU 52 performs the focusing control based on the focusing control image data, and then, the output image data processing transitions to step S370.

In step S370, the CPU 52 determines whether or not an output image data processing finish condition that is a condition for finishing the output image data processing is satisfied. The same condition as the display control processing finish condition described in the first embodiment is illustrated as one example of the output image data processing finish condition.

In step S370, in a case where the output image data processing finish condition is not satisfied, a negative determination is made, and the output image data processing transitions to step S360. In step S370, in a case where the output image data processing finish condition is satisfied, a positive determination is made, and the CPU 52 finishes the output image data processing.

As described above, in the imaging apparatus 10 according to the third embodiment, the focusing control image data is generated, and the generated focusing control image data is included in the output image data. Accordingly, even in a case where the focusing control is performed using the focusing control image data, the imaging apparatus 10 according to the third embodiment can reduce power consumption compared to a case of generating the focusing control image data in the rear stage circuit 90.

Fourth Embodiment

The image data generation processing and the image data output processing are illustrated in the first embodiment. In a fourth embodiment, an example of a form in which the processing circuit 94 further executes imaging control processing will be described. In the fourth embodiment, the same constituents as constituents described in the first embodiment will be designated by the same reference signs and will not be described.

Figure 29:
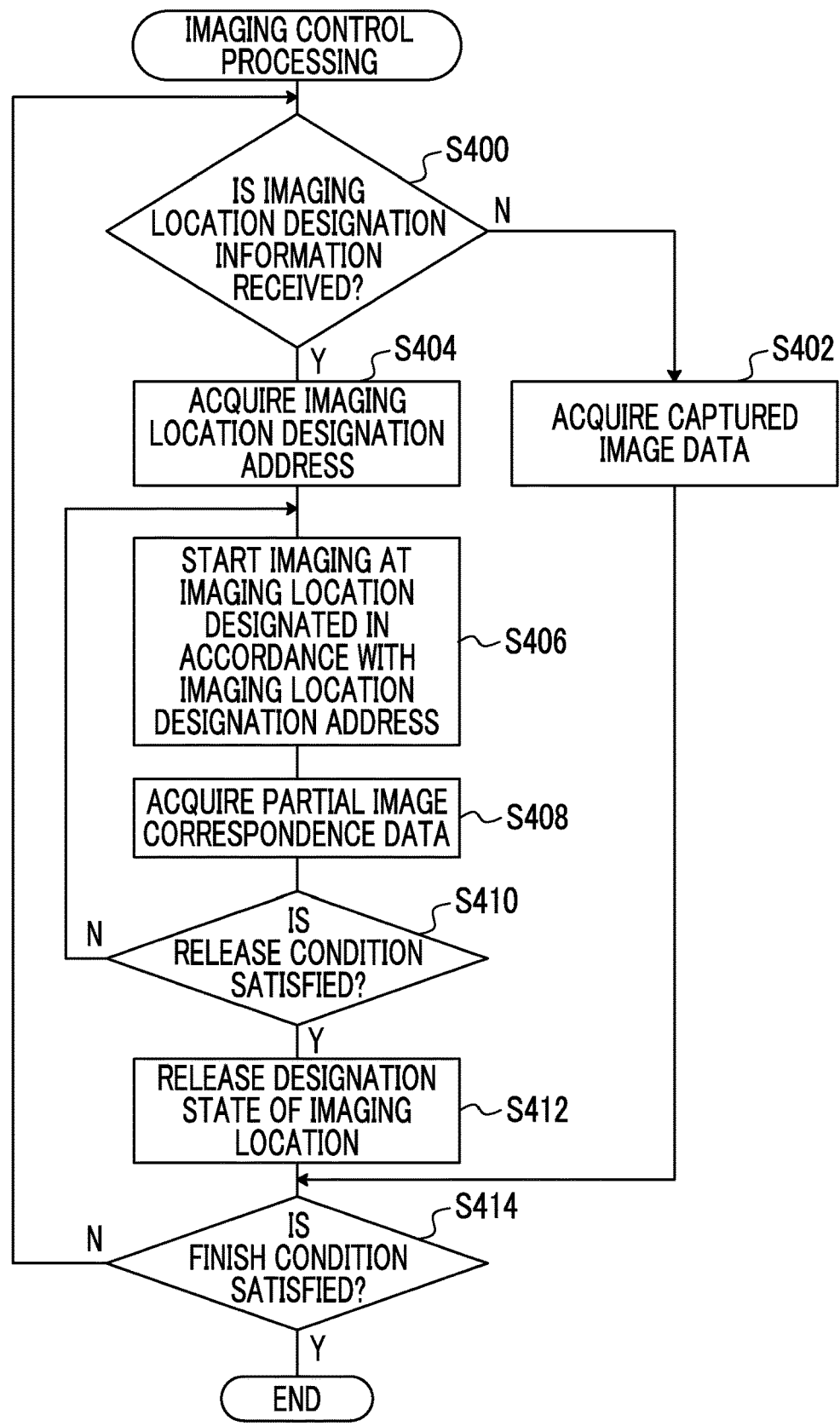
FIG. 29 is a flowchart illustrating one example of a flow of imaging control processing according to the fourth embodiment.
Figure 30:
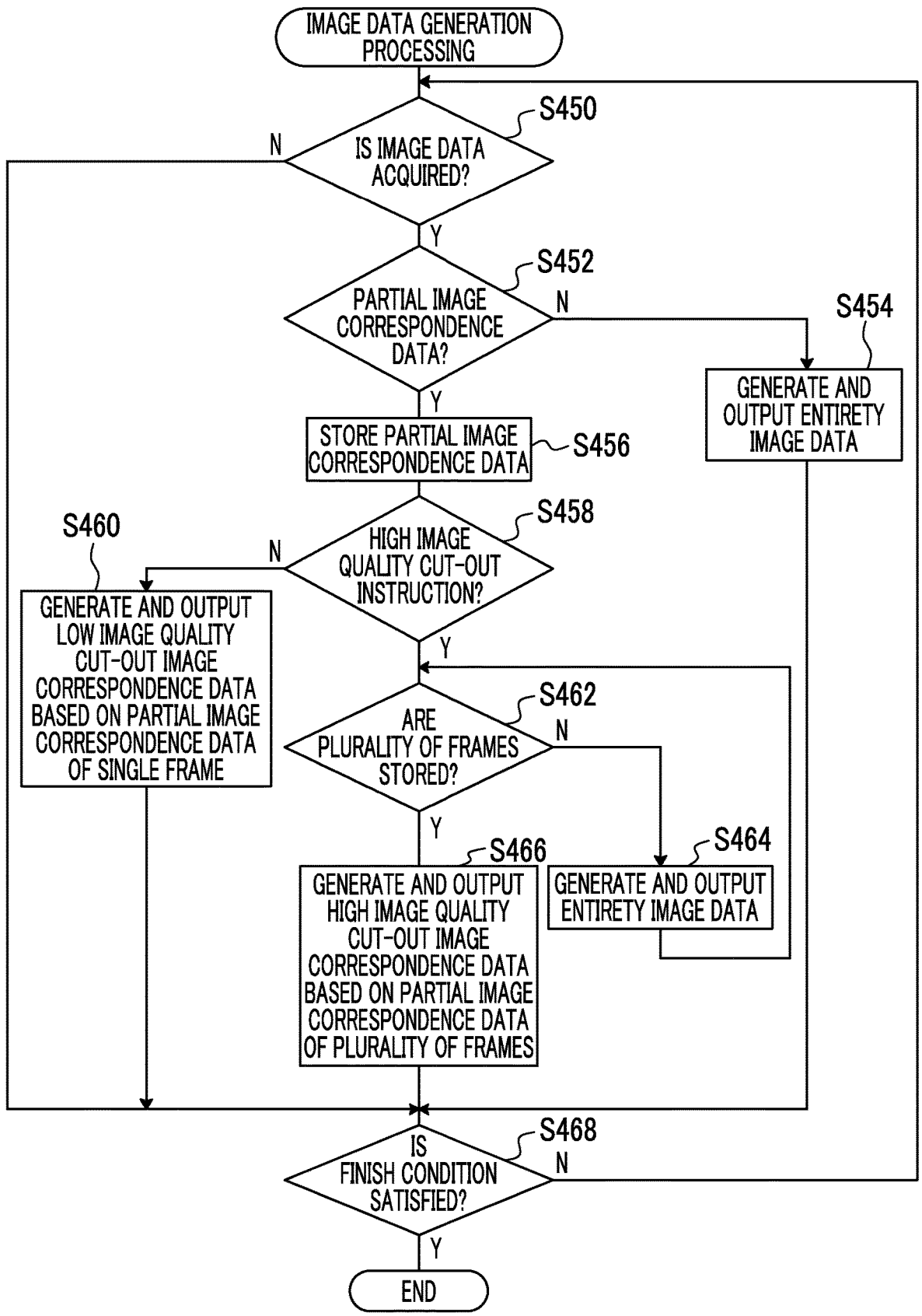
FIG. 30 is a flowchart illustrating one example of a flow of image data generation processing according to the fourth embodiment.

The imaging apparatus 10 according to the fourth embodiment is different from the imaging apparatus 10 according to the first embodiment in that the processing circuit 94 can further execute the imaging control processing illustrated in FIG. 29. In addition, the imaging apparatus 10 according to the fourth embodiment is different from the imaging apparatus 10 according to the first embodiment in that the image data generation processing illustrated in FIG. 30 can be further executed. The imaging control processing illustrated in FIG. 29 and the image data generation processing illustrated in FIG. 30 are executed at the first frame rate by the processing circuit 94.

In the imaging control processing illustrated in FIG. 29, first, in step S400, the processing circuit 94 determines whether or not imaging location designation information is received by the touch panel 42 and/or the operation portion 54. The imaging location designation information refers to information for designating a photodiode to be used for obtaining the partial image data among all photodiodes in the photoelectric conversion element 92. The imaging location designation information includes an imaging location designation address that can be used for specifying a designated position in the photoelectric conversion element 92.

In step S400, in a case where the imaging location designation information is not received by the touch panel 42 and/or the operation portion 54, a negative determination is made, and the imaging control processing transitions to step S402. In step S400, in a case where the imaging location designation information is received by the touch panel 42 and/or the operation portion 54, a positive determination is made, and the imaging control processing transitions to step S404. A case where a positive determination is made in step S400 is one example of a "case where a location corresponding to a part of a subject in a photoelectric conversion element is designated by designating the part of the subject" according to the embodiment of the technology of the present disclosure.

In step S402, the photoelectric conversion element drive circuit 94A acquires the captured image data by imaging the subject using all photodiodes in the photoelectric conversion element 92, and then, the imaging control processing transitions to step S414.

In step S404, the photoelectric conversion element drive circuit 94A acquires the imaging location designation address from the imaging location designation information, and then, the imaging control processing transitions to step S406.

In step S406, the photoelectric conversion element drive circuit 94A causes the photoelectric conversion element 92 to start imaging at an imaging location designated in accordance with the imaging location designation address, and then, the imaging control processing transitions to step S408. The captured image data obtained by imaging by executing processing of step S406 is partial image correspondence data. The partial image correspondence data refers to image data corresponding to the partial image data described in the first embodiment. The partial image correspondence data is stored in the memory 96 in the same manner as the partial image data.

In step S408, the processing circuit 94 acquires the partial image correspondence data from the memory 96, and then, the imaging control processing transitions to step S410.

In step S410, the processing circuit 94 determines whether or not a release condition for releasing a designation state of the imaging location for the photoelectric conversion element 92 is satisfied. In step S410, in a case where the release condition is not satisfied, a negative determination is made, and the imaging control processing transitions to step S400. In step S410, in a case where the release condition is satisfied, a positive determination is made, and the imaging control processing transitions to step S412.

In step S412, the photoelectric conversion element drive circuit 94A releases the designation state of the imaging location for the photoelectric conversion element 92, and then, the imaging control processing transitions to step S414.

In step S414, the processing circuit 94 determines whether or not an imaging control processing finish condition that is a condition for finishing the imaging control processing is satisfied. For example, a condition that an instruction to finish the imaging control processing is received by the touch panel 42 and/or the operation portion 54 is illustrated as the imaging control processing finish condition.

In step S414, in a case where the imaging control processing finish condition is not satisfied, a negative determination is made, and the imaging control processing transitions to step S400. In step S414, in a case where the imaging control processing finish condition is satisfied, a positive determination is made, and the processing circuit 94 finishes the imaging control processing.

Next, a case where the image data generation processing according to the fourth embodiment is executed by the processing circuit 94 will be described with reference to FIG. 30.

In the image data generation processing illustrated in FIG. 30, in step S450, the processing circuit 94 determines whether or not image data is acquired from the photoelectric conversion element 92 by the photoelectric conversion element drive circuit 94A. For convenience of description, the image data acquired from the photoelectric conversion element 92 is the partial image correspondence data acquired in step S408 of the imaging control processing or the captured image data acquired in step S402 of the imaging control processing.

In step S450, in a case where the image data is not acquired from the photoelectric conversion element 92 by the photoelectric conversion element drive circuit 94A, a negative determination is made, and the image data generation processing transitions to step S468. In step S450, in a case where the image data is acquired from the photoelectric conversion element 92 by the photoelectric conversion element drive circuit 94A, a positive determination is made, and the image data generation processing transitions to step S452.

In step S452, the processing circuit 94 determines whether or not the image data acquired from the photoelectric conversion element 92 is the partial image correspondence data. In step S452, in a case where the image data acquired from the photoelectric conversion element 92 is not the partial image correspondence data, that is, in a case where the image data acquired from the photoelectric conversion element 92 is the captured image data, a negative determination is made, and a transition is made to step S454. In step S452, in a case where the image data acquired from the photoelectric conversion element 92 is the partial image correspondence data, a positive determination is made, and the image data generation processing transitions to step S456. In a case where the image data acquired from the photoelectric conversion element 92 is the captured image data, the captured image data is stored in the memory 96.

In step S454, the image processing circuit 94C acquires the captured image data from the memory 96 and generates and outputs the entirety image data described in the first embodiment to the output circuit 94D based on the acquired captured image data, and then, the image data generation processing transitions to step S468.

In step S456, the AD conversion circuit 94B stores the partial image correspondence data in the memory 96, and then, the image data generation processing transitions to step s458.

In step S458, the image processing circuit 94C determines whether or not the high image quality cut-out instruction described in the first embodiment is received by the touch panel 42 and/or the operation portion 54. In step S458, in a case where the high image quality cut-out instruction is not received by the touch panel 42 and/or the operation portion 54, a negative determination is made, and the image data generation processing transitions to step S460. In step S458, in a case where the high image quality cut-out instruction is received by the touch panel 42 and/or the operation portion 54, a positive determination is made, and the image data generation processing transitions to step S462.

In step S460, the image processing circuit 94C acquires the partial image correspondence data of a single frame from the memory 96. The image processing circuit 94C generates and outputs low image quality cut-out image correspondence data to the output circuit 94D based on the acquired partial image correspondence data of the single frame, and then, the image data generation processing transitions to step S468.

For example, the partial image correspondence data of the single frame refers to the partial image correspondence data least recently stored in the memory 96. However, the technology of the present disclosure is not limited thereto. For example, the partial image correspondence data of the single frame may be any partial image correspondence data in a case where the partial image correspondence data of a plurality of frames is stored in the memory 96.

The low image quality cut-out image correspondence data refers to image data corresponding to the low image quality cut-out image data described in the first embodiment.

In step S462, the image processing circuit 94C determines whether or not the captured image data of a plurality of frames is stored in the memory 96. In step S462, three frames are employed as one example of the plurality of frames. In step S462, in a case where the captured image data of the plurality of frames is not stored in the memory 96, a negative determination is made, and the image data generation processing transitions to step S464. In step S462, in a case where the captured image data of the plurality of frames is stored in the memory 96, a positive determination is made, and the image data generation processing transitions to step S466.

In step S464, the image processing circuit 94C executes processing corresponding to processing of step S454, and then, the image data generation processing transitions to step S462.

In step S466, the image processing circuit 94C acquires the partial image correspondence data of the plurality of frames from the memory 96. The image processing circuit 94C generates and outputs high image quality cut-out image correspondence data to the output circuit 94D based on the acquired partial image correspondence data of the plurality of frames, and then, the image data generation processing transitions to step S468.

The high image quality cut-out image correspondence data refers to image data corresponding to the high image quality cut-out image data described in the first embodiment. For example, combined data obtained by combining the partial image correspondence data of three frames is employed as the high image quality cut-out image correspondence data in the same manner as the example illustrated in FIG. 10. However, the technology of the present disclosure is not limited thereto. For example, the high image quality cut-out image correspondence data may be image data obtained by performing various types of image processing on the combined data obtained by combining the partial image data of three frames.

The low image quality cut-out image data generated by executing processing of step S460 and the high image quality cut-out image data generated by executing processing of step S466 are one example of "image data based on partial image correspondence data" according to the embodiment of the technology of the present disclosure.

In step S468, the image processing circuit 94C determines whether or not the image data generation processing finish condition described in the first embodiment is satisfied. In step S468, in a case where the image data generation processing finish condition is not satisfied, a negative determination is made, and the image data generation processing transitions to step S450. In step S468, in a case where the image data generation processing finish condition is satisfied, a positive determination is made, and the image processing circuit 94C finishes the image data generation processing.

Hereinafter, for convenience of description, the low image quality cut-out image correspondence data and the high image quality cut-out image correspondence data will be referred to as "cut-out image correspondence data" unless otherwise necessary to distinguish therebetween for description.

Next, the image data output processing executed by the output circuit 94D of the processing circuit 94 according to the fourth embodiment will be described with reference to FIG. 8. The image data output processing illustrated in FIG. 8 according to the fourth embodiment is performed at the second frame rate by the output circuit 94D.

In the image data output processing illustrated in FIG. 8 according to the fourth embodiment, first, in step S490, the output circuit 94D determines whether or not the cut-out image correspondence data is input from the image processing circuit 94C. In step S490, in a case where the cut-out image correspondence data is not input from the image processing circuit 94C, a negative determination is made, and a transition is made to step S494. In step S490, in a case where the cut-out image correspondence data is input from the image processing circuit 94C, a positive determination is made, and a transition is made to step S492.

In step S492, the output circuit 94D outputs the cut-out image correspondence data to the I/F 56 of the rear stage circuit 90 and then, transitions to step S494. For example, the OF 56 outputs the cut-out image correspondence data input from the output circuit 94D to the CPU 52 and the image processing portion 62 through the bus 68.

In step S494, the output circuit 94D determines whether or not the image data output processing finish condition is satisfied. In step S494, in a case where the image data output processing finish condition is not satisfied, a negative determination is made, and the image data output processing transitions to step S490. In step S494, in a case where the image data output processing finish condition is satisfied, a positive determination is made, and the output circuit 94D finishes the image data output processing.

Next, the display control processing executed by the display control portion of the rear stage circuit 90 according to the fourth embodiment will be described with reference to FIG. 9. For convenience of description, it is assumed that the cut-out image correspondence data is output to the rear stage circuit 90 from the output circuit 94D by executing the image data output processing illustrated in FIG. 8, and that the cut-out image correspondence data is input into the CPU 52 and the image processing portion 62. In addition, an image indicated by the high image quality cut-out image correspondence data and an image indicated by the low image quality cut-out image correspondence data will be referred to as a "cut-out correspondence image" unless otherwise necessary to distinguish therebetween for description.

In the display control processing illustrated in FIG. 9, in step S500, the display control portion determines whether or not the cut-out image correspondence data is input from the image processing portion 62. In step S500, in a case where the cut-out image correspondence data is not input from the image processing portion 62, a negative determination is made, and the display control processing transitions to step S504. In step S500, in a case where the cut-out image correspondence data is input from the image processing portion 62, a positive determination is made, and the display control processing transitions to step S502.

In step S502, the display control portion outputs the cut-out image correspondence data to the display apparatus as graphics data, and then, the display control processing transitions to step S504. In a case where the cut-out image correspondence data is output to the display apparatus by executing processing of step S502, the display apparatus displays the cut-out correspondence image indicated by the cut-out image correspondence data.

The cut-out correspondence image is any of a high image quality cut-out correspondence image and a low image quality cut-out correspondence image. For example, the high image quality cut-out correspondence image is an image corresponding to the image based on the combined data obtained by combining the captured image data of three frames in the same manner as the example illustrated in FIG. 10. Meanwhile, the low image quality cut-out correspondence image is a thinned image based on the captured image data of one frame. Thus, the image quality of the image displayed on the display apparatus is such that the high image quality cut-out correspondence image has higher image quality than the low image quality cut-out correspondence image.

In step S504, the display control portion determines whether or not the display control processing finish condition is satisfied. In step S504, in a case where the display control processing finish condition is not satisfied, a negative determination is made, and the display control processing transitions to step S500. In step S504, in a case where the display control processing finish condition is satisfied, a positive determination is made, and the display control portion finishes the display control processing.

For example, by executing the imaging control processing illustrated in FIG. 29, the image data generation processing illustrated in FIG. 30, the image data output processing illustrated in FIG. 8, and the display control processing illustrated in FIG. 9, the live view image is displayed on the display apparatus under control of the display control portion. In this case, the "live view image" refers to an image in a live view format based on the cut-out image correspondence data. In the imaging apparatus 10 according to the fourth embodiment, the live view image is displayed at the second frame rate.

As described above, in the imaging apparatus 10 according to the fourth embodiment, the processing circuit 94 generates the partial image correspondence data by causing the photoelectric conversion element 92 to perform imaging at the imaging location designated in accordance with the imaging location designation address, and stores the partial image correspondence data in the memory 96. The processing circuit 94 acquires the partial image correspondence data from the memory 96. The output circuit 94D outputs the cut-out image correspondence data to the rear stage circuit 90.

Accordingly, the imaging apparatus 10 according to the fourth embodiment can reduce power consumption compared to a case of imaging the subject using all regions of the photoelectric conversion element 92 at all times.

While a case where compressed image data is used for displaying the live view image is described in each embodiment above, the technology of the present disclosure is not limited thereto. For example, by the CPU 52, the compressed image data may be stored in the secondary storage portion 60 in the rear stage circuit 90 or may be output to the outside of the imaging apparatus 10 through the external I/F 63.

While the processing circuit 94 implemented by the ASIC is illustrated in each embodiment above, the image data generation processing, the image data output processing, and the imaging control processing may be implemented by a computer using a software configuration.

Figure 31:
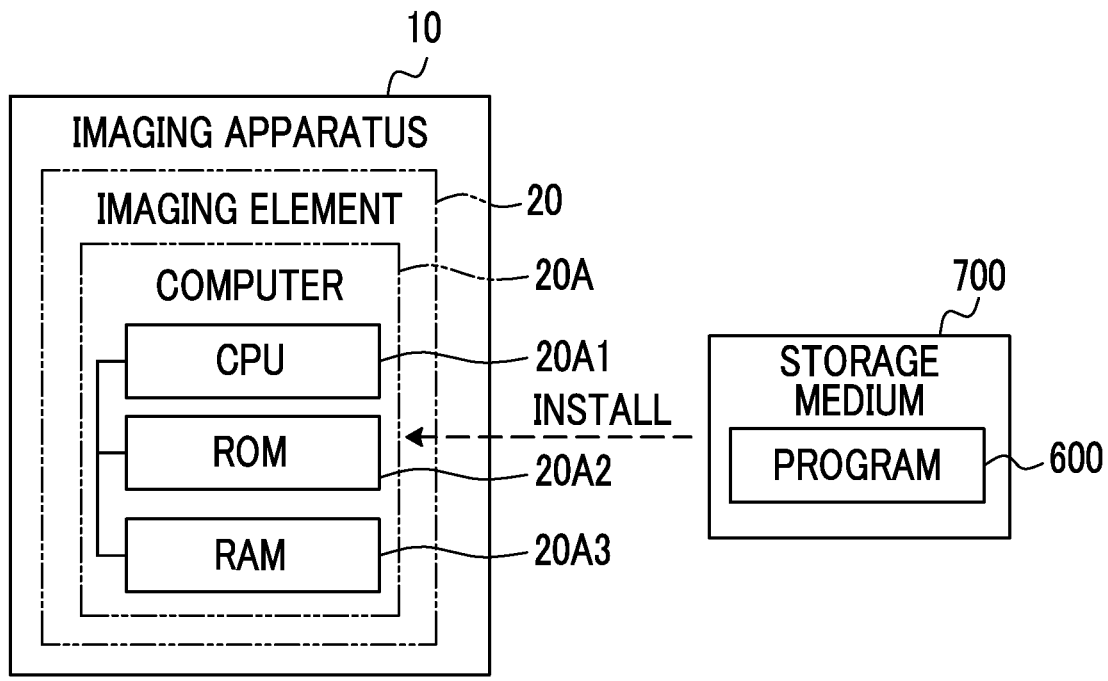
FIG. 31 is a conceptual diagram illustrating one example of a state where a program according to the embodiment is installed on the imaging element from a storage medium storing the program according to the embodiment.

In this case, for example, as illustrated in FIG. 31, a program 600 for causing a computer 20A incorporated in the imaging element 20 to execute the image data generation processing, the image data output processing, and the imaging control processing is stored in a storage medium 700. The computer 20A comprises a CPU 20A1, a ROM 20A2, and a RAM 20A3. The program 600 of the storage medium 700 is installed on the computer 20A, and the CPU 20A1 of the computer 20A executes the image data generation processing, the image data output processing, and the imaging control processing in accordance with the program 600. A single CPU is illustrated as the CPU 20A1. However, the technology of the present disclosure is not limited thereto, and a plurality of CPUs may be employed instead of the CPU 20A1. That is, the image data generation processing, the image data output processing, and/or the imaging control processing may be executed by one processor or a plurality of physically separated processors.

Any portable storage medium such as a solid state drive (SSD) or a universal serial bus (USB) is illustrated as one example of the storage medium 700.

Alternatively, the program 600 may be stored in a storage portion of another computer, a server apparatus, or the like connected to the computer 20A through a communication network (not illustrated), and the program 600 may be downloaded in accordance with a request from the imaging apparatus 10 or the like. In this case, the downloaded program 600 is executed by the computer 20A.

The computer 20A may be disposed outside the imaging element 20. In this case, the computer 20A may control the processing circuit 94 in accordance with the program 600.

Various processors illustrated below can be used as a hardware resource for executing various types of processing described in each embodiment above. As various types of processing described in each embodiment above, the image data generation processing, the image data output processing, the display control processing, the single region cut-out processing, the plural region cut-out processing, the output image data processing, and the imaging control processing are illustrated. For example, as described above, a CPU that is a general-purpose processor functioning as a hardware resource for executing various types of processing according to the embodiment of the technology of the present disclosure by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor. A memory is incorporated in or connected to any of the processors, and any of the processors executes various types of processing using the memory.

The hardware resource for executing various types of processing according to the embodiment of the technology of the present disclosure may be configured with one of those various processors or may be configured with a combination of two or more processors of the same type or different types (for example, a combination of a plurality of FPGAs or a combination of a CPU and an FPGA). Alternatively, the hardware resource for executing various types of processing according to the embodiment of the technology of the present disclosure may be one processor.

As an example of a configuration with one processor, first, as represented by a computer such as a client and a server, a form in which one processor is configured with a combination of one or more CPUs and software and this processor functions as the hardware resource for executing various types of processing according to the embodiment of the technology of the present disclosure is available. Second, as represented by a system-on-a-chip (SoC) or the like, a form of using a processor that implements, by one IC chip, a function of the entire system including a plurality of hardware resources for executing various types of processing according to the embodiment of the technology of the present disclosure is available. Accordingly, various types of processing according to the embodiment of the technology of the present disclosure are implemented using one or more of above various processors as a hardware resource.

Furthermore, as a hardware structure of those various processors, more specifically, an electric circuit in which circuit elements such as semiconductor elements are combined can be used.

Figure 32:
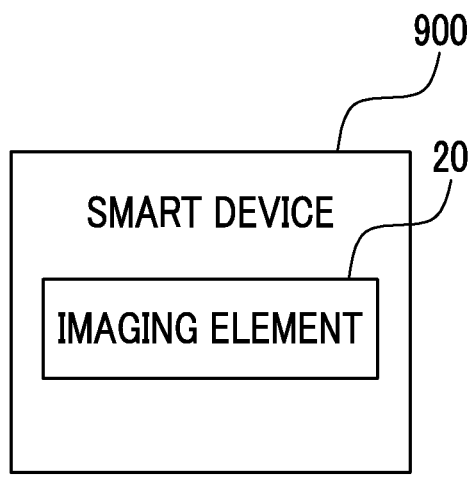
FIG. 32 is a block diagram illustrating one example of a schematic configuration of a smart device in which the imaging element according to the first to fourth embodiments is incorporated.

While an interchangeable lens camera is illustrated as the imaging apparatus 10 in each embodiment above, the technology of the present disclosure is not limited thereto. For example, the technology of the present disclosure may be applied to a smart device 900 illustrated in FIG. 32. For example, the smart device 900 illustrated in FIG. 32 is one example of the imaging apparatus according to the embodiment of the technology of the present disclosure. The imaging element 20 described in the embodiments is mounted on the smart device 900. Even with the smart device 900 configured in such a manner, the same action and effect as the imaging apparatus 10 described in each embodiment above are achieved. The technology of the present disclosure can be applied to not only the smart device 900 but also a personal computer or a wearable terminal apparatus.

While the first display 40 and the second display 80 are illustrated as the display apparatus in each embodiment above, the technology of the present disclosure is not limited thereto. For example, a separate display that is retrofit into the imaging apparatus main body 12 may be used as the "display portion" according to the embodiment of the technology of the present disclosure.

The image data generation processing, the image data output processing, the display control processing, the output image data processing, and the imaging control processing described in each embodiment above are merely one example. Accordingly, unnecessary steps may be removed, new steps may be added, or a processing order may be changed without departing from a gist of the technology of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, may be only B, or may be a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
   a memory that stores captured image data obtained by imaging a subject at a first frame rate, the memory being incorporated in the imaging element;
   an image processing circuit that performs processing on the captured image data that is stored in the memory to generate output image data, the image processing circuit being incorporated in the imaging element; and
   an output circuit that outputs all output image data obtained by performing the processing on the captured image data to an exterior of the imaging element at a second frame rate, the output circuit being incorporated in the imaging element,
   wherein the processing performed by the image processing circuit comprises cut-out processing with respect to one frame of the captured image data, the cut-out processing including cutting out partial image data indicating an image of a part of the subject in the captured image data from a designated address in the memory,
   the output image data includes image data based on the partial image data that is cut out from the captured image data as a result of performing the cut-out processing by the image processing circuit,
   the first frame rate is a frame rate higher than the second frame rate, and
   wherein the image processing circuit performs the processing at the first frame rate.

2. The imaging element according to claim 1,
   wherein the cut-out processing is processing of cutting out the partial image data from the captured image data stored in the memory by random access to the memory.

3. The imaging element according to claim 1,
wherein the memory is capable of storing the captured image data of a plurality of frames,
the cut-out processing includes processing of cutting out the partial image data of the plurality of frames from the captured image data stored in the memory, and
the output portion outputs, as the output image data, image data that is obtained by combining the partial image data of the plurality of frames cut out as a result of performing the cut-out processing by the image processing circuit.

4. The imaging element according to claim 3,
wherein the partial image data is at least one of a plurality of pieces of divided region image data corresponding to a plurality of divided regions obtained by dividing the part.

5. The imaging element according to claim 4,
wherein the plurality of pieces of divided region image data have a relationship in which mutually different pixels are thinned out in units of lines.

6. The imaging element according to claim 4,
wherein the output image data includes combined data obtained by combining the plurality of pieces of divided region image data.

7. The imaging element according to claim 6,
wherein the output circuit selectively outputs, as the partial image data, divided region image data of a part of the plurality of pieces of divided region image data or the combined data in accordance with a provided condition.

8. The imaging element according to claim 1,
wherein the subject is imaged by a photoelectric conversion element,
in a case in which an area of the photoelectric conversion element corresponding to the part is designated by designating the part of the subject, the image processing circuit causes the area of the photoelectric conversion element to perform imaging, and
the image processing circuit acquires partial image correspondence data corresponding to the partial image data at the first frame rate by performing imaging by the area of the photoelectric conversion element, and outputs image data based on the acquired partial image correspondence data to the exterior of the imaging element at the second frame rate.

9. The imaging element according to claim 1,
wherein the part includes a plurality of regions in the subject, and
the partial image data is a plurality of pieces of region image data indicating the plurality of regions in the captured image data.

10. The imaging element according to claim 1,
wherein the output image data further includes wide range image data that indicates an image of a range of the subject wider than the part of the subject, and
resolution of the wide range image data is lower than resolution of the partial image data.

11. The imaging element according to claim 10,
wherein the wide range image data is image data indicating an image of an entirety of the subject.

12. The imaging element according to claim 1,
wherein the output image data further includes focusing control image data indicating an image of a range that is a range of the subject wider than the part of the subject and that is a predetermined range as a range required for a focusing control of an imaging apparatus including the imaging element.

13. The imaging element according to claim 1,
wherein the imaging element is a stacked imaging element that includes a photoelectric conversion element, and in which the photoelectric conversion element is stacked on the memory.

14. An imaging apparatus comprising:
the imaging element according to claim 1; and
a display processor that is configured to perform a control for displaying an image based on the output image data output by the image processing circuit on a display in an enlarged manner.

15. An image data processing method of an imaging element in which a memory, an image processing circuit, and an output circuit are incorporated, the image data processing method comprising:
storing, by the memory, captured image data obtained by imaging a subject at a first frame rate;
performing, by the image processing circuit, processing on the captured image data that is stored in the memory to generate output image data; and
outputting, by the output circuit, all output image data obtained by performing the processing on the captured image data to an exterior of the imaging element at a second frame rate,
wherein the processing performed, by the image processing circuit comprises cut-out processing with respect to one frame of the captured image data, the cut-out processing including cutting out partial image data indicating an image of a part of the subject in the captured image data from a designated address in the memory,
wherein the output image data includes image data based on the partial image data that is cut out from the captured image data as a result of performing the cut-out processing by the image processing circuit,
the first frame rate is a frame rate higher than the second frame rate, and
wherein the image processing circuit performs the processing at the first frame rate.

16. A non-transitory storage medium storing a program that causes a computer to function as an image processing circuit and an output portion included in an imaging element, and to perform an image data processing, the imaging element incorporating a memory, the image processing circuit, and the output circuit, the image data processing circuit comprising:
storing, by the memory, captured image data obtained by imaging a subject at a first frame rate;
performing, by the image processing circuit, processing on the captured image data that is stored in the memory to generate output image data; and
outputting, by the output circuit, all output image data obtained by performing the processing on the captured image data to an exterior of the imaging element at a second frame rate,
wherein the processing performed, by the image processing circuit comprises cut-out processing with respect to one frame of the captured image data, the cut-out processing including cutting out partial image data indicating an image of a part of the subject in the captured image data from a designated address in the memory,
wherein the output image data includes image data based on the partial image data that is cut out from the captured image data as a result of performing the cut-out processing by the image processing circuit, the first frame rate is a frame rate higher than the second frame rate, and wherein the image processing circuit performs the processing at the first frame rate.

17. The imaging element according to claim 1, wherein all of the captured image data obtained by the imaging is once stored in the memory and then output from the output circuit via the image processing circuit.

18. The imaging element according to claim 1, further comprising a photoelectric conversion element that generates the captured image data by imaging the subject, wherein an output terminal of the photoelectric conversion element is connected to the memory, an output terminal of the memory is connected to the image processing circuit, and an output terminal of the image processing circuit is connected to the output circuit.

* * * * *